United States Patent
Kashima et al.

[11] Patent Number: 6,129,362
[45] Date of Patent: *Oct. 10, 2000

[54] SPHERICAL ANNULAR SEAL MEMBER AND METHOD OF MANUFACTURING THE SAME

[75] Inventors: Kazutsugu Kashima; Shuichi Kubota; Takeshi Furukido, all of Fujisawa, Japan

[73] Assignee: Oiles Corporation, Tokyo, Japan

[*] Notice: This patent is subject to a terminal disclaimer.

[21] Appl. No.: 09/018,331

[22] Filed: Feb. 4, 1998

[30] Foreign Application Priority Data

Feb. 10, 1997 [JP] Japan .................................. 9-041687
Feb. 10, 1997 [JP] Japan .................................. 9-041688

[51] Int. Cl.[7] ............................................... F16J 15/12
[52] U.S. Cl. ..................... 277/651; 277/650; 277/627; 277/938
[58] Field of Search .................... 277/627, 650, 277/651, 652, 936, 938, 939, 940, 941, 946

[56] References Cited

U.S. PATENT DOCUMENTS

| | | | |
|---|---|---|---|
| 4,003,867 | 1/1977 | Cooper et al. | 252/12 |
| 4,209,177 | 6/1980 | Hall . | |
| 4,417,733 | 11/1983 | Usher . | |
| 4,462,603 | 7/1984 | Usher et al. . | |
| 4,516,782 | 5/1985 | Usher . | |
| 4,537,632 | 8/1985 | Mosser | 106/14.12 |
| 4,547,434 | 10/1985 | Sumiyoshi et al. . | |
| 4,551,393 | 11/1985 | Sumiyoshi et al. . | |
| 4,554,084 | 11/1985 | Lonne et al. . | |
| 4,559,248 | 12/1985 | Sumiyoshi et al. . | |
| 4,559,249 | 12/1985 | Arigaya et al. . | |
| 4,601,476 | 7/1986 | Usher et al. . | |
| 4,607,851 | 8/1986 | Usher . | |
| 4,659,091 | 4/1987 | Baasner et al. . | |
| 4,762,330 | 8/1988 | Lönne et al. . | |
| 4,779,904 | 10/1988 | Rich | 277/590 X |
| 4,853,293 | 8/1989 | Andersson et al. | 277/939 X |
| 4,871,181 | 10/1989 | Usher et al. . | |
| 4,902,024 | 2/1990 | Takenoshita . | |

(List continued on next page.)

FOREIGN PATENT DOCUMENTS

| | | |
|---|---|---|
| 0 453 068 A2 | 10/1991 | European Pat. Off. . |
| 58-24620 | 2/1983 | Japan . |
| 58-34230 | 2/1983 | Japan . |
| 1-299393 | 12/1989 | Japan . |
| 2-215916 | 8/1990 | Japan . |
| 4-77835 | 12/1992 | Japan . |

*Primary Examiner*—Anthony Knight
*Attorney, Agent, or Firm*—Nixon & Vanderhye

[57] ABSTRACT

A spherical annular seal member which has a cylindrical inner surface defining a through hole in a central portion thereof, an outer surface formed in the shape of a partially convex spherical surface, and an annular end face on a large-diameter side of the outer surface, and which is used particularly in an exhaust pipe joint, comprises: a reinforcing member made from a compressed metal wire net; a heat-resistant material filling meshes of the metal wire net of the reinforcing member and compressed in such a manner as to be formed integrally with the reinforcing member in mixed form, the heat-resistant material and the reinforcing member being provided as principal components in an inner portion of the spherical annular seal member which extends from the cylindrical inner surface to the outer surface formed in the shape of the partially convex spherical surface, boron carbide, a metal boride, a metal fluoride, graphite, and aluminum phosphate being also formed integrally with the reinforcing member and the heat-resistant material in mixed form; an outer surface layer formed of boron carbide, a metal boride, a metal fluoride, graphite, and aluminum phosphate; and a reinforcing member made from a compressed metal wire net and formed integrally with the outer surface layer in mixed form, wherein the outer surface formed in the shape of the partially convex spherical surface is formed into a smooth surface where the outer surface layer and the reinforcing member made from the metal wire net and formed integrally with the outer surface layer in mixed form are exposed.

69 Claims, 10 Drawing Sheets

U.S. PATENT DOCUMENTS

| | | |
|---|---|---|
| 4,951,954 | 8/1990 | MacNeill . |
| 4,955,218 | 9/1990 | Brandener . |
| 5,040,805 | 8/1991 | Ozora . |
| 5,065,493 | 11/1991 | Ozora . |
| 5,451,064 | 9/1995 | Mercuri et al. ............. 277/626 X |
| 5,462,291 | 10/1995 | Maeda et al. . |
| 5,499,825 | 3/1996 | Maeda et al. ............. 277/626 |
| 5,615,479 | 4/1997 | Maeda et al. . |

SPHERICAL ANNULAR SEAL MEMBER AND METHOD OF MANUFACTURING THE SAME

BACKGROUND OF THE INVENTION

The present invention relates to a spherical annular seal member used particularly in a spherical pipe joint for an automobile exhaust pipe, as well as a method of manufacturing the same.

As a spherical annular seal member used in a spherical pipe joint for an automobile exhaust pipe, one disclosed in, for example, Japanese Patent Application Laid-Open No. 76759/1979 (corresponding to U.S. Pat. Nos. 4,516,782 and 4,607,851) is known. The seal member disclosed in this publication is heat resistant, excels in affinity with a mating member, and has remarkably improved impact strength, but has a drawback in that the seal member often generates abnormal noise when it undergoes friction under dry frictional conditions. The drawback of this seal member is conceivably attributable to, among others, the fact that there is a large difference between the coefficient of static friction and the coefficient of dynamic friction of a heat-resistant material (such as expanded graphite) for forming the seal member, and to the fact that the dynamic frictional resistance of the seal member constituted by this heat-resistant material exhibits negative resistance with respect to the sliding velocity or speed.

Therefore, to overcome the above-described drawback, a seal member has been proposed in Japanese Patent Application Laid-Open No. 123362/1994 (corresponding to U.S. Pat. No. 5,499,825). This seal member excels in the sealing characteristic without generating abnormal frictional noise in friction with a mating member, and satisfies the performance required of a seal member.

However, with respect to this proposed seal member as well, a new problem has been presented which is attributable to, among others, the improvement in recent years of the performance of automobile engines. That is, the conventional seal members are unable to satisfy the conditions of use in the light of heat resistance, owing to an increase in the exhaust-gas temperature due to the improved performance of the automobile engines, or owing to an increase in the exhaust-gas temperature attributable to the fact that the spherical pipe joint is located closer to the engine side in a case where the spherical pipe joint is disposed in the vicinity of an outlet (manifold) of the exhaust gases, for the purpose of improving the noise, vibration and harshness (NVH) characteristics of an automobile. Thus, there has been a compelling need for improvement of the heat resistance of the seal member itself.

SUMMARY OF THE INVENTION

The present invention has been devised in view of the above-described problems, and its object is to provide a spherical annular seal member for use in a spherical pipe joint for an automobile exhaust pipe, which is capable suppressing oxidation and wear to low levels, does not generate abnormal frictional noise, excels in a sealing characteristic, and is capable of satisfying its function as a seal member even under a high-temperature condition of 600° C. to 700° C., as well as a method of manufacturing the same.

In accordance with the present invention, the above object is attained by a spherical annular seal member which has a cylindrical inner surface defining a through hole in a central portion thereof, an outer surface formed in the shape of a partially convex spherical surface, and an annular end face on a large-diameter side of the outer surface, and which is used particularly in an exhaust pipe joint, comprising: a reinforcing member made from a compressed metal wire net; a heat-resistant material filling meshes of the metal wire net of the reinforcing member and compressed in such a manner as to be formed integrally with the reinforcing member in mixed form, the heat-resistant material and the reinforcing member being provided as principal components in an inner portion of the spherical annular seal member which extends from the cylindrical inner surface to a vicinity of the outer surface formed in the shape of the partially convex spherical surface, at least one of boron carbide and a metal boride, a metal fluoride, graphite, and aluminum phosphate being also formed integrally with the reinforcing member and the heat-resistant material in mixed form; an outer surface layer formed of at least one of boron carbide and a metal boride, a metal fluoride, graphite, and aluminum phosphate; and a reinforcing member made from a compressed metal wire net and formed integrally with the outer surface layer in mixed form, wherein the outer surface formed in the shape of the partially convex spherical surface is formed into a smooth surface where the outer surface layer and the reinforcing member made from the metal wire net and formed integrally with the outer surface layer in mixed form are exposed.

In addition, in accordance with the present invention, the above object is also attained by the above-described spherical annular seal member, wherein, in the inner portion extending from the cylindrical inner surface to the outer surface formed in the shape of the partially convex spherical surface, a heat-resistant lubricant is further included in such a manner as to be formed integrally with the reinforcing member and the heat-resistant material in mixed form, and the outer surface layer further includes a heat-resistant lubricant.

In addition, in accordance with the present invention, the above object is also attained by a spherical annular seal member which has a cylindrical inner surface defining a through hole in a central portion thereof, an outer surface formed in the shape of a partially convex spherical surface, and an annular end face on a large-diameter side of the outer surface, and which is used particularly in an exhaust pipe joint, comprising: a reinforcing member made from a compressed metal wire net; a heat-resistant material filling meshes of the metal wire net of the reinforcing member and compressed in such a manner as to be formed integrally with the reinforcing member in mixed form, the heat-resistant material and the reinforcing member being provided as principal components in an inner portion of the spherical annular seal member which extends from the cylindrical inner surface to the outer surface formed in the shape of the partially convex spherical surface, at least one of boron carbide and a metal boride, a metal fluoride, graphite, and aluminum phosphate being also formed integrally with the reinforcing member and the heat-resistant material in mixed form; an outer surface layer formed of a lubricating composition constituted of at least boron nitride and at least one of alumina and silica; and a reinforcing member made from a compressed metal wire net and formed integrally with the outer surface layer in mixed form, wherein the outer surface formed in the shape of the partially convex spherical surface is formed into a smooth surface where the outer surface layer and the reinforcing member made from the metal wire net and formed integrally with the outer surface layer in mixed form are exposed.

In addition, in accordance with the present invention, the above object is also attained by the above-described spherical annular seal member, wherein, in the inner portion extending from the cylindrical inner surface to the outer surface formed in the shape of the partially convex spherical surface, a heat-resistant lubricant is further included in such a manner as to be formed integrally with the reinforcing member and the heat-resistant material in mixed form.

In addition, in accordance with the present invention, the above object is also attained by a spherical annular seal member which has a cylindrical inner surface defining a through hole in a central portion thereof, an outer surface formed in the shape of a partially convex spherical surface, and an annular end face on a large-diameter side of the outer surface, and which is used particularly in an exhaust pipe joint, comprising: a heat-resistant sheet member having on overall surfaces of a heat-resistant sheet a heat-resistant coating formed of a mixture of at least one of boron carbide and a metal boride, a metal fluoride, graphite, and aluminum phosphate; and a reinforcing member made from a metal wire net, the reinforcing member and the heat-resistant sheet member being disposed in an inner portion of the spherical annular seal member which extends from the cylindrical inner surface to the outer surface formed in the shape of the partially convex spherical surface, and being arranged to be provided with structural integrality by being compressed and intertwined with each other, wherein the outer surface formed in the shape of the partially convex spherical surface is formed into a smooth surface where an outer surface layer formed of a heat-resistant coating and a reinforcing member made from a metal wire net and formed integrally with the outer surface layer in mixed form are exposed.

In addition, in accordance with the present invention, the above object is also attained by a spherical annular seal member which has a cylindrical inner surface defining a through hole in a central portion thereof, an outer surface formed in the shape of a partially convex spherical surface, and an annular end face on a large-diameter side of the outer surface, and which is used particularly in an exhaust pipe joint, comprising: a heat-resistant sheet member having on overall surfaces of a heat-resistant sheet a heat-resistant coating formed of a mixture of at least one of boron carbide and a metal boride, a metal fluoride, graphite, and aluminum phosphate; a reinforcing member made from a metal wire net, the reinforcing member and the heat-resistant sheet member being disposed in an inner portion of the spherical annular seal member which extends from the cylindrical inner surface to the outer surface formed in the shape of the partially convex spherical surface, and being arranged to be provided with structural integrality by being compressed and intertwined with each other; an outer surface layer formed of a lubricating composition constituted of at least boron nitride and at least one of alumina and silica; and a reinforcing member made from a compressed metal wire net and formed integrally with the outer surface layer in mixed form, wherein the outer surface formed in the shape of the partially convex spherical surface is formed into a smooth surface where the outer surface layer and the reinforcing member made from the metal wire net and formed integrally with the outer surface layer in mixed form are exposed.

In addition, in accordance with the present invention, the above object is also attained by the above-described spherical annular seal member, wherein a heat-resistant lubricant is further included in the heat-resistant coating.

Furthermore, in accordance with the present invention, the above object is also attained by a method of manufacturing a spherical annular seal member which has a cylindrical inner surface defining a through hole in a central portion thereof, an outer surface formed in the shape of a partially convex spherical surface, and an annular end face on a large-diameter side of the outer surface, and which is used particularly in an exhaust pipe joint, comprising the steps of: (a) preparing a heat-resistant sheet member having on overall surfaces of a heat-resistant sheet a heat-resistant coating having a uniform thickness and formed of a mixture of at least one of boron carbide and a metal boride, a metal fluoride, graphite, and aluminum phosphate; (b) preparing a reinforcing member made from a metal wire net obtained by weaving or knitting fine metal wires, superposing the reinforcing member on the heat-resistant sheet member, and convoluting a superposed assembly of the reinforcing member and the heat-resistant sheet member into a spiral form with the heat-resistant sheet member placed on an inner side, so as to form a tubular base member; (c) preparing another heat-resistant sheet member having on overall surfaces of another heat-resistant sheet another heat-resistant coating having a uniform thickness and formed of a mixture of at least one of boron carbide and a metal boride, a metal fluoride, graphite, and aluminum phosphate, and forming an outer-surface-layer forming member which includes the other heat-resistant sheet member and another reinforcing member made from a metal wire net disposed in such a manner as to cover another heat-resistant coating of the other heat-resistant sheet member; (d) winding the outer-surface-layer forming member around an outer peripheral surface of the tubular base member so as to form a cylindrical preform; and (e) fitting the cylindrical preform over an outer peripheral surface of a core of a die, placing the core into the die, and compression-forming the cylindrical preform in the die in an axial direction of the core, wherein, in an inner portion of the spherical annular seal member which extends from the cylindrical inner surface to the outer surface formed in the shape of the partially convex spherical surface, the heat-resistant sheet member having the heat-resistant coating and the reinforcing member made from the metal wire net are arranged to be provided with structural integrality by being compressed and intertwined with each other, and the outer surface formed in the shape of the partially convex spherical surface is formed into a smooth surface in which meshes of the other reinforcing member are filled with the other heat-resistant coating such that the reinforcing member and the other heat-resistant coating are formed integrally in mixed form.

In addition, in accordance with the present invention, the above object is also attained by a method of manufacturing a spherical annular seal member which has a cylindrical inner surface defining a through hole in a central portion thereof, an outer surface formed in the shape of a partially convex spherical surface, and an annular end face on a large-diameter side of the outer surface, and which is used particularly in an exhaust pipe joint, comprising the steps of: (a) preparing a heat-resistant sheet member having on overall surfaces of a heat-resistant sheet a heat-resistant coating having a uniform thickness and formed of a mixture of at least one of boron carbide and a metal boride, a metal fluoride, graphite, and aluminum phosphate; (b) preparing a reinforcing member made from a metal wire net obtained by weaving or knitting fine metal wires, superposing the reinforcing member on the heat-resistant sheet member, and convoluting a superposed assembly of the reinforcing member and the heat-resistant sheet member into a spiral form with the heat-resistant sheet member placed on an inner side, so as to form a tubular base member; (c) preparing another heat-resistant sheet member having on overall surfaces of another heat-resistant sheet another heat-resistant coating having a uniform thickness and formed of a mixture of at least one of boron carbide and a metal boride, a metal fluoride, graphite, and aluminum phosphate, and forming an outer-surface-layer forming member which includes the other heat-resistant sheet member, a surface layer coated on a surface of a heat-resistant coating on one surface of the other heat-resistant sheet member and formed of a lubricating composition constituted of at least boron nitride and at least one of alumina and silica, and another reinforcing member made from a metal wire net disposed in such a manner as to cover the surface layer; (d) winding the outer-surface-layer forming member around an outer peripheral surface of the tubular base member with a surface-layer surface of the outer-surface-layer forming member facing an outer side, so as to form a cylindrical preform; and (e) fitting the cylindrical preform over an outer peripheral surface of a core of a die, placing the core into the die, and compression-forming the cylindrical preform in the die in an axial direction of the core, wherein, in an inner portion of the spherical annular seal member which extends from the cylindrical inner surface to the outer surface formed in the shape of the partially convex spherical surface, the heat-resistant sheet member having the heat-resistant coating and the reinforcing member made from the metal wire net are arranged to be provided with structural integrity by being compressed and intertwined with each other, and the outer surface formed in the shape of the partially convex spherical surface is formed into a smooth surface in which meshes of the other reinforcing member are filled with the lubricating composition such that the other reinforcing member and the lubricating composition are formed integrally in mixed form.

In addition, in accordance with the present invention, the above object is also attained by the above-described method of manufacturing a spherical annular seal member, wherein the heat-resistant coating of the heat-resistant sheet member in the step (a) further includes a heat-resistant lubricant, and the other heat-resistant coating of the other heat-resistant sheet in the step (c) further includes a heat-resistant lubricant.

With the spherical annular seal member having the above-described arrangement, in the inner portion extending from the cylindrical inner surface to the outer surface formed in the shape of the partially convex spherical surface, at least one of boron carbide and the metal boride, the metal fluoride, graphite, and aluminum phosphate, or these materials with a heat-resistant lubricant added thereto, are contained in a weight ratio of 5–45 parts with respect to 100 parts of the heat-resistant material.

Further, in the inner portion extending from the cylindrical inner surface to the outer surface formed in the shape of the partially convex spherical surface, (A) at least one of boron carbide and the metal boride, the metal fluoride, and graphite, or these materials with a heat-resistant lubricant added thereto, on the one hand, and (B) aluminum phosphate on the other hand, are contained in a weight ratio of (A):(B)=1:0.5–3, and at least one of boron carbide and the metal boride, the metal fluoride, and graphite in this ratio are contained in a proportion of 5–25 wt. % for at least one of boron carbide and the metal boride, in a proportion of 1–15 wt. % for the metal fluoride, and in a proportion of 60–90 wt. % for graphite. Additionally, at least one of boron carbide and the metal boride, the metal fluoride, the heat-resistant lubricant, and graphite in the aforementioned ratio are contained in a proportion of 5–20 wt. % for at least one of boron carbide and the metal boride, in a proportion of 3–15 wt. % for the metal fluoride, in a proportion of 5–25 wt. % for the heat-resistant lubricant, and in a proportion of 50–80 wt. % for graphite.

The outer surface layer is formed by a mixture, or a heat-resistant coating comprising the mixture, wherein (A) at least one of boron carbide and the metal boride, the metal fluoride, and graphite, or these materials with a heat-resistant lubricant added thereto, on the one hand, and (B) aluminum phosphate on the other hand, are contained in a weight ratio of (A):(B)=1:0.5–3, and at least one of boron carbide and the metal boride, the metal fluoride, and graphite in this ratio are contained in a proportion of 5–25 wt. % for at least one of boron carbide and the metal boride, in a proportion of 1–15 wt. % for the metal fluoride, and in a proportion of 60–90 wt. % for graphite. Alternatively, the outer surface layer is formed by a mixture, or a heat-resistant coating comprising the mixture, wherein at least one of boron carbide and the metal boride, the metal fluoride, the heat-resistant lubricant, and graphite in the aforementioned ratio are contained in a proportion of 5–20 wt. % for at least one of boron carbide and the metal boride, in a proportion of 3–15 wt. % for the metal fluoride, in a proportion of 5–25 wt. % for the heat-resistant lubricant, and in a proportion of 50–80 wt. % for graphite. Still alternatively, the outer surface layer is formed by a lubricating composition which contains 100 parts by weight of a lubricating composition, or a mixture of the lubricating composition, of 70–90 wt. % of boron nitride and 10–30 wt. % of at least one of alumina and silica, and further contains not more than 200 parts by weight, preferably 50–150 parts by weight, of polytetrafluoroethylene resin.

With the spherical annular seal member having the above-described arrangement, a heat-resistant layer formed by a mixture constituted of at least one of boron carbide and the metal boride, the metal fluoride, graphite, and aluminum phosphate or by a mixture in which a heat-resistant lubricant is further included in that mixture, or a heat-resistant layer formed by a heat-resistant coating comprising this mixture, is exposed at the cylindrical inner surface defining the through hole and at the end face on the large-diameter side of the outer surface formed in the shape of the partially convex spherical surface.

In addition, the heat-resistant layer, which is exposed at the cylindrical inner surface defining the through hole and at the end face on the large-diameter side of the outer surface formed in the shape of the partially convex spherical surface, is formed by a mixture, or a heat-resistant coating comprising the mixture, wherein (A) at least one of boron carbide and the metal boride, the metal fluoride, and graphite, or these materials with a heat-resistant lubricant added thereto, on the one hand, and (B) aluminum phosphate on the other hand, are contained in a weight ratio of (A):(B)=1:0.5–3, and at least one of boron carbide and the metal boride, the metal fluoride, and graphite in this ratio are contained in a proportion of 5–25 wt. % for at least one of boron carbide and the metal boride, in a proportion of 1–15 wt. % for the metal fluoride, and in a proportion of 60–90 wt. % for graphite. Alternatively, the heat-resistant layer, which is exposed at the cylindrical inner surface defining the through hole and at the end face on the large-diameter side of the outer surface formed in the shape of the partially convex spherical surface, is formed by a mixture, or a heat-resistant coating comprising the mixture, wherein at least one of boron carbide and the metal boride, the metal fluoride, the heat-resistant lubricant, and graphite in the aforementioned ratio are contained in a proportion of 5–20 wt. % for at least one of boron carbide and the metal boride, in a proportion of 3–15 wt. % for the metal fluoride, in a proportion of 5–25 wt. % for the heat-resistant lubricant, and in a proportion of 50–80 wt. % for graphite.

In the above-described manufacturing method, at least one of the two heat-resistant coatings is specifically formed of one of the following mixtures: (1) a mixture in which (A) a mixture of 5–25 wt. % of boron carbide, 1–15 wt. % of a metal fluoride, and 60–90 wt. % of graphite and (B) aluminum phosphate are mixed in a weight ratio of (A):(B)= 1:0.5–3; (2) a mixture in which (A) a mixture of 5–25 wt. % of a metal boride, 1–15 wt. % of a metal fluoride, and 60–90 wt. % of graphite and (B) aluminum phosphate are mixed in a weight ratio of (A):(B)=1:0.5– 3; (3) a mixture in which (A) a mixture of 5–25 wt. % of boron carbide, 5–25 wt. % of a metal boride, 1–15 wt. % of a metal fluoride, and 60–90 wt. % of graphite and (B) aluminum phosphate are mixed in a weight ratio of (A):(B)=1:0.5–3; (4) a mixture in which (A) a mixture of 5–20 wt. % of boron carbide, 3–15 wt. % of a metal fluoride, 5–25 wt. % of a heat-resistant lubricant, and 50–80 wt. % of graphite and (B) aluminum phosphate are mixed in a weight ratio of (A):(B)=1:0.5–3; (5) a mixture in which (A) a mixture of 5–20 wt. % of a metal boride, 3–15 wt. % of a metal fluoride, 5–25 wt. % of a heat-resistant lubricant, and 50–80 wt. % of graphite and (B) aluminum phosphate are mixed in a weight ratio of (A):(B)=1:0.5–3; and (6) a mixture in which (A) a mixture of 5–20 wt. % of boron carbide, 5–20 wt. % of a metal boride, 3–15 wt. % of a metal fluoride, 5–25 wt. % of a heat-resistant lubricant, and 50–80 wt. % of graphite and (B) aluminum phosphate are mixed in a weight ratio of (A):(B)=1:0.5–3. This heat-resistant coating is formed in an amount of 0.1 to 0.8 g/100 cm$^2$ and with a uniform thickness on the overall surfaces of the heat-resistant sheet.

In the above-described manufacturing method, the outer-surface-layer forming member is formed by a heat-resistant sheet member having a heat-resistant coating and a reinforcing member constituted by a metal wire net disposed in such a manner as to cover the heat-resistant sheet member. The heat-resistant sheet member is specifically formed of one of the following mixtures: (1) a mixture in which (A) a mixture of 5–25 wt. % of boron carbide, 1–15 wt. % of a metal fluoride, and 60–90 wt. % of graphite and (B) aluminum phosphate are mixed in a weight ratio of (A):(B)= 1:0.5–3; (2) a mixture in which (A) a mixture of 5–25 wt. % of a metal boride, 1–15 wt. % of a metal fluoride, and 60–90 wt. % of graphite and (B) aluminum phosphate are mixed in a weight ratio of (A):(B)=1:0.5–3; (3) a mixture in which (A) a mixture of 5–25 wt. % of boron carbide, 5–25 wt. % of a metal boride, 1–15 wt. % of a metal fluoride, and 60–90 wt. % of graphite and (B) aluminum phosphate are mixed in a weight ratio of (A):(B)=1:0.5–3; (4) a mixture in which (A) a mixture of 5–20 wt. % of boron carbide, 3–15 wt. % of a metal fluoride, 5–25 wt. % of a heat-resistant lubricant, and 50–80 wt. % of graphite and (B) aluminum phosphate are mixed in a weight ratio of (A):(B)=1:0.5–3; (5) a mixture in which (A) a mixture of 5–20 wt. % of a metal boride, 3–15 wt. % of a metal fluoride, 5–25 wt. % of a heat-resistant lubricant, and 50–80 wt. % of graphite and (B) aluminum phosphate are mixed in a weight ratio of (A):(B)=1:0.5–3; and (6) a mixture in which (A) a mixture of 5–20 wt. % of boron carbide, 5–20 wt. % of a metal boride, 3–15 wt. % of a metal fluoride, 5–25 wt. % of a heat-resistant lubricant, and 50–80 wt. % of graphite and (B) aluminum phosphate are mixed in a weight ratio of (A):(B)=1:0.5–3, the heat-resistant coating being formed in an amount of 0.1 to 0.8 g/100 cm$^2$ and with a uniform thickness on the overall surfaces of the heat-resistant sheet.

In the above-described manufacturing method, the outer-surface-layer forming member may be formed by a heat-resistant sheet member having a heat-resistant coating, a surface layer coated on the surface of the heat-resistant coating on one surface of that heat-resistant sheet member, and a reinforcing member constituted by a metal wire net disposed in such a manner as to cover the surface layer. The heat-resistant sheet member is specifically formed of one of the following mixtures: (1) a mixture in which (A) a mixture of 5–25 wt. % of boron carbide, 1–15 wt. % of a metal fluoride, and 60–90 wt. % of graphite and (B) aluminum phosphate are mixed in a weight ratio of (A):(B)=1:0.5–3; (2) a mixture in which (A) a mixture of 5–25 wt. % of a metal boride, 1–15 wt. % of a metal fluoride, and 60–90 wt. % of graphite and (B) aluminum phosphate are mixed in a weight ratio of (A):(B) 1:0.5–3; (3) a mixture in which (A) a mixture of 5–25 wt. % of boron carbide, 5–25 wt. % of a metal boride, 1–15 wt. % of a metal fluoride, and 60–90 wt. % of graphite and (B) aluminum phosphate are mixed in a weight ratio of (A):(B)=1:0.5–3; (4) a mixture in which (A) a mixture of 5–20 wt. % of boron carbide, 3–15 wt. % of a metal fluoride, 5–25 wt. % of a heat-resistant lubricant, and 50–80 wt. % of graphite and (B) aluminum phosphate are mixed in a weight ratio of (A):(B)=0.5–3; (5) a mixture in which (A) a mixture of 5–20 wt. % of a metal boride, 3–15 wt. % of a metal fluoride, 5–25 wt. % of a heat-resistant lubricant, and 50–80 wt. % of graphite and (B) aluminum phosphate are mixed in a weight ratio of (A):(B)=1:0.5–3; and (6) a mixture in which (A) a mixture of 5–20 wt. % of boron carbide, 5–20 wt. % of a metal boride, 3–15 wt. % of a metal fluoride, 5–25 wt. % of a heat-resistant lubricant, and 50–80 wt. % of graphite and (B) aluminum phosphate are mixed in a weight ratio of (A):(B)=1:0.5–3, the heat-resistant coating being formed in an amount of 0.1 to 0.8 g/100 cm$^2$ and with a uniform thickness on the overall surfaces of the heat-resistant sheet. The aforementioned surface layer is specifically formed by a lubricating composition which contains 100 parts by weight of a lubricating composition, or a mixture of the lubricating composition, of 70–90 wt. % of boron nitride and 10–30 wt. % of at least one of alumina and silica, and further contains not more than 200 parts by weight, preferably 50–150 parts by weight, of polytetrafluoroethylene resin.

Hereafter, a more dedetailed description will be given of the constituent materials of the above-described spherical annular seal member and the method of manufacturing the spherical annular seal member.

The heat-resistant sheet is constituted by a sheet member which is formed from heat-resistant material of at least one kind selected from expanded graphite, mica, and asbestos, and the heat-resistant coating is formed on overall surfaces of the heat-resistant sheet member. As a heat-resistant sheet formed from expanded graphite, an expanded graphite sheet having a thickness ranging from 0.3 to 1.0 mm, such as "Grafoil (trade name)" made by Union Carbide Corporation of the United States disclosed in Japanese Patent Application Publication No. 23966/1969 or "Nicafilm (trade name)" made by Nippon Carbon Co., Ltd., is suitably used. As a sheet material formed from mica, mica paper bonded by silicone resin is used, while as a sheet material formed from asbestos, an chrysotile- or amosite-based asbestos paper or asbestos sheet is used.

As the heat-resistant coating formed on the overall surfaces of the heat-resistant sheet, one of the following mixtures is used: (1) a mixture of (A) a mixture of boron carbide, a metal fluoride, and graphite and (B) aluminum phosphate; (2) a mixture of (A) a mixture of a metal boride, a metal fluoride, and graphite and (B) aluminum phosphate; (3) a mixture of (A) a mixture of boron carbide, a metal boride, a metal fluoride, and graphite and (B) aluminum phosphate;

(4) a mixture of (A) a mixture of boron carbide, a metal fluoride, a heat-resistant lubricant, and graphite and (B) aluminum phosphate; (5) a mixture of (A) a mixture of a metal boride, a metal fluoride, a heat-resistant lubricant, and graphite and (B) aluminum phosphate; and (6) a mixture of (A) a mixture of boron carbide, a metal boride, a metal fluoride, a heat-resistant lubricant, and graphite and (B) aluminum phosphate.

A specific description will be given of this heat-resistant coating.

(1) Heat-resistant Coating formed of a Mixture of (A) a Mixture of Boron Carbide, a Metal Fluoride, and Graphite and (B) Aluminum Phosphate:

The heat-resistant coating is formed of a mixture in which (A) the mixture of 5–25 wt. % of boron carbide, 1–15 wt. % of a metal fluoride, and 60–90 wt. % of graphite and (B) aluminum phosphate are mixed in a weight ratio of (A):(B)=1:0.5–3. To show an example of manufacture, a mixture, in which 7.5 g of a mixture of 10 wt. % of boron carbide, 5 wt. % of the metal fluoride, and 85 wt. % of graphite are mixed in 30 g of an aqueous solution of aluminum primary phosphate of a 25% concentration, is coated on the overall surfaces of the heat-resistant sheet by means of brushing, roller coating, immersion, or the like. The coated heat-resistant sheet is then allowed to dry. Consequently, a heat-resistant coating which is formed of the mixture of (A) and (B) and whose weight ratio is 1:1 is formed on the overall surfaces of the heat-resistant sheet.

(2) Heat-resistant Coating Formed of a Mixture of (A) a Mixture of a Metal boride, a Metal fluoride, and Graphite and (B) Aluminum Phosphate:

The heat-resistant coating is formed of a mixture in which (A) the mixture of 5–25 wt. % of a metal boride, 1–15 wt. % of a metal fluoride, and 60–90 wt. % of graphite and (B) aluminum phosphate are mixed in a weight ratio of (A):(B)=1:0.5–3. To show an example of manufacture, a mixture, in which 7.5 g of a mixture of 10 wt. % of the metal boride, 5 wt. % of the metal fluoride, and 85 wt. % of graphite are mixed in 30 g of an aqueous solution of aluminum primary phosphate of a 25% concentration, is coated on the overall surfaces of the heat-resistant sheet by means of brushing, roller coating, immersion, or the like. The coated heat-resistant sheet is then allowed to dry. Consequently, a heat-resistant coating which is formed of the mixture of (A) and (B) and whose weight ratio is 1:1 is formed on the overall surfaces of the heat-resistant sheet.

(3) Heat-resistant Coating Formed of a Mixture of (A) a Mixture of Boron Carbide, a Metal Boride, a Metal Fluoride, and Graphite and (B) Aluminum Phosphate:

The heat-resistant coating is formed of a mixture in which (A) the mixture of 5–25 wt. % of boron carbide, 5–25 wt. % of a metal boride, 1–15 wt. % of a metal fluoride, and 60–90 wt. % of graphite and (B) aluminum phosphate are mixed in a weight ratio of (A):(B)=1:0.5–3. To show an example of manufacture, a mixture, in which 7.5 g of a mixture of 10 wt. % of boron carbide, 10 wt. % of the metal boride, 5 wt. % of the metal fluoride, and 75 wt. % of graphite are mixed in 30 g of an aqueous solution of aluminum primary phosphate of a 25% concentration, is coated on the overall surfaces of the heat-resistant sheet by means of brushing, roller coating, immersion, or the like. The coated heat-resistant sheet is then allowed to dry. Consequently, a heat-resistant coating which is formed of the mixture of (A) and (B) and whose weight ratio is 1:1 is formed on the overall surfaces of the heat-resistant sheet.

(4) Heat-resistant Coating formed of a mixture of (A) a Mixture of Boron Carbide, a Metal Fluoride, a Heat-resistant Lubricant, and Graphite and (B) Aluminum Phosphate:

The heat-resistant coating is formed of a mixture in which (A) the mixture of 5–20 wt. % of boron carbide, 3–15 wt. % of a metal fluoride, 5–25 wt. % of a heat-resistant lubricant, and 50–80 wt. % of graphite and (B) aluminum phosphate are mixed in a weight ratio of (A):(B)=1:0.5–3. To show an example of manufacture, a mixture, in which 7.5 g of a mixture of 10 wt. % of boron carbide, 5 wt. % of the metal fluoride, 10 wt. % of the heat-resistant lubricant, and 75 wt. % of graphite are mixed in 30 g of an aqueous solution of aluminum primary phosphate of a 25% concentration, is coated on the overall surfaces of the heat-resistant sheet by means of brushing, roller coating, immersion, or the like. The coated heat-resistant sheet is then allowed to dry. Consequently, a heat-resistant coating which is formed of the mixture of (A) and (B) and whose weight ratio is 1:1 is formed on the overall surfaces of the heat-resistant sheet.

(5) Heat-resistant Coating Formed of a Mixture of (A) a Mixture of a Metal Boride, a Metal Fluoride, a Heat-resistant Lubricant, and Graphite and (B) Aluminum phosphate:

The heat-resistant coating is formed of a mixture in which (A) the mixture of 5–20 wt. % of a metal boride, 3–15 wt. % of a metal fluoride, 5–25 wt. % of a heat-resistant lubricant, and 50–80 wt. % of graphite and (B) aluminum phosphate are mixed in a weight ratio of (A):(B)=1:0.5–3. To show an example of manufacture, a mixture, in which 7.5 g of a mixture of 10 wt. % of the metal boride, 5 wt. % of the metal fluoride, 10 wt. % of the heat-resistant lubricant, and 75 wt. % of graphite are mixed in 30 g of an aqueous solution of aluminum primary phosphate of a 25% concentration, is coated on the overall surfaces of the heat-resistant sheet by means of brushing, roller coating, immersion, or the like. The coated heat-resistant sheet is then allowed to dry. Consequently, a heat-resistant coating which is formed of the mixture of (A) and (B) and whose weight ratio is 1:1 is formed on the overall surfaces of the heat-resistant sheet.

(6) Heat-resistant Coating Formed of a Mixture of (A) a Mixture of Boron Carbide, a Metal Boride, a Metal Fluoride, a Heat-resistant Lubricant, and Graphite and (B) Aluminum Phosphate:

The heat-resistant coating is formed of a mixture in which (A) the mixture of 5–20 wt. % of boron carbide, 5–20 wt. % of a metal boride, 3–15 wt. % of a metal fluoride, 5–25 wt. % of a heat-resistant lubricant, and 50–80 wt. % of graphite and (B) aluminum phosphate are mixed in a weight ratio of (A):(B)=1:0.5–3. To show an example of manufacture, a mixture, in which 7.5 g of a mixture of 10 wt. % of boron carbide, 10 wt. % of the metal boride, 5 wt. % of the metal fluoride, 10 wt. % of the heat-resistant lubricant, and 65 wt. % of graphite are mixed in 30 g of an aqueous solution of aluminum primary phosphate of a 25% concentration, is coated on the overall surfaces of the heat-resistant sheet by means of brushing, roller coating, immersion, or the like. The coated heat-resistant sheet is then allowed to dry. Consequently, a heat-resistant coating which is formed of the mixture of (A) and (B) and whose weight ratio is 1:1 is formed on the overall surfaces of the heat-resistant sheet.

These heat-resistant coatings of the variations (1) to (6) above are formed on the overall surfaces of the heat-resistant sheet in an amount of 0.1–0.8 g/100 cm$^2$, preferably, 0.2–0.5 g/100 cm$^2$, and with a uniform thickness. If the amount of the heat-resistant coating provided on the overall surfaces of the heat-resistant sheet is less than 0.1 g/100 cm$^2$, the uniformity of the film thickness declines, and it is impossible to sufficiently obtain a preventive effect against the high-temperature oxidation and the like of the heat-resistant sheet. On the other hand, if the amount of the heat-resistant coating exceeds 0.8 g/100 cm$^2$, not only is there no major change in the preventive effect against the high-temperature oxidation and the like of the heat-resistant sheet, but also a problem arises in the winding processing characteristic of the heat-resistant sheet member having the heat-resistant coating.

In the heat-resistant coating thus formed, aluminum phosphate itself is heat resistant, and since its adhesiveness is high, aluminum phosphate exhibits the action of enhancing the adhesiveness of particles of mixed powders including particles of the heat-resistant boron carbide powder, metal fluoride powder, and graphite powder, or particles of mixed powders including particles of these mixed powders and particles of the heat-resistant lubricant powder, the adhesiveness of particles of mixed powders including particles of the metal boride powder, metal fluoride powder, and graphite powder, or particles of mixed powders including particles of these mixed powders and particles of the heat-resistant lubricant powder, or the adhesiveness of particles of mixed powders including particles of the boron carbide powder, metal boride powder, metal fluoride powder, and graphite powder, or particles of mixed powders including particles of these mixed powders and particles of the heat-resistant lubricant powder, as well as the adhesiveness of the heat-resistant coating formed of such a material onto the surfaces of the heat-resistant sheet, i.e., the retention of the heat-resistant coating with respect to the surface of the heat-resistant sheet.

In the mixture which forms the heat-resistant coating, graphite which constitutes its major component is heat resistant itself and possesses self-lubricity. Its heat resistance is demonstrated in the inner portion of the seal member extending from the cylindrical inner surface to the outer surface formed in the shape of the partially convex spherical surface. In addition, at the outer surface formed in the shape of the partially convex spherical surface, self-lubricity in addition to heat resistance is demonstrated. As the amount in which graphite is compounded, the range of 60–90 wt. % is appropriate, and in a case where the heat-resistant lubricant is contained, the range of 50–80 wt. % is appropriate as its amount of compounding.

The metal fluoride which is compounded with graphite constituting the major component is heat resistant in the same way as graphite, and exhibits excellent self-lubricity particularly at high temperatures. The metal fluoride, if mixed with graphite, exhibits the action of further enhancing lubricity in cooperation with the self-lubricity of graphite, and and demonstrates the effect of reducing the sliding frictional resistance with a mating member (the concave spherical portion of the downstream-side exhaust pipe) at the outer surface formed in the shape of the partially convex spherical surface in cooperation with graphite. As the amount in which the metal fluoride is compounded with graphite, the range of 1–15 wt. %, particularly 5–10 wt. %, is appropriate. In a case where the heat-resistant lubricant is contained, the range of 3–15 wt. %, particularly 5–10 wt. %, is appropriate. If the compounding amount is less than 1 wt. %, or less than 3 wt. % in the case where the heat-resistant lubricant is contained, the effect of improving the lubricity of graphite is not demonstrated, whereas if the metal fluoride is compounded in an excess of 15 wt. %, the lubricity of graphite is impaired to the contrary, and the cooperative action with graphite is not demonstrated. As the metal fluoride which exhibits such action, at least one kind selected from calcium fluoride (CaF$_2$), lithium fluoride (LiF$_2$), sodium fluoride (NaF$_2$), and barium fluoride (BaF$_2$) is used.

The heat-resistant lubricant which is compounded with the aforementioned graphite and metal fluoride is heat resistant itself and exhibits lubricity. The heat-resistant lubricant demonstrates the action of further enhancing lubricity in cooperation with the lubricity of graphite and the metal fluoride. Particularly at the outer surface formed in the shape of the partially convex spherical surface, the heat-resistant lubricant demonstrates the effect of reducing the sliding frictional resistance in the friction with a mating member in cooperation with graphite and the metal fluoride. In addition, this effect serves as the effect of a die releasing agent for preventing the adhesion of the heat-resistant coating onto the surface of the die during the formation of the seal member. As the heat-resistant lubricant, at least one kind selected from talc, nonswelling natural or synthetic mica, and boron nitride is used. Since these heat-resistant lubricants have layered structures and are liable to be easily sheared in the direction of friction, the heat-resistant lubricants exhibit the aforementioned action. As the amount in which such a heat-resistant lubricant is compounded, the range of 5–25 wt. %, particularly 10–20 wt. %, is appropriate. If the amount of the heat-resistant lubricant is less than 5 wt. %, the aforementioned action is not sufficiently demonstrated, whereas if it is compounded in an amount exceeding 25 wt. %, the lubricity of graphite and the metal fluoride is impaired, and the cooperative action with graphite and the metal fluoride is not demonstrated.

The boron carbide and metal boride, which are compounded with the above-described graphite and metal fluoride, or which are compounded with these materials and the heat-resistant lubricant, possess self-lubricity themselves, so that its heat resistance is demonstrated in the inner portion of the seal member extending from the cylindrical inner surface to the outer surface formed in the shape of the partially convex spherical surface. In addition, although boron carbide and the metal boride do not exhibit self-lubricity such as that of the above-described graphite and metal fluoride, boron carbide and the metal boride, if included together with graphite and the metal fluoride, demonstrates the action of promoting the characteristic of forming a solid lubricating coating (the metal fluoride and graphite, or the metal fluoride, the heat-resistant lubricant, and graphite) on the surface of the mating member in friction with the mating member, and the action of enhancing the durability of the coating in the friction under dry conditions. Particularly at the outer surface formed in the shape of the partially convex spherical surface, this action promotes the characteristic of forming the solid lubricating coating on the surface of the mating member, enhances the durability of the coating, and contributes to the effect of reducing the frictional resistance with the mating member. As the amounts in which boron carbide and the metal boride are compounded, the range of 5–25 wt. %, particularly 10–20 wt. %, is appropriate, respectively. In a case where the heat-resistant lubricant is contained, the range of 5–20 wt. %, particularly 10–15 wt. %, is appropriate. If the compounding amount is less than 5 wt. %, the effect is not demonstrated in the above-described effect of forming the solid lubricating coating constituted of graphite and the metal fluoride. On the other hand, if boron carbide and the metal boride are compounded in excess of 25 wt. %, or in excess of 20 wt. % in the case where the heat-resistant lubricant is contained, the amount of the coating formed on the surface of the mating member from the solid lubricating coating becomes excessive, so that the action of reducing the frictional resistance is lowered to the contrary.

As the metal boride, it is possible to cite a metal boride selected from among Groups IVa, Va, and VIa of a periodic table of elements, specifically, titanium boride (TiB), titanium diboride (TiB$_2$), zirconium diboride (ZrB$_2$), zirconium dodecaboride (ZrB$_{12}$), halfnium diboride (HfB$_2$), vanadium diboride (VB$_2$), niobium diboride (NbB$_2$), tantalum diboride (TaB$_2$), chromium boride (CrB), chromium diboride (CrB$_2$), molybdenum boride (MoB), molybdenum diboride (MoB$_2$), dimolybdenum pentaboride (Mo$_2$B$_5$), tungsten boride (WB) tungsten diboride (WB$_2$), ditungsten boride (W$_2$B), ditungsten pentaboride (W$_2$B$_5$), or the like.

In the above-described heat-resistant coating, graphite and the metal fluoride, or these materials and the heat-resistant lubricant, fully demonstrate their effect of protection against the oxidation or the like of the heat-resistant sheet at a high temperature due to their heat resistance in the inner portion extending from the cylindrical inner surface to the outer surface formed in the shape of the partially convex spherical surface, and fully exhibits their self-lubricity in addition to heat resistance at the outer surface formed in the shape of the partially convex spherical surface. In addition, boron carbide and the metal boride likewise fully demonstrate their effect of protection against the oxidation or the like of the heat-resistant sheet at a high temperature due to their heat resistance in the inner portion extending from the cylindrical inner surface to the outer surface formed in the shape of the partially convex spherical surface. At the outer surface formed in the shape of the partially convex spherical surface, boron carbide and the metal boride promote, in addition to heat resistance, the characteristic of forming a coating on the surface of the mating member from the lubricating coating constituted of the metal fluoride and graphite, and fully exhibits their effect of enhancing the durability of the solid lubricating coating.

As the reinforcing material, a metal wire net is used which is formed by weaving or knitting at least one wire member including, as an iron-based wire, a stainless steel wire made of such as austenitic stainless steels SUS 304 and SUS 316, a ferritic stainless steel SUS 430, or an iron wire (JIS-G-3532) or a galvanized iron wire (JIS-G-3547), or, as a copper wire, a wire member made of a copper—nickel alloy (cupro—nickel), a copper—nickel—zinc alloy (nickel silver), brass, or beryllium copper. As the wire diameter of the fine metal wire forming the metal wire n et, a fine metal wire having a diameter of 0.10 to 0.32 mm or thereabouts is used, and a metal wire net whose meshes are 3 to 6 mm or thereabouts is suitably used.

As the outer-surface-layer forming member, one is used which is formed by a heat-resistant sheet member similar to the above-described heat-resistant sheet member having the heat-resistant coating on the overall surfaces of the heat-resistant sheet as well as a reinforcing member made from a metal wire net disposed in such a manner as to cover the heat-resistant coating of the heat-resistant sheet member. Namely, the heat-resistant sheet member has a heat-resistant coating constituted by one of the following mixtures each coated on the overall surfaces of the heat-resistant sheet: (1) a mixture of (A) a mixture of boron carbide, a metal fluoride, and graphite and (B) aluminum phosphate; (2) a mixture of (A) a mixture of a metal boride, a metal fluoride, and graphite and (B) aluminum phosphate; (3) a mixture of (A) a mixture of boron carbide, a metal boride, a metal fluoride, and graphite and (B) aluminum phosphate; (4) a mixture of (A) a mixture of boron carbide, a metal fluoride, a heat-resistant lubricant, and graphite and (B) aluminum phosphate; (5) a mixture of (A) a mixture of a metal boride, a metal fluoride, a heat-resistant lubricant, and graphite and (B) aluminum phosphate; and (6) a mixture of (A) a mixture of boron carbide, a metal boride, a metal fluoride, a heat-resistant lubricant, and graphite and (B) aluminum phosphate. Alternatively, the following outer-surface-layer forming member is used: one which is formed by a heat-resistant sheet member having the heat-resistant coating formed on the overall surfaces of the heat-resistant sheet, the surface layer formed of a lubricating composition constituted of boron nitride, or boron nitride and polytetrafluoroethylene resin, and at least one of alumina and silica, and coated on the surface of one surface of the heat resistant coating of the heat-resistant sheet member, and a reinforcing member made from a compressed metal wire net and disposed in such a manner as to cover the surface layer. The latter outer-surface-layer forming member displays an effect in reducing frictional torque during an early period of friction with a mating member. Since those similar to the above-described ones are used as the heat-resistant coating and the reinforcing member made from a metal wire net in this outer-surface-layer forming member, a description thereof will be omitted.

In the preparation of the above-described lubricating composition in the latter outer-surface-layer forming member, an aqueous dispersion containing as a solid content 20 to 50 wt. % of a lubricating composition containing 70 to 90 wt. % of boron nitride and 10 to 30 wt. % of at least one of alumina and silica is used. Alternatively, an aqueous dispersion may be used which contains as a solid content 20 to 50 wt. % of a lubricating composition in which a mixture of 70 to 90 wt. % of boron nitride and 10 to 30 wt. % of at least one of alumina and silica is set as 100 parts by weight, and which further contains polytetrafluoroethylene resin in the proportion of not more than 200 parts by weight, preferably 50 to 150 parts by weight. The above-described aqueous dispersion of the lubricating composition is coated on the surface of the heat-resistant coating formed on the surface of the heat-resistant sheet member, by means of brushing, roller coating, spraying, or the like in the manufacturing method which will be described later. In a final compression process, the lubricating composition contained in a dispersed manner is spread into a uniform and very small thickness (10 to 300 µm) on the outer surface formed in the shape of the partially convex spherical surface of the spherical annular seal member so as to form the outer surface layer.

Boron nitride among the aforementioned lubricating compositions demonstrates excellent lubricity particularly at high temperatures. However, boron nitride as a single constituent is inferior in its adhesion onto the heat-resistant coating, and, hence, in its adhesion onto the outer surface formed in the shape of the partially convex spherical surface of the seal member in the final compression process. Consequently, boron nitride as a single constituent has a drawback in that it is easily exfoliated from the outer surface formed in the shape of the partially convex spherical surface. However, by compounding at least one of alumina and silica with boron nitride at a fixed ratio, the aforementioned drawback of boron nitride can be avoided, its adhesion onto the heat-resistant coating and, hence, onto the outer surface formed in the shape of the partially convex spherical surface of the seal member in the final compression process can be improved substantially, and the retention of outer surface layer constituted of the lubricating composition on the outer surface formed in the shape of the partially convex spherical surface of the seal member can be enhanced. The proportion in which at least one of alumina and silica is compounded with respect to boron nitride is determined from the viewpoint of improving adhesion without impairing the lubricity of boron nitride, and a range of 10 to 30 wt. % is therefore preferable.

In the aforementioned lubricating composition in which the aforementioned mixture of 70 to 90 wt. % of boron nitride and 10 to 30 wt. % of at least one of alumina and silica is set as 100 parts by weight, and which further contains polytetrafluoroethylene resin at a fixed ratio, polytetrafluoroethylene resin itself has a low frictional property, and as it is compounded with the lubricating composition formed of boron nitride and at least one of alumina and silica, polytetrafluoroethylene resin exhibits the action of improving the low frictional property of the lubricating composition and the action of enhancing the ductility of the lubricating composition during compression forming. The proportion in which polytetrafluoroethylene resin is compounded with respect to 100 parts by weight of the aforementioned mixture of 70 to 90 wt. % of boron nitride and 10 to 30 wt. % of at least one of alumina and silica is not more than 200 parts by weight, preferably in the range of 50 to 150 parts by weight. If the compounding proportion of polytetrafluoroethylene resin exceeds 200 parts by weight, the proportion of the resin in the lubricating composition becomes large, thereby resulting in a decline in the heat resistance of the lubricating composition. If the compounding proportion of polytetrafluoroethylene resin is in the range of 50 to 150 parts by weight, the low frictional property can be demonstrated most satisfactorily without impairing the heat resistance of the lubricating composition.

Boron nitride, at least one of alumina and silica for forming the aqueous dispersion as well as polytetrafluoroethylene resin which may be compounded therewith are preferably in the form of as fine powders as possible, and fine powders having average particle sizes of 10 $\mu$m or less, preferably 0.5 $\mu$m or less, are used.

With the spherical annular seal member of the present invention, in its inner portion extending from the cylindrical inner surface to the outer surface formed in the shape of the partially convex spherical surface, the heat-resistant sheet member, which has the heat-resistant coating on the overall surfaces of the heat-resistant sheet, and the reinforcing member, which is constituted by the metal wire net, are intertwined with each other, and are thus arranged to be provided with structural integrity. In addition, the heat resistance of the seal member itself is enhanced. Accordingly, the spherical annular seal member of the present invention is capable of sufficiently demonstrating its function as the seal member even under a high-temperature condition of 700° C. In terms of the manufacturing method, the step of forming the heat-resistant coating on the overall surfaces of the expanded graphite sheet or the like is merely added, and the present invention does not entail a substantial change in the manufacturing process in the conventional manufacturing method. Furthermore, in the manufacturing method, since the heat-resistant lubricant is compounded in the heat-resistant coating, the heat-resistant lubricant demonstrates its role as a die releasing agent for preventing the adhesion of the heat-resistant coating onto the surface of the die during the formation of the seal member, so that the operation of removal of the seal member during and after the formation can be effected smoothly.

Next, with reference to the accompanying drawings, a description will be given of the method of manufacturing the spherical annular seal member formed of the above-described constituent materials.

DESCRIPTION OF THE PREFERRED EMBODIMENTS

Figure 3:
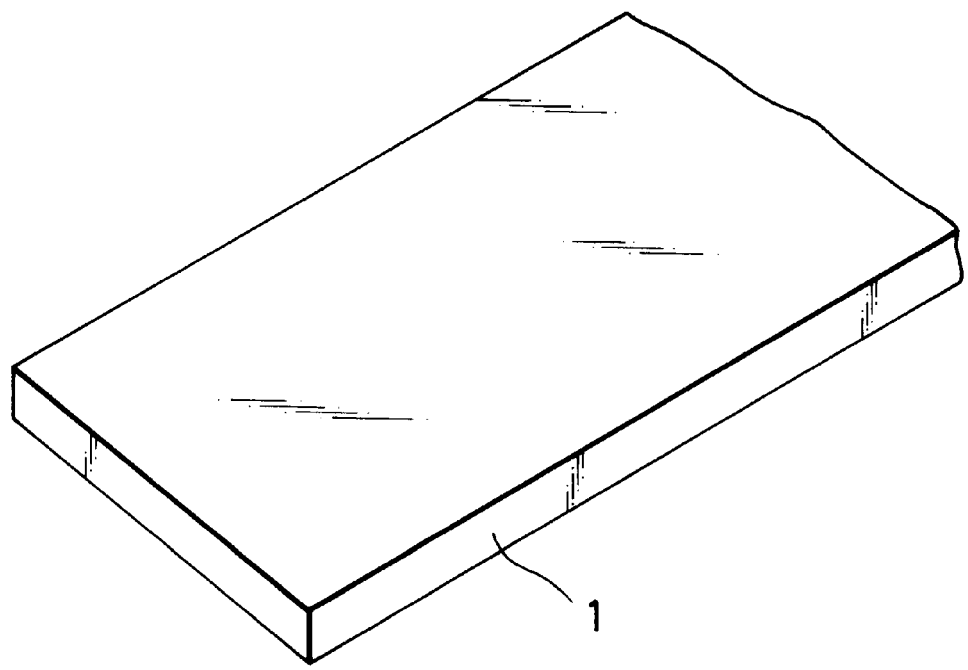
FIG. 3 is a perspective view of a heat-resistant sheet in a process of manufacturing the spherical annular seal member in accordance with the present invention.
Figure 4:
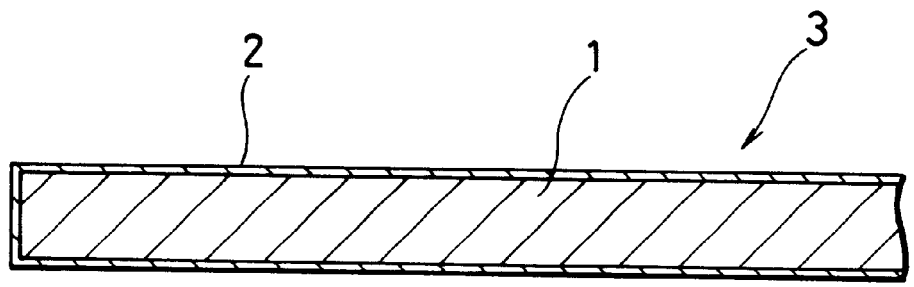
FIG. 4 is a cross-sectional view of the heat-resistant sheet member with a heat-resistant coating formed thereon in the process of manufacturing the spherical annular seal member in accordance with the present invention.

As shown in FIG. 3, a heat-resistant sheet 1 which is formed of an expanded graphite sheet, a mica sheet, or an asbestos sheet of an elongated shape cut to a predetermined width is prepared. Subsequently, one of the following mixtures is prepared: (1) a mixture in which a boron carbide powder, a metal fluoride powder, and a graphite powder are compounded in an aqueous solution of aluminum phosphate of a predetermined concentration, (2) a mixture in which a metal boride powder, a metal fluoride powder, and a graphite powder are compounded in an aqueous solution of aluminum phosphate of a predetermined concentration, (3) a mixture in which a boron carbide powder, a metal boride powder, a metal fluoride powder, and a graphite powder are compounded in an aqueous solution of aluminum phosphate of a predetermined concentration, (4) a mixture in which a boron carbide powder, a metal fluoride powder, a heat-resistant lubricant powder, and a graphite powder are compounded in an aqueous solution of aluminum phosphate of a predetermined concentration, (5) a mixture in which a metal boride powder, a metal fluoride powder, a heat-resistant lubricant powder, and a graphite powder are compounded in an aqueous solution of aluminum phosphate of a predetermined concentration, (6) a mixture in which a boron carbide powder, a metal boride powder, a metal fluoride powder, a heat-resistant lubricant powder, and a graphite powder are compounded in an aqueous solution of aluminum phosphate of a predetermined concentration. The overall surfaces of the sheet 1 are coated with this mixture by such means as brushing, roller coating, immersion, or the like, and are then allowed to dry, thereby fabricating a heat-resistant sheet member 3 in which a heat-resistant coating 2 is formed in an amount of 0.1 to 0.8 g/100 cm² and with a uniform thickness on the overall surfaces (the entire surfaces including obverse, reverse, and lateral surfaces) of the sheet 1, as shown in FIG. 4.

The heat-resistant coating 2 thus coated on the overall surfaces of the heat-resistant sheet 1 is prepared by appropriately adjusting the proportion in which the mixture of at least one of boron carbide and the metal boride, the metal fluoride, and graphite are compounded in the aqueous solution of aluminum phosphate, or the proportion in which the mixture of at least one of boron carbide and the metal boride, the metal fluoride, the heat-resistant lubricant, and graphite are compounded in the aqueous solution of aluminum phosphate, as well as the concentration of the aqueous solution of aluminum phosphate, such that the heat-resistant coating 2 is formed by one of the following mixtures: (1) a mixture in which (A) a mixture of 5–25 wt. % of boron carbide, 1–15 wt. % of the metal fluoride, and 60–90 wt. % of graphite and (B) aluminum phosphate are mixed in a weight ratio of (A):(B)=1:0.5–3; (2) a mixture in which (A) a mixture of 5–25 wt. % of the metal boride, 1–15 wt. % of the metal fluoride, and 60–90 wt. % of graphite and (B) aluminum phosphate are mixed in a weight ratio of (A): (B)=1:0.5–3; (3) a mixture in which (A) a mixture of 5–25 wt. % of boron carbide, 5–25 wt. % of the metal boride, 1–15 wt. % of the metal fluoride, and 60–90 wt. % of graphite and (B) aluminum phosphate are mixed in a weight ratio of (A):(B)=1:0.5–3; (4) a mixture in which (A) a mixture of 5–20 wt. % of boron carbide, 3–15 wt. % of the metal fluoride, 5–25 wt. % of the heat-resistant lubricant, and 50–80 wt. % of graphite and (B) aluminum phosphate are mixed in a weight ratio of (A):(B)=1:0.5–3; (5) a mixture in which (A) a mixture of 5–20 wt. % of the metal boride, 3–15 wt. % of the metal fluoride, 5–25 wt. % of the heat-resistant lubricant, and 50–80 wt. % of graphite and (B) aluminum phosphate are mixed in a weight ratio of (A):(B)=1:0.5–3; and (6) a mixture in which (A) a mixture of 5–20 wt. % of boron carbide, 5–20 wt. % of the metal boride, 3–15 wt. % of the metal fluoride, 5–25 wt. % of the heat-resistant lubricant, and 50–80 wt. % of graphite and (B) aluminum phosphate are mixed in a weight ratio of (A):(B)=1:0.5–3. Incidentally, in the above-described method of forming the heat-resistant coating 2, it is possible to use the aqueous solution of aluminum phosphate whose concentration is 10 to 50%. However, if the operation of coating the heat-resistant sheet 1, a subsequent drying process, and the like are taken into consideration, it is preferable to use aluminum phosphate whose concentration is 20 to 25% or thereabouts.

Figure 5:
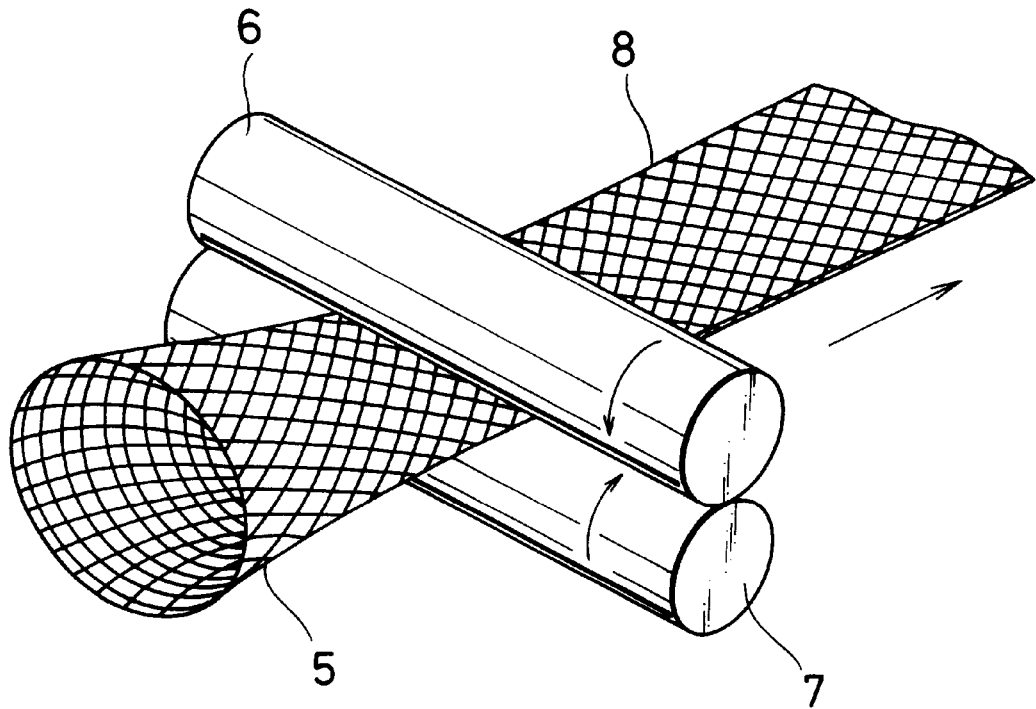
FIG. 5 is a diagram explaining the formation of a reinforcing member constituted by a metal wire net in the process of manufacturing the spherical annular seal member in accordance with the present invention.

A metal wire net, which is formed by weaving or knitting fine metal wires, is prepared, and this metal wire net is cut into a predetermined width (narrower than that of the heat-resistant sheet 1) so as to form an elongated metal wire net. Alternatively, as shown in FIG. 5, after a cylindrical metal wire net 5 is formed by knitting fine metal wires, the cylindrical metal wire net 5 is passed between a pair of rollers 6 and 7 so as to fabricate a belt-shaped metal wire net 8, which is then cut into an elongated metal wire net. Such an elongated metal wire net is used as a reinforcing member 9.

Figure 6:
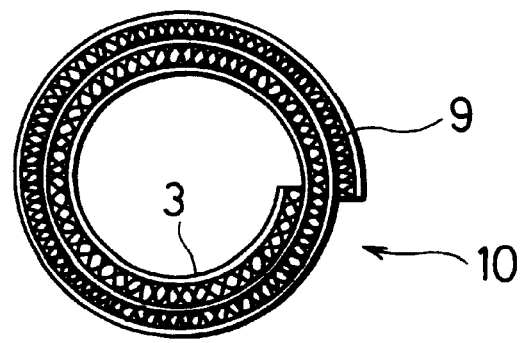
FIG. 6 is a plan view illustrating a tubular base member in the process of manufacturing the spherical annular seal member in accordance with the present invention.
Figure 7:
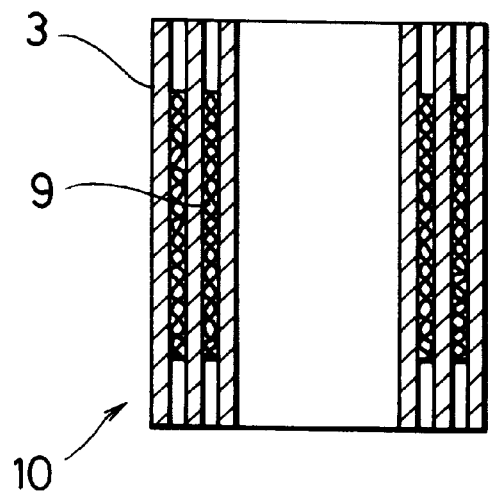
FIG. 7 is a vertical cross-sectional view illustrating the tubular base member in the process of manufacturing the spherical annular seal member in accordance with the present invention.

After the heat-resistant sheet member 3 is convoluted by a one-circumference portion, the reinforcing member 9 is superposed on the inner side of the heat-resistant sheet member 3, and the superposed assembly thereof is convoluted, or the reinforcing member 9 and the heat-resistant sheet member 3 are superposed on top of the other, and the superposed assembly thereof is convoluted with the heat-resistant sheet member 3 placed on the inner side, thereby preparing a tubular base member 10 in which the heat-resistant sheet member 3 is exposed on the inner periphery and also on the outer periphery, as shown in FIGS. 6 and 7. In this tubular base member 10, widthwise opposite end portions of the heat-resistant sheet member 3 respectively project from the reinforcing member 9 in the widthwise direction.

Figure 8:
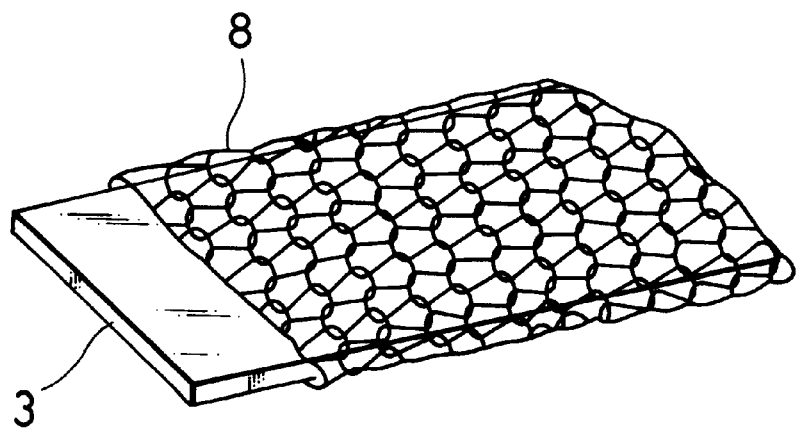
FIG. 8 is a diagram explaining a method of forming a surface-layer forming member in the process of manufacturing the spherical annular seal member in accordance with the present invention.
Figure 9:
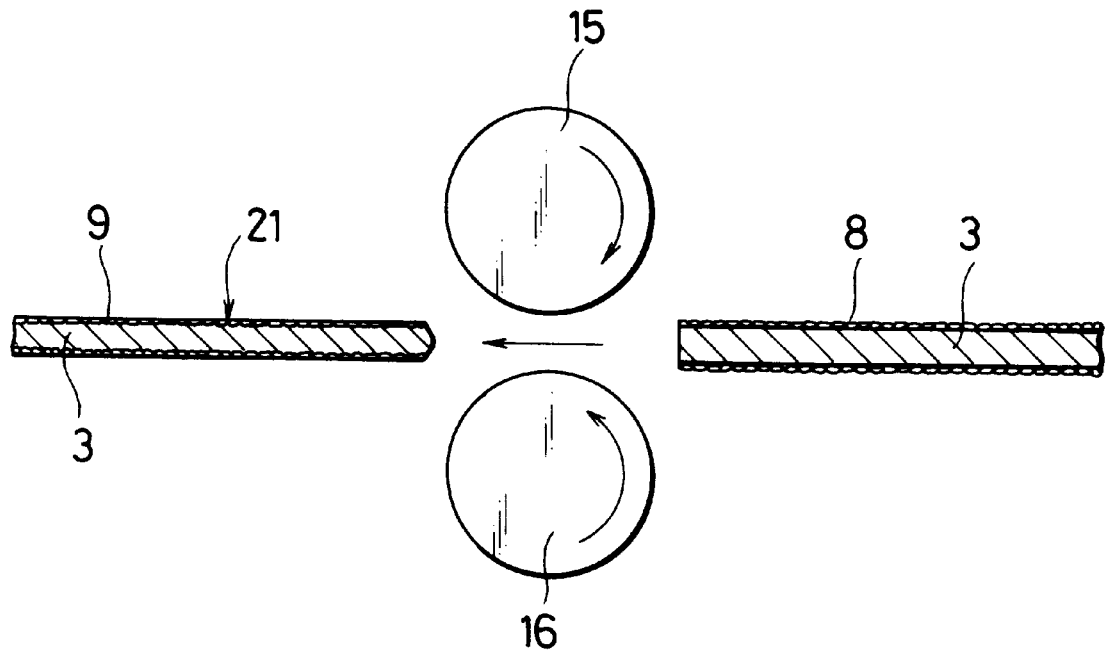
FIG. 9 is a diagram explaining a method of forming the surface-layer forming member in the process of manufacturing the spherical annular seal member in accordance with the present invention.

Another heat-resistant sheet member 3 fabricated in the same method as described above is prepared separately. As described earlier with reference to FIG. 5, after the fine metal wires are woven to form the cylindrical metal wire net 5, another reinforcing member 9 constituted by the belt-shaped metal wire net 8, which is fabricated by allowing the cylindrical metal wire net 5 to be passed between the pair of rollers 6 and 7, is prepared separately. Subsequently, as shown in FIG. 8, the heat-resistant sheet member 3 is inserted into the belt-shaped metal wire net 8, and, as shown in FIG. 9, an assembly thereof is passed between a pair of rollers 15 and 16 so as to be formed integrally, thereby preparing an outer-surface-layer forming member 21. In this case, the widthwise dimension of the heat-resistant sheet member 3 is set to be smaller than the inside dimension of the reinforcing member 9 constituted by the belt-shaped metal wire net 8. As another method of fabricating this outer-surface-layer forming member 21, it is possible to adopt a method in which at the same time as the fine metal wires are woven into the cylindrical metal wire net, the heat-resistant sheet member 3 is inserted inside it, and an assembly thereof is formed integrally by being passed between the pair of rollers 15 and 16, and is then cut into a desired size.

Figure 10:
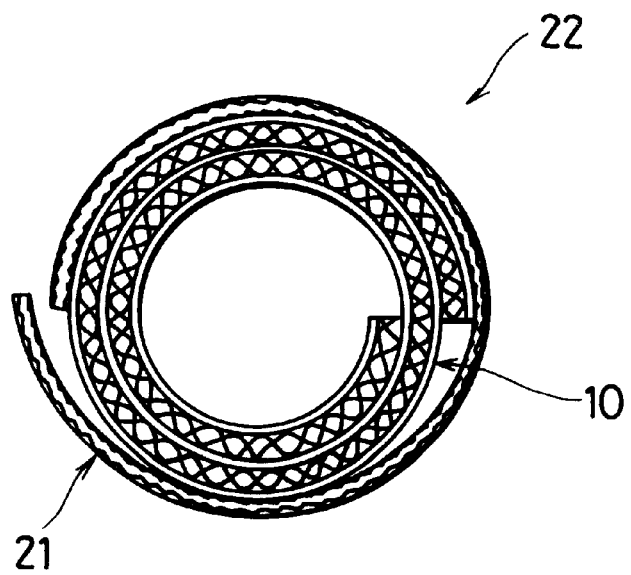
FIG. 10 is a plan view illustrating a cylindrical preform in the process of manufacturing the spherical annular seal member in accordance with the present invention.

The outer-surface-layer forming member 21 thus obtained is wound around an outer peripheral surface of the aforementioned tubular base member 10, thereby preparing a cylindrical preform 22, as shown in FIG. 10.

Figure 11:
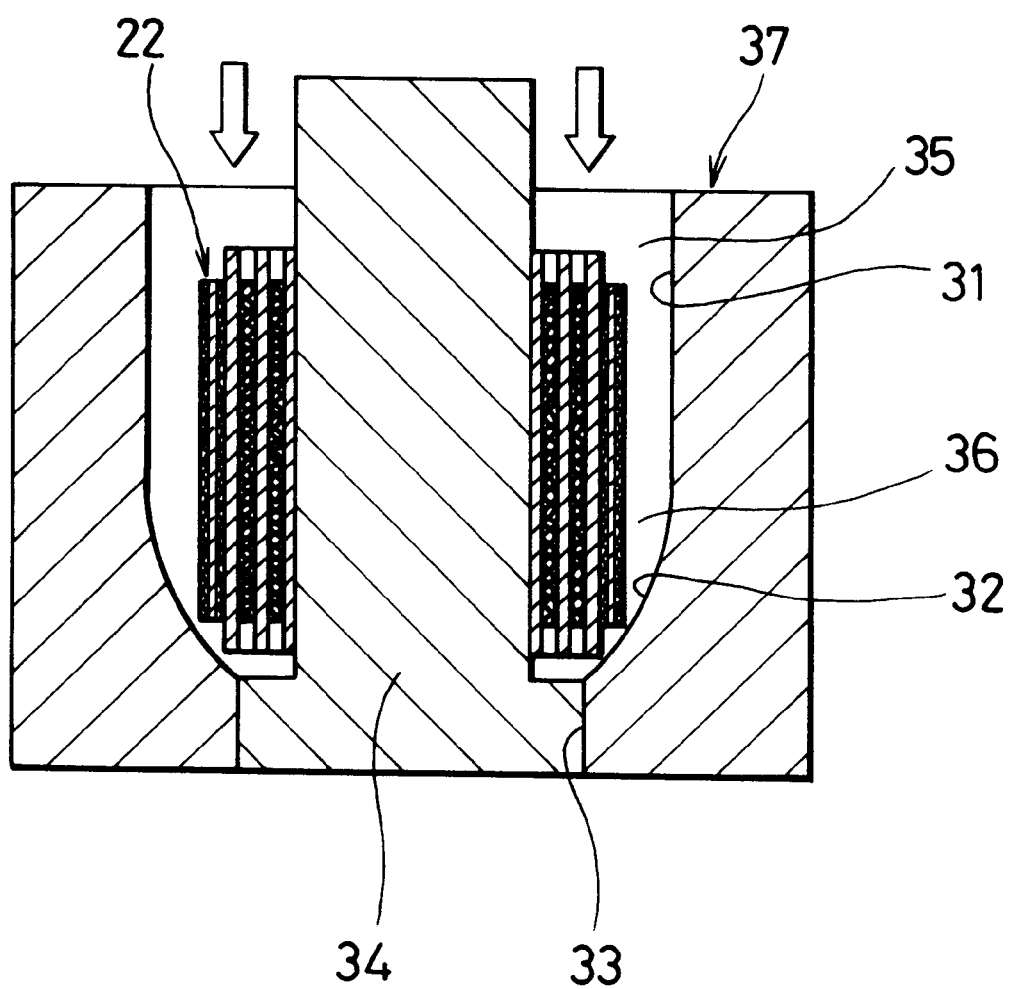
FIG. 11 is a vertical cross-sectional view illustrating a state in which the cylindrical preform is inserted in a die in the process of manufacturing the spherical annular seal member in accordance with the present invention.

As shown in FIG. 11, a die 37 is prepared which has a cylindrical inner wall surface 31, a partially concave spherical inner wall surface 32 continuing from the cylindrical inner wall surface 31, and a through hole 33 continuing from the partially concave spherical inner wall surface 32, and in which a hollow cylindrical portion 35 and a spherical annular hollow portion 36 continuing from the hollow cylindrical portion 35 are formed inside it as a stepped core 34 is inserted in the through hole 33. Then, the cylindrical preform 22 is fitted over the stepped core 34 of the die 37.

Figure 1:
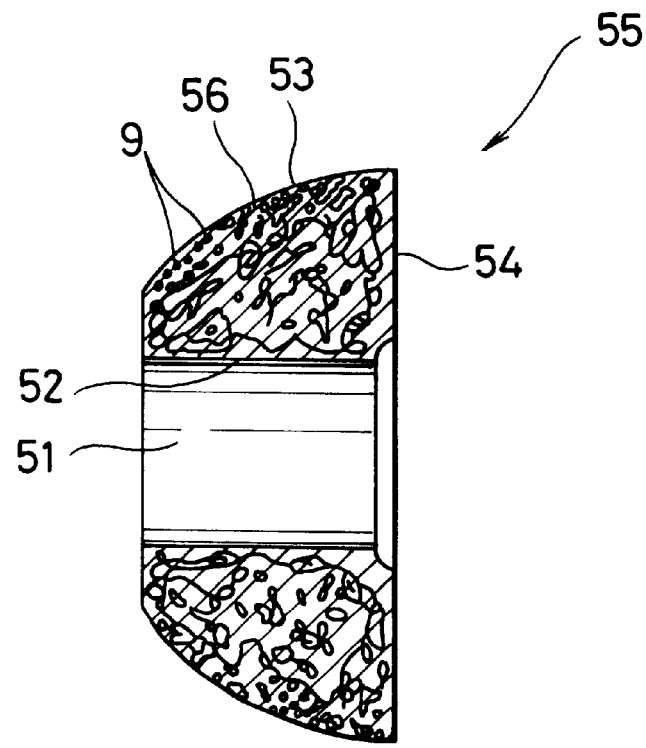
FIG. 1 is a vertical cross sectional view illustrating a spherical annular seal member in accordance with the present invention.

The cylindrical preform 22 located in the hollow portions 35 and 36 of the die 37 is subjected to compression forming under a pressure of 1 to 3 tons/cm$^2$ in the direction of the core axis. Thus, a spherical annular seal member 55 having a cylindrical inner surface 52 defining a through hole 51 in its center, an outer surface 53 formed in the shape of a partially convex spherical surface, and an annular end face 54 on the large-diameter side of the outer surface 53 is fabricated, as shown in FIG. 1. By means of this compression forming, in the inner portion of the spherical annular seal member 55 extending from the cylindrical inner surface 52 to the outer surface 53 formed in the shape of the partially convex spherical surface, the heat-resistant sheet member 3, which has the heat-resistant coating 2 on the overall surfaces of the heat-resistant sheet 1, and the reinforcing member 9, which is constituted by the metal wire net 8, are compressed and intertwined with each other, and are thus arranged to be provided with structural integrity. The outer surface 53 formed in the shape of the partially convex spherical surface is constituted by an exposed surface of an outer surface layer 56 formed of the heat-resistant coating 2, and the reinforcing member 9 constituted by the metal wire net 8, which is formed integrally with the outer surface layer 56, is disposed in the outer surface layer 56. The outer surface 53 formed in the shape of the partially convex spherical surface, where the outer surface layer 56 and the reinforcing member 9 constituted by the metal wire net 8 formed integrally with the outer surface layer 56 in mixed form are exposed, is formed into a smooth surface, while the cylindrical inner surface 52 defining the through hole 51 and the end face 54 on the large-diameter side of the spherical annular seal member 55 are formed with the heat-resistant layer constituted by the heat-resistant coating 2 exposed.

Figure 2:
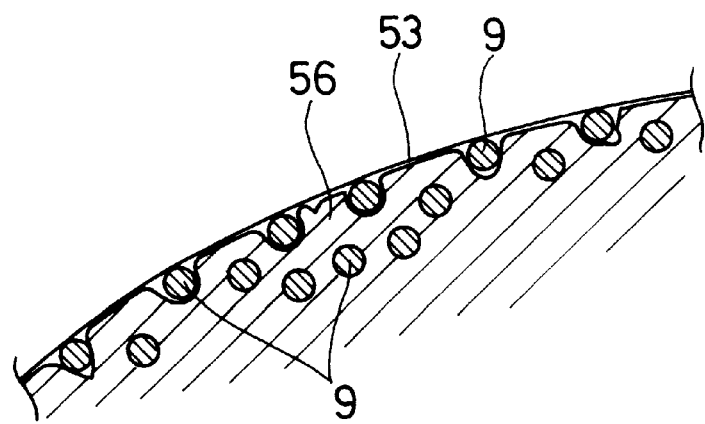
FIG. 2 is a partially enlarged cross-sectional view illustrating an outer surface, formed in the shape of a partially convex spherical surface, of the spherical annular seal member in accordance with the present invention.

In the spherical annular seal member 55 fabricated by the above-described method and shown in FIGS. 1 and 2, the heat-resistant sheet member 3 is intertwined and formed integrally with the reinforcing member 9 constituted by the metal wire net 8 which forms an internal structure, while the outer surface 53 formed in the shape of the partially convex spherical surface is formed into a smooth surface in which the exposed surface of the outer surface layer 56 constituted by the heat-resistant coating 2 formed by the outer-surface-layer forming member 21, as well as the reinforcing member 9 constituted by the metal wire net 8 are integrated in mixed form.

Next, a description will be given of another method of manufacturing the spherical annular seal member 55.

As shown in FIG. 3 referred to above, the heat-resistant sheet 1 which is formed of an expanded graphite sheet, a mica sheet, or an asbestos sheet of an elongated shape cut to a predetermined width is prepared. Subsequently, the heat-resistant coating 2 is formed in an amount of 0.1 to 0.8 g/100 cm$^2$ and with a uniform thickness on the overall surfaces (the entire surfaces including obverse, reverse, and lateral surfaces) of the heat-resistant sheet 1, thereby forming the heat-resistant sheet member 3 (FIG. 4).

The metal wire net, which is formed by weaving or knitting fine metal wires in the same way as described above, is prepared, and this metal wire net is cut into a predetermined width (narrower than that of the heat-resistant sheet 1) so as to form an elongated metal wire net. Alternatively, as shown in FIG. 5, after the cylindrical metal wire net 5 is formed by knitting fine metal wires, the cylindrical metal wire net 5 is passed between the pair of rollers 6 and 7 so as to fabricate the belt-shaped metal wire net 8, which is then cut into an elongated metal wire net. Such an elongated metal wire net is used as the reinforcing member 9.

After the heat-resistant sheet member 3 is convoluted by a one-circumference portion, the reinforcing member 9 is superposed on the inner side of the heat-resistant sheet member 3, and the superposed assembly thereof is convoluted, or the reinforcing member 9 and the heat-resistant sheet member 3 are superposed on top of the other, and the superposed assembly thereof is convoluted with the heat-resistant sheet member 3 placed on the inner side, thereby preparing the tubular base member 10 in which the heat-resistant sheet member 3 is exposed on the inner periphery and also on the outer periphery, as shown in FIGS. 6 and 7. In this tubular base member 10, widthwise opposite end portions of the heat-resistant sheet member 3 respectively project from the reinforcing member 9 in the widthwise direction.

Figure 12:
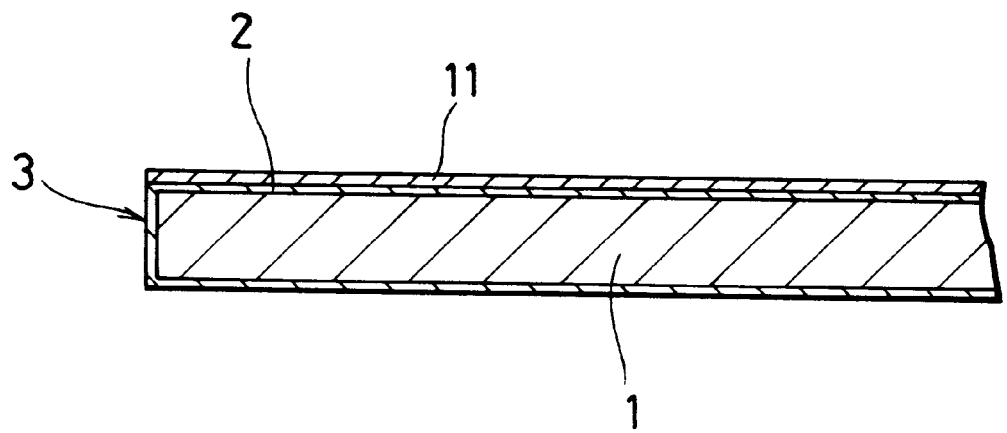
FIG. 12 is a cross-sectional view of the heat-resistant sheet member on which a surface layer constituted by a lubricating composition is formed in the process of manufacturing the spherical annular seal member in accordance with the present invention.

Another heat-resistant sheet member 3 similar to the one described above is prepared separately. Subsequently, an aqueous dispersion dispersively containing as a solid content 20 to 50 wt. % of a lubricating composition constituted of 70 to 90 wt. % of boron nitride and 10 to 30 wt. % of at least one of alumina and silica, or an aqueous dispersion dispersively containing as a solid content 20 to 50 wt. % of a lubricating composition in which a lubricating composition constituted of 70 to 90 wt. % of boron nitride and 10 to 30 wt. % of at least one of alumina and silica is set as 100 parts by weight, and which further contains polytetrafluoroethylene resin in the proportion of not more than 200 parts by weight, preferably 50–150 parts by weight, is applied to the surface of the heat-resistant coating 2 of one surface of the heat-resistant sheet member 3 by means of brushing, roller coating, spraying, or the like, and is then dried to form a surface layer 11 which is formed of the lubricating composition, as shown in FIG. 12.

Figure 13:
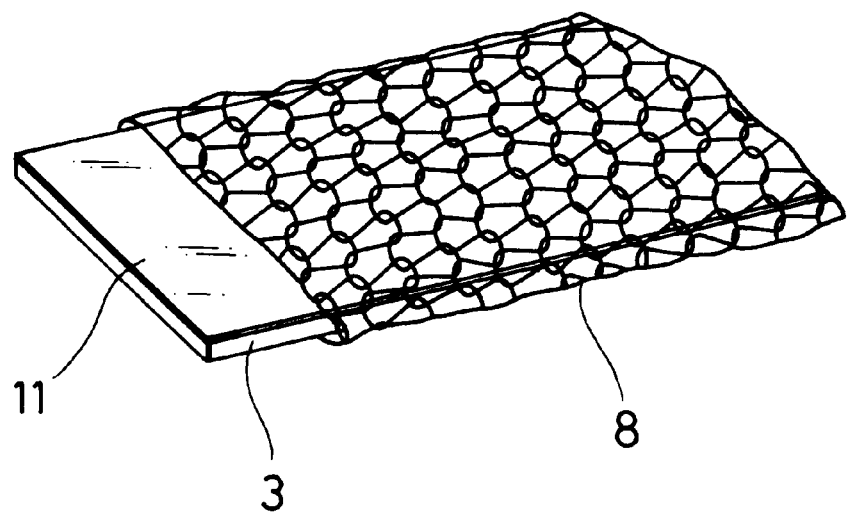
FIG. 13 is a diagram explaining a method of forming a surface-layer forming member in the process of manufacturing the spherical annular seal member in accordance with the present invention.
Figure 14:
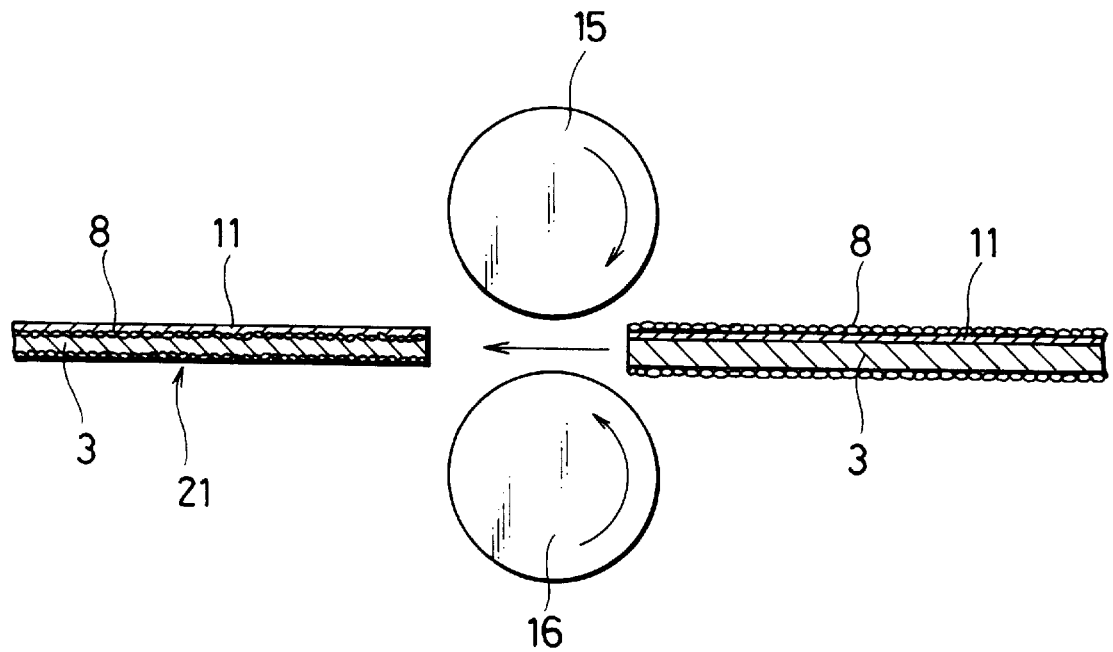
FIG. 14 is a diagram explaining a method of forming the surface-layer forming member in the process of manufacturing the spherical annular seal member in accordance with the present invention.

As described earlier with reference to FIG. 5, after the fine metal wires are woven to form the cylindrical metal wire net 5, the reinforcing member 9 constituted by the belt-shaped metal wire net 8, which is fabricated by allowing the cylindrical metal wire net 5 to be passed between the pair of rollers 6 and 7, is prepared separately. Subsequently, as shown in FIG. 13, the heat-resistant sheet member 3 having the surface layer 11 is inserted into the belt-shaped metal wire net 8, and, as shown in FIG. 14, an assembly thereof is passed between a pair of rollers 15 and 16 so as to be formed integrally, thereby preparing the outer-surface-layer forming member 21. As another method of fabricating this outer-surface-layer forming member, in the same way as described above, it is possible to adopt the method in which at the same time as the fine metal wires are woven into the cylindrical metal wire net, the heat-resistant sheet member 3 is inserted inside it, and an assembly thereof is formed integrally by being passed between the pair of rollers 15 and 16, and is then cut into a desired size.

Figure 15:
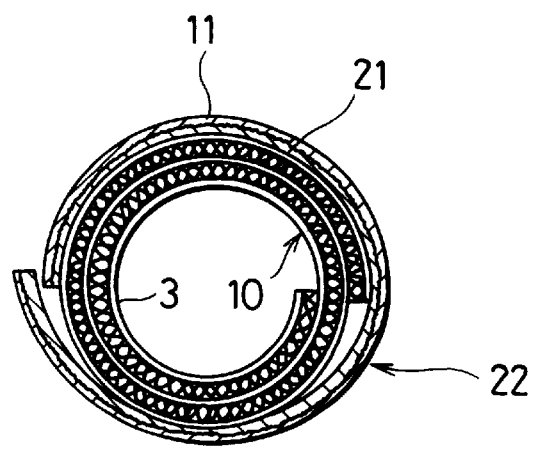
FIG. 15 is a plan view illustrating a cylindrical preform in the process of manufacturing the spherical annular seal member in accordance with the present invention.

The outer-surface-layer forming member 21 thus obtained is wound around the outer peripheral surface of the aforementioned tubular base member 10 with the surface layer 11 placed on the outer side, thereby preparing the cylindrical preform 22, as shown in FIG. 15.

Figure 16:
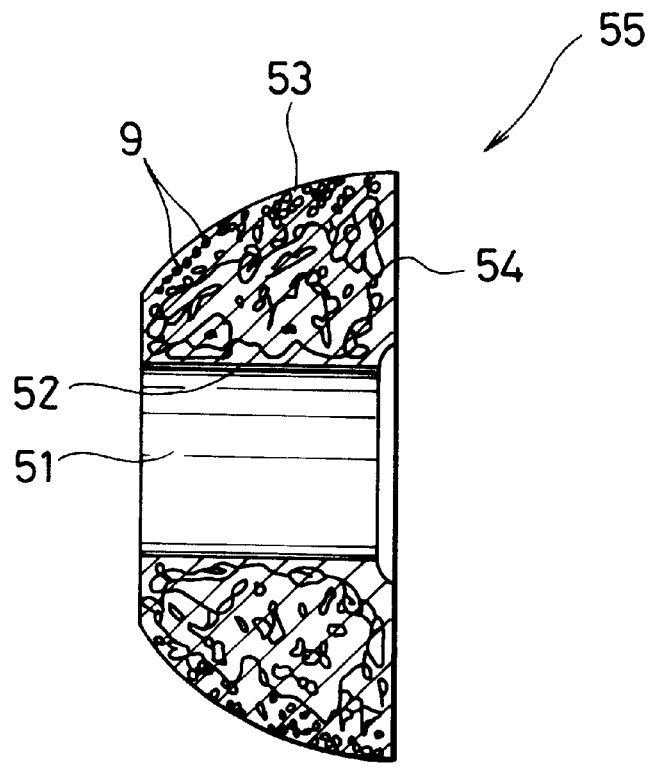
FIG. 16 is a vertical cross-sectional view illustrating the spherical annular seal member in accordance with the present invention.
Figure 17:
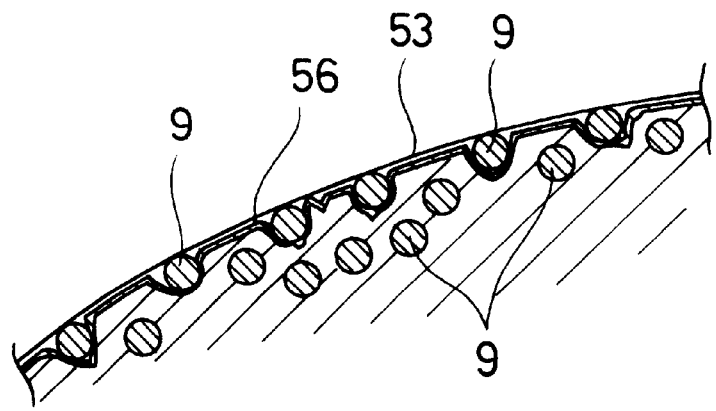
FIG. 17 is a partially enlarged cross-sectional view illustrating the outer surface, formed in the shape of the partially convex spherical surface, of the spherical annular seal member in accordance with the present invention.

The cylindrical preform 22 is subjected to compression forming using the die 37 shown in FIG. 11. Thus, the spherical annular seal member 55 having the cylindrical inner surface 52 defining the through hole 51 in its center, the outer surface 53 formed in the shape of the partially convex spherical surface, and the annular end face 54 on the large-diameter side of the outer surface 53 is fabricated, as shown in FIGS. 16 and 17. By means of this compression forming, in the inner portion of the spherical annular seal member 55 extending from the cylindrical inner surface 52 to the outer surface 53 formed in the shape of the partially convex spherical surface, the heat-resistant sheet member 3, which has the heat-resistant coating 2 on the overall surfaces of the heat-resistant sheet 1, and the reinforcing member 9, which is constituted by the metal wire net 8, are compressed and intertwined with each other, and are thus arranged to be provided with structural integrity. The outer surface 53 formed in the shape of the partially convex spherical surface is constituted by the exposed surface of the outer surface layer 56 formed by the surface layer 11 of the lubricating composition, and the reinforcing member 9 constituted by the metal wire net 8, which is formed integrally with the outer surface layer 56, is disposed in the outer surface layer 56. The outer surface 53 formed in the shape of the partially convex spherical surface, where the outer surface layer 56 and the reinforcing member 9 constituted by the metal wire net 8 formed integrally with the outer surface layer 56 in mixed form are exposed, is formed into a smooth surface, while the cylindrical inner surface 52 at the through hole 51 and the end face 54 on the large-diameter side of the outer surface 53 are formed with the heat-resistant layer constituted by the heat-resistant coating 2 exposed.

In the spherical annular seal member 55 fabricated by the above-described method and shown in FIGS. 16 and 17, the heat-resistant sheet member 3 is intertwined and formed integrally with the reinforcing member 9 constituted by the metal wire net 8 which forms an internal structure, while the outer surface 53 formed in the shape of the partially convex spherical surface is formed into a smooth surface in which the exposed surface of the outer surface layer 56 formed by the surface layer 11 of the lubricating composition formed by the outer-surface-layer forming member 21, as well as the reinforcing member 9 constituted by the metal wire net 8 are integrated in mixed form.

Figure 18:
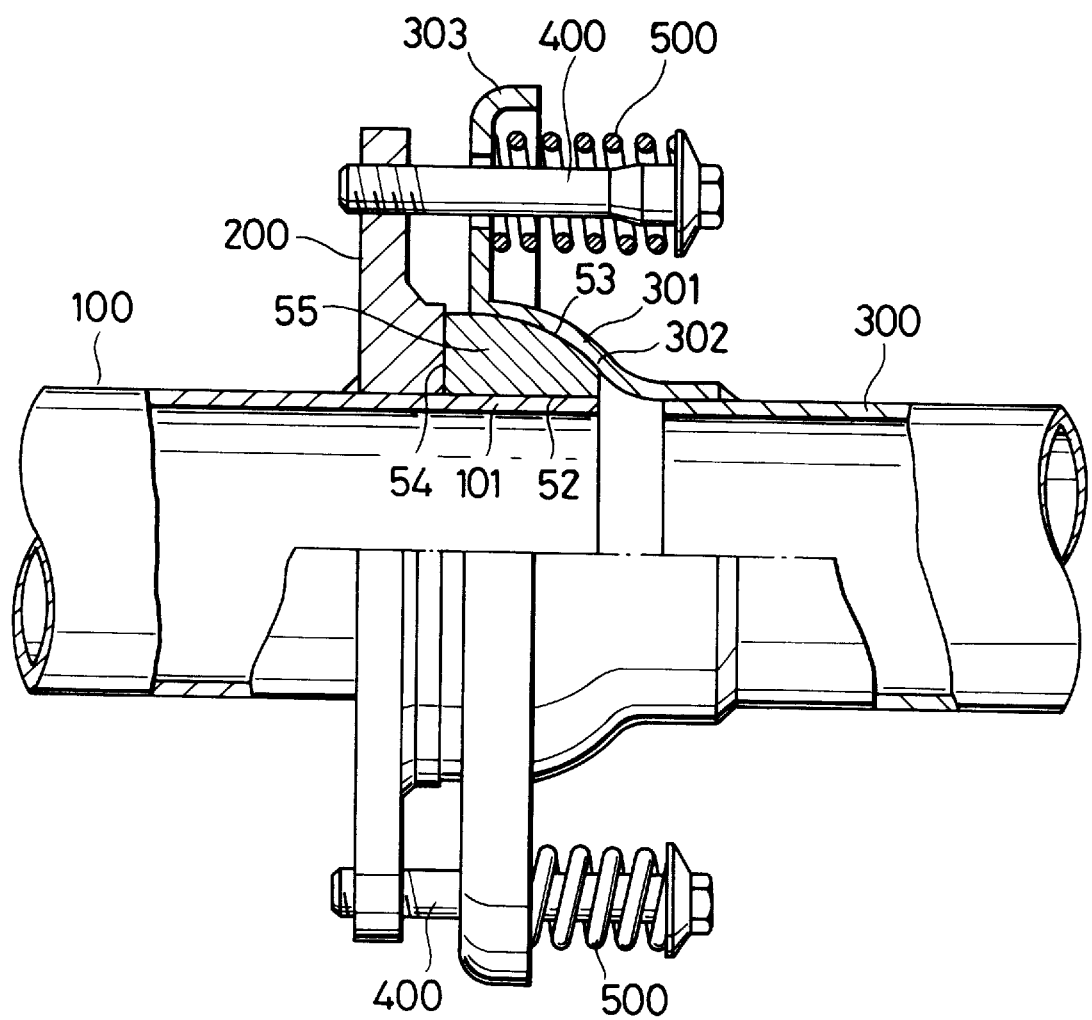
FIG. 18 is a vertical cross-sectional view of an exhaust pipe joint in which the spherical annular seal member in accordance with the present invention has been incorporated.

The spherical annular seal member 55 which is formed by the above-described method is used by being incorporated in the exhaust pipe joint shown in FIG. 18, for example. That is, a flange 200 is provided uprightly on an outer peripheral surface of an upstream-side exhaust pipe 100, which is connected to an engine, by leaving a pipe end portion 101. The spherical annular seal member 55 is fitted over the pipe end portion 101 at the cylindrical inner surface 52 defining the through hole 51, and is seated with its large-diameter-side end face 54 abutting against that flange 200. A downstream-side exhaust pipe 300 opposes at one end the upstream-side exhaust pipe 100 and is connected at the other end to a muffler. A flared portion 301, which is comprised of a concave spherical surface portion 302 and a flange portion 303 provided at a rim of an opening portion of the concave spherical surface portion 302, is formed integrally at one end of the downstream-side exhaust pipe 300. The exhaust pipe 300 is disposed with the concave spherical surface portion 302 slidingly abutting against the outer surface 53 formed in the shape of the partially convex spherical surface of the spherical annular seal member 55.

The downstream-side exhaust pipe 300 is constantly urged resiliently toward the upstream-side exhaust pipe 100 by means of a pair of bolts 400 each having one end fixed to the flange 200 and another end arranged by being inserted in the flange portion 303 of the flared portion 301, and by means of a pair of coil springs 500 each arranged between a head of the bolt 400 and the flange portion 303. The arrangement provided is such that relative angular displacements occurring in the upstream- and downstream-side exhaust pipes 100 and 300 are allowed by sliding contact between the outer surface 53 formed in the shape of the partially convex spherical surface of the spherical annular seal member 55 and the concave spherical surface portion 302 of the flared portion 301 formed at the end of the downstream-side exhaust pipe 300.

Next, a detailed description will be given of examples of the spherical annular seal member in accordance with the present invention. It should be noted that the present invention is not limited to the above-described embodiments or the following examples.

EXAMPLES

Example 1

As a heat-resistant sheet, an expanded graphite sheet ("Nicafilm (trade name)" made by Nippon Carbon Co., Ltd., the weight of the expanded graphite sheet being 11.6 g) having a width of 55 mm, a length of 550 mm, and a thickness of 0.38 mm was prepared. An aqueous solution of aluminum primary phosphate ($Al_2O_3.3P_2O_5.6H_2O$) of a 25% concentration was prepared, and 7.5 g of a mixture of powders, including 10 wt. % of boron carbide powder with an average particle size of 1.5 $\mu$m, 5 wt. % of a metal fluoride (calcium fluoride) powder with an average particle size of 4 $\mu$m, and 85 wt. % of a graphite powder with an average particle size of 18 $\mu$m, was mixed in 30 g of this aqueous solution, and a mixture was thereby obtained. The overall surfaces of the aforementioned expanded graphite sheet were coated with this mixture by roller coating, and the thus-coated expanded graphite sheet was then allowed to dry for 20 minutes at a temperature of 230° C. in a drying furnace so as to form a heat-resistant coating (the weight ratio between, on the one hand, boron carbide, calcium fluoride, and graphite and, on the other hand, aluminum phosphate being 1:1) in an amount of 0.3 g/100 $cm^2$ and with a uniform thickness on the overall surfaces of the expanded graphite sheet. The sheet thus obtained was used as the heat-resistant sheet member.

By using two austenitic stainless steel wires (SUS 304) having a wire diameter of 0.28 mm as fine metal wires, a cylindrical woven metal wire net (two-wire woven) whose meshes were 4.0 mm was fabricated and was passed between a pair of rollers to form a belt-shaped metal wire net (the weight of the metal wire net being 21 g) with a width of 36 mm and a length of 360 mm. The metal wire net thus formed was used as the reinforcing member.

After the heat-resistant sheet member was convoluted by a one-circumference portion, the reinforcing member was superposed on the inner side of the heat-resistant sheet member, and the superposed assembly thereof was convoluted, thereby preparing a tubular base member in which the heat-resistant sheet member was exposed on the inner periphery and also on the outer periphery. In this tubular base member, widthwise opposite end portions of the heat-resistant sheet member respectively projected from the reinforcing member in the widthwise direction.

As another heat-resistant sheet member, an expanded graphite sheet having a width of 48 mm, a length of 212 mm, and a thickness of 0.38 mm (the weight of the expanded graphite sheet being 3.9 g) was prepared separately. By using the aforementioned mixture and in a method similar to the one described above, a heat-resistant sheet member in which a heat-resistant coating (the weight ratio between, on the one hand, boron carbide, calcium fluoride, and graphite and, on the other hand, aluminum phosphate being 1:1) in an amount of 0.3 g/100 cm$^2$ and with a uniform thickness was formed on the overall surfaces of the expanded graphite sheet was fabricated separately.

By using a fine metal wire similar to the one described above, a cylindrical woven metal wire net whose meshes were 4.0 mm was formed, and was passed between the pair of rollers, thereby fabricating the belt-shaped metal wire net (the weight of the metal wire net being 10.0 g) with a width of 53.5 mm and a length of 212 mm. The heat-resistant sheet member was inserted into the belt-shaped metal wire net, and an assembly thereof was passed between the pair of rollers so as to be formed integrally, thereby fabricating an outer-surface-layer forming member in which the reinforcing member and the heat-resistant coating filling the meshes of the reinforcing member were present in mixed form.

This outer-surface-layer forming member was wound around an outer peripheral surface of the aforementioned tubular base member, thereby preparing a cylindrical preform. This cylindrical preform was fitted over the stepped core 34 of the die 37 shown in FIG. 11, and was placed in the hollow portion of the die 37.

The cylindrical preform located in the hollow portion of the die 37 was subjected to compression forming under a pressure of 2 tons/cm$^2$ in the direction of the core axis. Thus, the spherical annular seal member 55 was obtained which had the cylindrical inner surface 52 defining the through hole 51 in its central portion, the outer surface 53 formed in the shape of the partially convex spherical surface, and the annular end face 54. The weight ratio between, on the one hand, the heat-resistant material constituted by the expanded graphite sheet and, on the other hand, boron carbide, calcium fluoride, graphite, and aluminum phosphate for forming the heat-resistant coating in this spherical annular seal member was in the ratio of 15.8 parts of the heat-resistant coating (the mixture of 0.79 part of boron carbide, 0.39 part of calcium fluoride, and 6.72 parts of graphite: 7.9 parts; and aluminum phosphate: 7.9 parts) with respect to 100 parts of the heat-resistant material.

In the spherical annular seal member fabricated in the above-described manner, in the inner portion of the spherical annular seal member extending from the cylindrical inner surface to the outer surface formed in the shape of the partially convex spherical surface, the heat-resistant sheet member and the reinforcing member constituted by the metal wire net were compressed and intertwined with each other, and were thus arranged to be provided with structural integrity. The outer surface formed in the shape of the partially convex spherical surface was constituted by an exposed surface of the outer surface layer formed of the heat-resistant coating, and the reinforcing member constituted by the metal wire net, which was formed integrally with the outer surface layer, was disposed in the outer surface layer. The outer surface formed in the shape of the partially convex spherical surface, where the outer surface layer and the reinforcing member constituted by the metal wire net formed integrally with the outer surface layer in mixed form were exposed, was formed into a smooth surface, while a heat-resistant layer constituted by the heat-resistant coating was formed in such a manner as to be exposed at the cylindrical inner surface defining the through hole and at the end face on the large-diameter side of the outer surface.

Example 2

As a heat-resistant sheet, an expanded graphite sheet similar to the one used in the above-described Example 1 and having a width of 55 mm, a length of 550 mm, and a thickness of 0.38 mm (the weight of the expanded graphite sheet being 11.6 g) was prepared. The operation of coating the overall surfaces of this expanded graphite sheet with a mixture similar to that of Example 1 by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, calcium fluoride, and graphite and, on the other hand, aluminum phosphate being 1:1) in an amount of 0.5 g/100 cm$^2$ and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The operation of coating the overall surfaces of this expanded graphite sheet with a mixture similar to that of Example 1 by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, calcium fluoride, and graphite and, on the other hand, aluminum phosphate being 1:1) in an amount of 0.5 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was fabricated in the same method as the one used in Example 1. The weight ratio between, on the one hand, the heat-resistant material constituted by the expanded graphite sheet and, on the other hand, boron carbide, calcium fluoride, graphite, and aluminum phosphate for forming the heat-resistant coating in this spherical annular seal member was in the ratio of 26.32 parts of the heat-resistant coating (the mixture of 1.32 parts of boron carbide, 0.66 part of calcium fluoride, and 11.18 parts of graphite: 13.16 parts; and aluminum phosphate: 13.16 parts) with respect to 100 parts of the heat-resistant material.

Example 3

As a heat-resistant sheet, an expanded graphite sheet similar to the one used in the above-described Example 1 and having a width of 55 mm, a length of 550 mm, and a thickness of 0.38 mm (the weight of the expanded graphite sheet being 11.6 g) was prepared. An aqueous solution of aluminum primary phosphate of a 25% concentration was prepared, and 7.5 g of a mixture of powders, including 10 wt. % of boron carbide powder with an average particle size of 1.5 μm, 5 wt. % of a metal fluoride (lithium fluoride: LiF$_2$) powder with an average particle size of 4 μm, and 85 wt. % of a graphite powder with an average particle size of 18 μm, was mixed in 30 g of this aqueous solution, and a mixture was thereby obtained. The overall surfaces of the aforementioned expanded graphite sheet were roller coated with this mixture, and the thus-coated expanded graphite sheet was then allowed to dry for 20 minutes at a temperature of 230° C. in the drying furnace so as to form the heat-resistant coating (the weight ratio between, on the one hand, boron carbide, lithium fluoride, and graphite and, on the other hand, aluminum phosphate being 1:1) in an amount of 0.3 g/100 cm$^2$ and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The overall surfaces of the expanded graphite sheet were roller coated with the aforementioned mixture, and the thus-coated expanded graphite sheet was then allowed to dry for 20 minutes at a temperature of 230° C. in the drying furnace so as to form the heat-resistant coating (the weight ratio between, on the one hand, boron carbide, lithium fluoride, and graphite and, on the other hand, aluminum phosphate being 1:1) in an amount of 0.3 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was similarly fabricated in the same method as the one used in Example 1. The weight ratio between, on the one hand, the heat-resistant material constituted by the expanded graphite sheet and, on the other hand, boron graphite, lithium fluoride, graphite, and aluminum phosphate for forming the heat-resistant coating in this spherical annular seal member was in the ratio of 15.8 parts of the heat-resistant coating (the mixture of 0.79 part of boron carbide, 0.39 part of lithium fluoride, and 6.72 parts of graphite: 7.9 parts; and aluminum phosphate: 7.9 parts) with respect to 100 parts of the heat-resistant material.

Example 4

As a heat-resistant sheet, an expanded graphite sheet similar to the one used in the above-described Example 1 and having a width of 55 mm, a length of 550 mm, and a thickness of 0.38 mm (the weight of the expanded graphite sheet being 11.6 g) was prepared. An aqueous solution of aluminum primary phosphate of a 25% concentration was prepared, and 7.5 g of a mixture of powders, including 10 wt. % of a metal fluoride (chromium diboride) powder with an average particle size of 7 μm, 5 wt. % of a metal fluoride (calcium fluoride) powder with an average particle size of 4 μm, and 85 wt. % of graphite powder with an average particle size of 18 μm, was mixed in 30 g of this aqueous solution, and a mixture was thereby obtained. The overall surfaces of this expanded graphite sheet were roller coated with this mixture, and the thus-coated expanded graphite sheet was then allowed to dry for 20 minutes at a temperature of 230° C. in the drying furnace so as to form the heat-resistant coating (the weight ratio between, on the one hand, chromium diboride, calcium fluoride, and graphite and, on the other hand, aluminum phosphate being 1:1) in an amount of 0.3 g/100 cm$^2$ and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The overall surfaces of this expanded graphite sheet were roller coated with the aforementioned mixture, and the thus-coated expanded graphite sheet was then allowed to dry for 20 minutes at a temperature of 230° C. in the drying furnace so as to form the heat-resistant coating (the weight ratio between, on the one hand, chromium diboride, calcium fluoride, and graphite and, on the other hand, aluminum phosphate being 1:1) in an amount of 0.3 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was fabricated in the same method as the one used in Example 1. The weight ratio between, on the one hand, the heat-resistant material constituted by the expanded graphite sheet and, on the other hand, chromium diboride, calcium fluoride, graphite, and aluminum phosphate for forming the heat-resistant coating in this spherical annular seal member was in the ratio of 15.8 parts of the heat-resistant coating (the mixture of 0.79 part of chromium diboride, 0.39 part of calcium fluoride and 6.72 parts of graphite: 7.9 parts; and aluminum phosphate: 7.9 parts) with respect to 100 parts of the heat-resistant material.

Example 5

As a heat-resistant sheet, an expanded graphite sheet similar to the one used in the above-described Example 1 and having a width of 55 mm, a length of 550 mm, and a thickness of 0.38 mm (the weight of the expanded graphite sheet being 11.6 g) was prepared. An aqueous solution of aluminum primary phosphate of a 25% concentration was prepared, and 7.5 g of a mixture of powders, including 10 wt. % of a metal boride (molybdenum diboride: MoB$_2$) powder with an average particle size of 7 μm, 5 wt. % of a metal fluoride (lithium fluoride) powder with an average particle size of 4 μm, and 85 wt. % of a graphite powder with an average particle size of 18 μm, was mixed in 30 g of this aqueous solution, and a mixture was thereby obtained. The overall surfaces of this expanded graphite sheet were roller coated with this mixture, and the thus-coated expanded graphite sheet was then allowed to dry for 20 minutes at a temperature of 230° C. in the drying furnace so as to form the heat-resistant coating (the weight ratio between, on the one hand, molybdenum diboride, lithium fluoride, and graphite and, on the other hand, aluminum phosphate being 1:1) in an amount of 0.3 g/100 cm$^2$ and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The overall surfaces of this expanded graphite sheet were roller coated with the aforementioned mixture, and the thus-coated expanded graphite sheet was then allowed to dry for 20 minutes at a temperature of 230° C. in the drying furnace so as to form the heat-resistant coating (the weight ratio between, on the one hand, molybdenum diboride, lithium fluoride, and graphite and, on the other hand, aluminum phosphate being 1:1) in an amount of 0.3 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was fabricated in the same method as the one used in Example 1. The weight ratio between, on the one hand, the heat-resistant material constituted by the expanded graphite sheet and, on the other hand, molybdenum diboride, lithium fluoride, graphite, and aluminum phosphate for forming the heat-resistant coating in this spherical annular seal member was in the ratio of 15.8 parts of the heat-resistant coating (the mixture of 0.79 part of molybdenum diboride, 0.39 part of lithium fluoride, and 6.72 parts of graphite: 7.9 parts; and aluminum phosphate: 7.9 parts) with respect to 100 parts of the heat-resistant material.

Example 6

As a heat-resistant sheet, an expanded graphite sheet similar to the one used in the above-described Example 1 and having a width of 55 mm, a length of 550 mm, and a thickness of 0.38 mm (the weight of the expanded graphite sheet being 11.6 g) was prepared. An aqueous solution of aluminum primary phosphate of a 25% concentration was prepared, and 7.5 g of a mixture of powders, including 10 wt. % of a boron carbide powder with an average particle size of 1.5 μm, 15 wt. % of a metal boride (chromium diboride) powder with an average particle size of 7 μm, 5 wt. % of a metal fluoride (calcium fluoride) powder with an average particle size of 4 μm, and 70 wt. % of a graphite powder with an average particle size of 18 μm, was mixed in 30 g of this aqueous solution, and a mixture was thereby obtained. The overall surfaces of this expanded graphite sheet was roller coated with this mixture, and the thus-coated expanded graphite sheet was then allowed to dry for 20 minutes at a temperature of 230° C. in the drying furnace so as to form the heat-resistant coating (the weight ratio between, on the one hand, boron carbide, chromium diboride, calcium fluoride, and graphite and, on the other hand, aluminum phosphate being 1:1) in an amount of 0.3 g/100 cm$^2$ and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The overall surfaces of this expanded graphite sheet was roller coated with the aforementioned mixture, and the thus-coated expanded graphite sheet was then allowed to dry for 20 minutes at a temperature of 230° C. in the drying furnace so as to form the heat-resistant coating (the weight ratio between, on the one hand, boron carbide, chromium diboride, calcium fluoride, and graphite and, on the other hand, aluminum phosphate being 1:1) in an amount of 0.3 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was fabricated in the same method as the one used in Example 1. The weight ratio between, on the one hand, the heat-resistant material constituted by the expanded graphite sheet and, on the other hand, boron carbide, chromium diboride, calcium fluoride, graphite, and aluminum phosphate for forming the heat-resistant coating in this spherical annular seal member was in the ratio of 15.8 parts of the heat-resistant coating (the mixture of 0.79 part of boron carbide, 1.19 parts of chromium diboride, 0.39 part of calcium fluoride, and 5.53 parts of graphite: 7.9 parts; and aluminum phosphate: 7.9 parts) with respect to 100 parts of the heat-resistant material.

Example 7

As a heat-resistant sheet, an expanded graphite sheet similar to the one used in the above-described Example 1 and having a width of 55 mm, a length of 550 mm, and a thickness of 0.38 mm (the weight of the expanded graphite sheet being 11.6 g) was prepared. The operation of coating the overall surfaces of this expanded graphite sheet with a mixture similar to the one used in the above-described Example 6 by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, chromium diboride, calcium fluoride, and graphite and, on the other hand, aluminum phosphate being 1:1) in an amount of 0.5 g/100 cm$^2$ and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The operation of coating the overall surfaces of this expanded graphite sheet with a mixture similar to the one used in the above-described Example 6 by roller coating was repeated twice, and the thus-coated expanded graphite sheet was then allowed to dry for 20 minutes at a temperature of 230° C. in the dry ing furnace so as to form the heat-resistant coating (the weight ratio between, on the one hand, boron carbide, chromium diboride, calcium fluoride, and graphite and, on the other hand, aluminum phosphate being 1:1) in an amount of 0.5 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was fabricated in the same method as the one used in Example 1. The weight ratio between, on the one hand, the heat-resistant material constituted by the expanded graphite sheet and, on the other hand, boron carbide, chromium diboride, calcium fluoride, graphite, and aluminum phosphate for forming the heat-resistant coating in this spherical annular seal member was in the ratio of 26.32 parts of the heat-resistant coating (the mixture of 1.32 parts of boron carbide, 1.97 parts of chromium diboride, 0.66 part of calcium fluoride, and 9.21 parts of graphite: 13.16 parts; and aluminum phosphate: 13.16 parts) with respect to 100 parts of the heat-resistant material.

Example 8

As a heat-resistant sheet, an expanded graphite sheet similar to the one used in the above-described Example 1 and having a width of 55 mm, a length of 550 mm, and a thickness of 0.38 mm (the weight of the expanded graphite sheet being 11.6 g) was prepared. An aqueous solution of aluminum primary phosphate of a 25% concentration was prepared, and 7.5 g of a mixture of powders, including 10 wt. % of a boron carbide powder with an average particle size of 1.5 $\mu$m, 10 wt. % of a metal boride (molybdenum diboride) powder with an average particle size of 7 $\mu$m, 5 wt. % of a metal fluoride (calcium fluoride) powder with an average particle size of 4 $\mu$m, and 75 wt. % of a graphite powder with an average particle size of 18 $\mu$m, was mixed in 30 g of this aqueous solution, and a mixture was thereby obtained. The operation of coating the overall surfaces of this expanded graphite sheet with this mixture by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, molybdenum diboride, calcium fluoride, and graphite and, on the other hand, aluminum phosphate being 1:1) in an amount of 0.5 g/100 cm$^2$ and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The operation of coating the overall surfaces of this expanded graphite sheet with the aforementioned mixture by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, molybdenum diboride, calcium fluoride, and graphite and, on the other hand, aluminum phosphate being 1:1) in an amount of 0.5 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was fabricated in the same method as the one used in Example 1. The weight ratio between, on the one hand, the heat-resistant material constituted by the expanded graphite sheet and, on the other hand, boron carbide, molybdenum diboride, calcium fluoride, graphite, and aluminum phosphate for forming the heat-resistant coating in this spherical annular seal member was in the ratio of 26.32 parts of the heat-resistant coating (the mixture of 1.32 parts of boron carbide, 1.32 parts of molybdenum diboride, 0.66 part of calcium fluoride, and 9.87 parts of graphite: 13.16 parts; and aluminum phosphate: 13.16 parts) with respect to 100 parts of the heat-resistant material.

Example 9

A tubular base member similar to that of the above-described Example 7 was fabricated.

As another heat-resistant sheet, an expanded graphite sheet having a width of 48 mm, a length of 212 mm, and a thickness of 0.38 mm (the weight of the expanded graphite sheet being 3.9 g) was prepared separately. The operation of coating the overall surfaces of this expanded graphite sheet with the mixture of the above-described Example 1 by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, calcium fluoride, and graphite and, on the other hand, aluminum phosphate being 1:1) in an amount of 0.5 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was fabricated in the same method as the one used in Example 1. The weight ratio between, on the one hand, the heat-resistant material constituted by the expanded graphite sheet and, on the other hand, boron carbide, chromium diboride, calcium fluoride, graphite, and aluminum phosphate for forming the heat-resistant coating in this spherical annular seal member was in the ratio of 26.32 parts of the heat-resistant coating (the mixture of 1.32 parts of boron carbide, 1.45 parts of chromium diboride, 0.66 part of calcium fluoride, and 9.73 parts of graphite: 13.16 parts; and aluminum phosphate: 13.16 parts) with respect to 100 parts of the heat-resistant material.

In the spherical annular seal member fabricated in the above-described manner, in the inner portion of the spherical annular seal member extending from the cylindrical inner surface to the outer surface formed in the shape of the partially convex spherical surface, the heat-resistant sheet member having on the overall surfaces of the heat-resistant sheet the heat-resistant coating formed of boron carbide, chromium diboride, calcium fluoride, graphite, and aluminum phosphate, as well as the reinforcing member constituted by the metal wire net, were compressed and intertwined with each other, and were thus arranged to be provided with structural integrity. The outer surface formed in the shape of the partially convex spherical surface was constituted by an exposed surface of the outer surface layer formed of the heat-resistant coating, and the reinforcing member constituted by the metal wire net, which was formed integrally with the outer surface layer, was disposed in the outer surface layer. The outer surface formed in the shape of the partially convex spherical surface, where the outer surface layer and the reinforcing member constituted by the metal wire net formed integrally with the outer surface layer in mixed form were exposed, was formed into a smooth surface, while a heat-resistant layer constituted by the heat-resistant coating formed of the heat-resistant coating was formed in such a manner as to be exposed at the cylindrical inner surface defining the through hole and at the end face on the large-diameter side of the outer surface.

Example 10

A tubular base member similar to that of the above-described Example 2 was fabricated.

As another heat-resistant sheet, an expanded graphite sheet having a width of 48 mm, a length of 212 mm, and a thickness of 0.38 mm (the weight of the expanded graphite sheet being 3.9 g) was prepared separately. By using a mixture similar to that of the above-described Example 1 and in a method similar to that of the above-described Example 2, a heat-resistant sheet member was separately fabricated in which a heat-resistant coating (the weight ratio between, on the one hand, boron carbide, calcium fluoride, and graphite and, on the other hand, aluminum phosphate being 1:1) in an amount of 0.5 g/100 cm$^2$ and with a uniform thickness was formed on the overall surfaces of the expanded graphite sheet.

An aqueous dispersion (25.5 wt. % of boron nitride, 4.5 wt. % of alumina, and 70 wt. % of water) dispersively containing as a solid content 30 wt. % of a lubricating composition constituted of 85 wt. % of boron nitride powder with an average particle size of 7 μm and 15 wt. % of alumina powder with an average particle size of 0.6 μm, was applied to the surface of the heat-resistant coating on one surface of the heat-resistant sheet member by means of roller coating, and was then dried. This coating operation was repeated three times to form the outer surface layer of the lubricating composition. Subsequently, the outer-surface-layer forming member was fabricated in the same way as in Example 1.

Subsequently, the spherical annular seal member was fabricated in the same method as the one used in Example 1. The weight ratio between, on the one hand, the heat-resistant material constituted by the expanded graphite sheet and, on the other hand, boron carbide, calcium fluoride, graphite, and aluminum phosphate for forming the heat-resistant coating in this spherical annular seal member was in the ratio of 26.32 parts of the heat-resistant coating (the mixture of 1.32 parts of boron carbide, 0.66 part of calcium fluoride, and 11.18 parts of graphite: 13.16 parts; and aluminum phosphate: 13.16 parts) with respect to 100 parts of the heat-resistant material.

In the spherical annular seal member fabricated in the above-described manner, in the inner portion of the spherical annular seal member extending from the cylindrical inner surface to the outer surface formed in the shape of the partially convex spherical surface, the heat-resistant sheet member having the heat-resistant coating on the overall surfaces of the expanded graphite sheet, as well as the reinforcing member constituted by the metal wire net, were compressed and intertwined with each other, and were thus arranged to be provided with structural integrity. The outer surface formed in the shape of the partially convex spherical surface was constituted by an exposed surface of the outer surface layer formed of the surface layer of the lubricating composition, and the reinforcing member constituted by the metal wire net, which was formed integrally with the outer surface layer, was disposed in the outer surface layer. The outer surface formed in the shape of the partially convex spherical surface, where the outer surface layer and the reinforcing member constituted by the metal wire net formed integrally with the outer surface layer in mixed form were exposed, was formed into a smooth surface, while a heat-resistant layer constituted by the heat-resistant coating was formed in such a manner as to be exposed at the cylindrical inner surface defining the through hole and at the end face on the large-diameter side of the outer surface formed in the shape of the partially convex spherical surface.

Example 11

A tubular base member similar to that of the above-described Example 6 was fabricated.

As another heat-resistant sheet, an expanded graphite sheet having a width of 48 mm, a length of 212 mn, and a thickness of 0.38 mm (the weight of the expanded graphite sheet being 3.9 g) was prepared separately. In the same way as in the above-described Example 6, a heat-resistant sheet member was separately fabricated in which a heat-resistant coating (the weight ratio between, on the one hand, boron carbide, chromium diboride, calcium fluoride, and graphite and, on the other hand, aluminum phosphate being 1:1) in an amount of 0.3 g/100 cm$^2$ and with a uniform thickness was formed on the overall surfaces of the expanded graphite sheet.

An aqueous dispersion (17 wt. % of boron nitride, 10 wt. % of alumina, 10 wt. % of polytetrafluoroethylene resin, and 70 wt. % of water) dispersively containing as a solid content 30 wt. % of a lubricating composition (56.7 wt. % of boron nitride, 10 wt. % of alumina, and 33.3 wt. % of polytetrafluoroethylene resin), in which a mixture constituted of 85 wt. % of boron nitride powder with an average particle size of 7 μm and 15 wt. % of alumina powder with an average particle size of 0.6 μm was set as 100 parts by weight, and which further contained 50 parts by weight of polytetrafluoroethylene resin powder with an average particle size of 0.3 μm, was applied to the surface of the heat-resistant coating on one surface of the heat-resistant sheet member by means of roller coating, and was then dried. This coating operation was repeated three times to form the surface layer of the lubricating composition. Subsequently, the outer-surface-layer forming member was fabricated in the same way as in Example 1.

Subsequently, the spherical annular seal member was fabricated in the same method as the one used in Example 1. The weight ratio between, on the one hand, the heat-resistant material constituted by the expanded graphite sheet and, on the other hand, boron carbide, chromium diboride, calcium fluoride, graphite, and aluminum phosphate for forming the heat-resistant coating in this spherical annular seal member was in the ratio of 15.8 parts of the heat-resistant coating (the mixture of 0.79 part of boron carbide, 1.19 parts of chromium diboride, 0.39 part of calcium fluoride, and 5.53 parts of graphite: 7.9 parts; and aluminum phosphate: 7.9 parts) with respect to 100 parts of the heat-resistant material.

In the spherical annular seal member fabricated in the above-described manner, in the inner portion of the spherical annular seal member extending from the cylindrical inner surface to the outer surface formed in the shape of the partially convex spherical surface, the heat-resistant sheet member having the heat-resistant coating on the overall surfaces of the heat-resistant sheet, as well as the reinforcing member constituted by the metal wire net, were compressed and intertwined with each other, and were thus arranged to be provided with structural integrity. The outer surface formed in the shape of the partially convex spherical surface was constituted by an exposed surface of the outer surface layer formed of the surface layer of the lubricating composition, and the reinforcing member constituted by the metal wire net, which was formed integrally with the outer surface layer, was disposed in the outer surface layer. The outer surface formed in the shape of the partially convex spherical surface, where the outer surface layer and the reinforcing member constituted by the metal wire net formed integrally with the outer surface layer in mixed form were exposed, was formed into a smooth surface, while a heat-resistant layer constituted by the heat-resistant coating was formed in such a manner as to be exposed at the cylindrical inner surface defining the through hole and at the end face on the large-diameter side of the outer surface formed in the shape of the partially convex spherical surface.

Example 12

A tubular bas e member similar to that of the above-described Example 7 was fabricated.

As another heat-resistant sheet, an expanded graphite sheet having a width of 48 mm, a length of 212 mm, and a thickness of 0.38 mm (the weight of the expanded graphite sheet being 3.9 g) was prepared separately. In the same way as in the above-described Example 7, a heat-resistant sheet member was separately fabricated in which a heat-resistant coating (the weight ratio between, on the one hand, boron carbide, chromium diboride, calcium fluoride, and graphite and, on the other hand, aluminum phosphate being 1:1) in an amount of 0.5 g/100 cm$^2$ and with a uniform thickness was formed on the overall surfaces of the expanded graphite sheet.

An aqueous dispersion (17 wt. % of boron nitride, 10 wt. % of alumina, 10 wt. % of polytetrafluoroethylene resin, and 70 wt. % of water) dispersively containing as a solid content 30 wt. % of a lubricating composition (56.7 wt. % of boron nitride, 10 wt. % of alumina, and 33.3 wt. % of polytetrafluoroethylene resin), in which a mixture constituted of 85 wt. % of boron nitride powder with an average particle size of 7 $\mu$m and 15 wt. % of alumina powder with an average particle size of 0.6 $\mu$m was set as 100 parts by weight, and which further contained 50 parts by weight of polytetrafluoroethylene resin powder with an average particle size of 0.3 $\mu$m, was applied to the surface of the heat-resistant coating on one surface of the heat-resistant sheet member by means of roller coating, and was then dried. This coating operation was repeated three times to form the surface layer of the lubricating composition. Subsequently, the outer-surface-layer forming member was fabricated in the same way as in Example 1.

Subsequently, the spherical annular seal member was fabricated in the same method as the one used in Example 1. The weight ratio between, on the one hand, the heat-resistant material constituted by the expanded graphite sheet and, on the other hand, boron carbide, chromium diboride, calcium fluoride, graphite, and aluminum phosphate for forming the heat-resistant coating in this spherical annular seal member was in the ratio of 26.32 parts of the heat-resistant coating (the mixture of 1.32 parts of boron carbide, 1.97 parts of chromium diboride, 0.66 part of calcium fluoride, and 9.21 parts of graphite: 13.16 parts; and aluminum phosphate: 13.16 parts) with respect to 100 parts of the heat-resistant material.

Example 13

An expanded graphite sheet and an aqueous solution of aluminum primary phosphate which were similar to those used in the above-described Example 1 were prepared. Then, 7.5 g of a mixture of powders, including 10 wt. % of boron carbide powder with an average particle size of 1.5 $\mu$m, 5 wt. % of a metal fluoride (calcium fluoride) powder with an average particle size of 4 $\mu$m, 10 wt. % of a heat-resistant lubricant (talc) powder with an average particle size of 20 $\mu$m, and 75 wt. % of a graphite powder with an average particle size of 18 $\mu$m, was mixed in 30 g of this aqueous solution, and a mixture was thereby obtained. The overall surfaces of the aforementioned expanded graphite sheet were roller coated with this mixture, and the thus-coated expanded graphite sheet was then allowed to dry for 20 minutes at a temperature of 230° C. in the drying furnace so as to form the heat-resistant coating (the weight ratio between, on the one hand, boron carbide, calcium fluoride, talc, and graphite and, on the other hand, aluminum phosphate being 1:1) in an amount of 0.3 g/100 cm$^2$ and with a uniform thickness on the overall surfaces of the expanded graphite sheet. The sheet thus obtained was used as the heat-resistant sheet member. In addition, a reinforcing member and a tubular base member were fabricated separately in the same way as in Example 1.

Another expanded graphite sheet similar to that of the above-described Example 1 was prepared separately, and by using the aforementioned mixture and in a similar method, a heat-resistant sheet member was separately fabricated in which a heat-resistant coating (the weight ratio between, on the one hand, boron carbide, calcium fluoride, talc, and graphite and, on the other hand, aluminum phosphate being 1:1) in an amount of 0.3 g/100 cm$^2$ and with a uniform thickness was formed on the overall surfaces of the expanded graphite sheet.

The outer-surface-layer forming member was fabricated in the same way as in Example 1, and the cylindrical preform was fabricated in the same way as in Example 1. Thus, the spherical annular seal member 55 similar to that of Example 1 was formed which had the cylindrical inner surface 52 defining the through hole 51 in its central portion, the outer surface 53 formed in the shape of the partially convex spherical surface, and the annular end face 54. The weight ratio between, on the one hand, the heat-resistant material constituted by the expanded graphite sheet and, on the other hand, boron carbide, calcium fluoride, talc, graphite, and aluminum phosphate for forming the heat-resistant coating in this spherical annular seal member was in the ratio of 15.8 parts of the heat-resistant coating (the mixture of 0.79 part of boron carbide, 0.4 part of calcium fluoride, 0.79 part of talc, and 5.92 parts of graphite: 7.9 parts; and aluminum phosphate: 7.9 parts) with respect to 100 parts of the heat-resistant material.

Example 14

An expanded graphite sheet similar to the one used in the above-described Example 1 (the weight of the expanded graphite sheet being 11.6 g) was prepared. The operation of coating the overall surfaces of this expanded graphite sheet with a mixture similar to the one used in the above-described Example 1 by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, calcium fluoride, talc, and graphite and, on the other hand, aluminum phosphate being 1:1) in an amount of 0.5 g/100 cm$^2$ and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet (the weight of the expanded graphite sheet being 3.9 g) was prepared separately. The operation of coating the overall surfaces of this expanded graphite sheet with a mixture similar to the one used in the above-described Example 13 by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, calcium fluoride, talc, and graphite and, on the other hand, aluminum phosphate being 1:1) in an amount of 0.5 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was fabricated in the same method as the one used in Example 1. The weight ratio between, on the one hand, the heat-resistant material constituted by the expanded graphite sheet and, on the other hand, boron carbide, calcium fluoride, talc, graphite, and aluminum phosphate for forming the heat-resistant coating in this spherical annular seal member was in the ratio of 26.32 parts of the heat-resistant coating (the mixture of 1.32 parts of boron carbide, 0.65 part of calcium fluoride, 1.32 parts of talc, and 9.87 parts of graphite: 13.16 parts; and aluminum phosphate: 13.16 parts) with respect to 100 parts of the heat-resistant material.

Example 15

As a heat-resistant sheet, an expanded graphite sheet (the weight of the expanded graphite sheet being 11.6 g) was prepared. An aqueous solution of aluminum primary phosphate of a 25% concentration was prepared, and 7.5 g of a mixture of powders, including 10 wt. % of a boron carbide powder with an average particle size of 1.5 μm, 5 wt. % of a metal fluoride (lithium fluoride) powder with an average particle size of 4 μm, 10 wt. % of a heat-resistant lubricant (talc) with an average particle size of 20 μm, and 75 wt. % of a graphite powder with an average particle size of 18 μm, was mixed in 30 g of this aqueous solution, and a mixture was thereby obtained. The overall surfaces of this expanded graphite sheet were roller coated with this mixture, and the thus-coated expanded graphite sheet was then allowed to dry for 20 minutes at a temperature of 230° C. in the drying furnace so as to form the heat-resistant coating (the weight ratio between, on the one hand, boron carbide, lithium fluoride, talc, and graphite and, on the other hand, aluminum phosphate being 1:1) in an amount of 0.3 g/100 cm$^2$ and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The overall surfaces of this expanded graphite sheet were roller coated with the aforementioned mixture, and the thus-coated expanded graphite sheet was then allowed to dry for 20 minutes at a temperature of 230° C. in the drying furnace so as to form the heat-resistant coating (the weight ratio between, on the one hand, boron carbide, lithium fluoride, talc, and graphite and, on the other hand, aluminum phosphate being 1:1) in an amount of 0.3 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was fabricated in the same method as the one used in Example 1. The weight ratio between, on the one hand, the heat-resistant material constituted by the expanded graphite sheet and, on the other hand, boron carbide, lithium fluoride, talc, graphite, and aluminum phosphate for forming the heat-resistant coating in this spherical annular seal member was in the ratio of 15.8 parts of the heat-resistant coating (the mixture of 0.79 part of boron carbide, 0.4 part of lithium fluoride, 0.79 part of talc, and 5.92 parts of graphite: 7.9 parts; and aluminum phosphate: 7.9 parts) with respect to 100 parts of the heat-resistant material.

Example 16

As a heat-resistant sheet, an expanded graphite sheet similar to the one used in the above-described Example 1 and having a width of 55 mm, a length of 550 mm, and a thickness of 0.38 mm (the weight of the expanded graphite sheet being 11.6 g) was prepared. An aqueous solution of aluminum primary phosphate of a 25% concentration was prepared, and 7.5 g of a mixture of powders, including 10 wt. % of a metal boride (chromium diboride) powder with an average particle size of 7 μm, 5 wt. % of a metal fluoride (calcium fluoride) powder with an average particle size of 4 μm, 10 wt. % of a heat-resistant lubricant (talc) powder with an average particle size of 20 μm, and 75 wt. % of a graphite powder with an average particle size of 18 μm, was mixed in 30 g of this aqueous solution, and a mixture was thereby obtained. The overall surfaces of this expanded graphite sheet was roller coated with this mixture, and the thus-coated expanded graphite sheet was then allowed to dry for 20 minutes at a temperature of 230° C. in the drying furnace so as to form the heat-resistant coating (the weight ratio between, on the one hand, chromium diboride, calcium fluoride, talc, and graphite and, on the other hand, aluminum phosphate being 1:1) in an amount of 0.3 g/100 cm$^2$ and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The overall surfaces of this expanded graphite sheet was roller coated with the aforementioned mixture, and the thus-coated expanded graphite sheet was then allowed to dry for 20 minutes at a temperature of 230° C. in the drying furnace so as to form the heat-resistant coating (the weight ratio between, on the one hand, chromium diboride, calcium fluoride, talc, and graphite and, on the other hand, aluminum phosphate being 1:1) in an amount of 0.3 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was fabricated in the same method as the one used in Example 1. The weight ratio between, on the one hand, the heat-resistant material constituted by the expanded graphite sheet and, on the other hand, chromium diboride, calcium fluoride, talc, graphite, and aluminum phosphate for forming the heat-resistant coating in this spherical annular seal member was in the ratio of 15.8 parts of the heat-resistant coating (the mixture of 0.79 part of chromium diboride, 0.4 part of calcium fluoride, 0.79 part of talc, and 5.92 parts of graphite: 7.9 parts; and aluminum phosphate: 7.9 parts) with respect to 100 parts of the heat-resistant material.

Example 17

As a heat-resistant sheet, an expanded graphite sheet having a width of 55 mm, a length of 550 mm, and a thickness of 0.38 mm (the weight of the expanded graphite sheet being 13.4 g) was prepared. An aqueous solution of aluminum primary phosphate of a 25% concentration was prepared, and 7.5 g of a mixture of powders, including 10 wt. % of a metal boride (molybdenum diboride: $MoB_2$) powder with an average particle size of 7 $\mu$m, 5 wt. % of a metal fluoride (lithium fluoride) powder with an average particle size of 4 $\mu$m, 10 wt. % of a heat-resistant lubricant (synthetic mica) powder with an average particle size of 10 $\mu$m and 75 wt. % of a graphite powder with an average particle size of 18 $\mu$m, was mixed in 30 g of this aqueous solution, and a mixture was thereby obtained. The overall surfaces of this expanded graphite sheet were roller coated with this mixture, and the thus-coated expanded graphite sheet was then allowed to dry for 20 minutes at a temperature of 230° C. in the drying furnace so as to form the heat-resistant coating (the weight ratio between, on the one hand, molybdenum diboride, lithium fluoride, synthetic mica, and graphite and, on the other hand, aluminum phosphate being 1:1) in an amount of 0.3 g/100 cm$^2$ and with a uniform thickness on the overall surfaces of the expanded graphite sheet. The sheet thus obtained was used as the heat-resistant sheet member.

A reinforcing member similar to that of the above-heat-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The overall surfaces of this expanded graphite sheet were roller coated with the aforementioned mixture, and the thus-coated expanded graphite sheet was then allowed to dry for 20 minutes at a temperature of 230° C. in the drying furnace so as to form the heat-resistant coating (the weight ratio between, on the one hand, molybdenum diboride, lithium fluoride, synthetic mica, and graphite and, on the other hand, aluminum phosphate being 1:1) in an amount of 0.3 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was similarly fabricated in the same method as the one used in Example 1. The weight ratio between, on the one hand, the heat-resistant material constituted by the expanded graphite sheet and, on the other hand, molybdenum diboride, lithium fluoride, synthetic mica, graphite, and aluminum phosphate for forming the heat-resistant coating in this spherical annular seal member was in the ratio of 15.8 parts of the heat-resistant coating (the mixture of 0.79 part of molybdenum diboride, 0.4 part of lithium fluoride, 0.79 part of synthetic mica, and 5.92 parts of graphite: 7.9 parts; and aluminum phosphate: 7.9 parts) with respect to 100 parts of the heat-resistant material.

Example 18

As a heat-resistant sheet, an expanded graphite sheet similar to the one used in the above-described Example 1 and having a width of 55 mm, a length of 550 mm, and a thickness of 0.38 mm (the weight of the expanded graphite sheet being 11.6 g) was prepared. An aqueous solution of aluminum primary phosphate of a 25% concentration was prepared, and 7.5 g of a mixture of powders, including 10 wt. % of a boron carbide powder with an average particle size of 1.5 $\mu$m, 15 wt. % of a metal boride (chromium diboride) powder with an average particle size of 7 $\mu$m, 5 wt. % of a metal fluoride (calcium fluoride) powder with an average particle size of 4 $\mu$m, 10 wt. % of a heat-resistant lubricant (talc) powder with an average particle size of 20 $\mu$m, and 60 wt. % of a graphite powder with an average particle size of 18 $\mu$m. was mixed in 30 g of this aqueous solution, and a mixture was thereby obtained. The overall surfaces of this expanded graphite sheet was roller coated with this mixture, and the thus-coated expanded graphite sheet was then allowed to dry for 20 minutes at a temperature of 230° C. in the drying furnace so as to form the heat-resistant coating (the weight ratio between, on the one hand, boron carbide, chromium diboride, calcium fluoride, talc, and graphite and, on the other hand, aluminum phosphate being 1:1) in an amount of 0.3 g/100 cm$^2$ and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The overall surfaces of this expanded graphite sheet was roller coated with the aforementioned mixture, and the thus-coated expanded graphite sheet was then allowed to dry for 20 minutes at a temperature of 230° C. in the drying furnace so as to form the heat-resistant coating (the weight ratio between, on the one hand, boron carbide, chromium diboride, calcium fluoride, talc, and graphite and, on the other hand, aluminum phosphate being 1:1) in an amount of 0.3 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was similarly fabricated in the same method as the one used in Example 1. The weight ratio between, on the one hand, the heat-resistant material constituted by the expanded graphite sheet and, on the other hand, boron carbide, chromium diboride, calcium fluoride, talc, graphite, and aluminum phosphate for forming the heat-resistant coating in this spherical annular seal member was in the ratio of 15.8 parts of the heat-resistant coating (the mixture of 0.79 part of boron carbide, 1.18 parts of chromium diboride, 0.4 part of calcium fluoride, 0.79 part of talc, and 4.74 parts of graphite: 7.9 parts; and aluminum phosphate: 7.9 parts) with respect to 100 parts of the heat-resistant material.

Example 19

As a heat-resistant sheet, an expanded graphite sheet similar to the one used in the above-described Example 1 and having a width of 55 mm, a length of 550 mm, and a thickness of 0.38 mm (the weight of the expanded graphite sheet being 11.9 g) was prepared. The operation of coating the overall surfaces of this expanded graphite sheet with a mixture similar to the one used in the above-described Example 18 by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, chromium diboride, calcium fluoride, talc, and graphite and, on the other hand, aluminum phosphate being 1:1) in an amount of 0.5 g/100 cm² and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The operation of coating the overall surfaces of this expanded graphite sheet with a mixture similar to the one used in the above-described Example 18 by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, chromium diboride, calcium fluoride, talc, and graphite and, on the other hand, aluminum phosphate being 1:1) in an amount of 0.5 g/100 cm² and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was similarly fabricated in the same method as the one used in Example 1. The weight ratio between, on the one hand, the heat-resistant material constituted by the expanded graphite sheet and, on the other hand, boron carbide, chromium diboride, calcium fluoride, talc, graphite, and aluminum phosphate for forming the heat-resistant coating in this spherical annular seal member was in the ratio of 26.32 parts of the heat-resistant coating (the mixture of 1.32 parts of boron carbide, 1.97 parts of chromium diboride, 0.65 part of calcium fluoride, 1.32 parts of talc, and 7.9 parts of graphite: 13.16 parts; and aluminum phosphate: 13.16 parts) with respect to 100 parts of the heat-resistant material.

Example 20

As a heat-resistant sheet, an expanded graphite sheet similar to the one used in the above-described Example 1 and having a width of 55 mm, a length of 550 mm, and a thickness of 0.38 mm (the weight of the expanded graphite sheet being 11.6 g) was prepared. An aqueous solution of aluminum primary phosphate of a 25% concentration was prepared, and 7.5 g of a mixture of powders, including 10 wt. % of a boron carbide powder with an average particle size of 1.5 μm, 15 wt. % of a metal boride (chromium diboride) powder with an average particle size of 7 μm, 5 wt. % of a metal fluoride (calcium fluoride) powder with an average particle size of 4 μm, 5 wt. % of a heat-resistant lubricant (talc) powder with an average particle size of 20 μm, 5 wt. % of a heat-resistant lubricant (synthetic mica) powder with an average particle size of 10 μm, and 60 wt. % of a graphite powder with an average particle size of 18 μm, was mixed in 30 g of this aqueous solution, and a mixture was thereby obtained. The operation of coating the overall surfaces of this expanded graphite sheet with this mixture by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, chromium diboride, calcium fluoride, talc, synthetic mica, and graphite and, on the other hand, aluminum phosphate being 1:1) in an amount of 0.5 g/100 cm² and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The operation of coating the overall surfaces of this expanded graphite sheet with the aforementioned mixture by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, chromium diboride, calcium fluoride, talc, synthetic mica, and graphite and, on the other hand, aluminum phosphate being 1:1) in an amount of 0.5 g/100 cm² and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was similarly fabricated in the same method as the one used in Example 1. The weight ratio between, on the one hand, the heat-resistant material constituted by the expanded graphite sheet and, on the other hand, boron carbide, chromium diboride, calcium fluoride, talc, synthetic mica, graphite, and aluminum phosphate for forming the heat-resistant coating in this spherical annular seal member was in the ratio of 26.32 parts of the heat-resistant coating (the mixture of 1.32 parts of boron carbide, 1.97 parts of chromium diboride, 0.65 part of calcium fluoride, 0.65 part of talc, 0.65 of synthetic mica, and 7.9 parts of graphite: 13.16 parts; and aluminum phosphate: 13.16 parts) with respect to 100 parts of the heat-resistant material.

Example 21

As a heat-resistant sheet, an expanded graphite sheet similar to the one used in the above-described Example 1 and having a width of 55 mm, a length of 550 mm, and a thickness of 0.38 mm (the weight of the expanded graphite sheet being 11.6 g) was prepared. An aqueous solution of aluminum primary phosphate of a 25% concentration was prepared, and 7.5 g of a mixture of powders, including 10 wt. % of a boron carbide powder with an average particle size of 1.5 μm, 15 wt. % of a metal boride (tungsten diboride) powder with an average particle size of 7 μm, 5 wt. % of a metal fluoride (lithium fluoride) powder with an average particle size of 4 μm, 10 wt. % of a heat-resistant lubricant (boron nitride) powder with an average particle size of 7 μm, and 60 wt. % of a graphite powder with an average particle size of 18 μm, was mixed in 30 g of this aqueous solution, and a mixture was thereby obtained. The operation of coating the overall surfaces of this expanded graphite sheet with this mixture by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, tungsten diboride, lithium fluoride, boron nitride, and graphite and, on the other hand, aluminum phosphate being 1:1) in an amount of 0.5 g/100 cm$^2$ and with a uniform thickness on the overall surfaces of the expanded graphite sheet. The sheet thus obtained was used as the heat-resistant sheet member.

A reinforcing member similar to that of the above-described Example 1 was prepared, and the tubular base member was fabricated from the reinforcing member and the heat-resistant sheet member in the same way as in Example 1. As another heat-resistant sheet, an expanded graphite sheet having a width of 48 mm, a length of 212 mm, and a thickness of 0.38 mm (the weight of the expanded graphite sheet being 3.9 g) was prepared separately. The operation of coating the overall surfaces of this expanded graphite sheet with the aforementioned mixture by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, tungsten diboride, lithium fluoride, boron nitride, and graphite and, on the other hand, aluminum phosphate being 1:1) in an amount of 0.5 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was similarly fabricated in the same method as the one used in Example 1. The weight ratio between, on the one hand, the heat-resistant material constituted by the expanded graphite sheet and, on the other hand, boron carbide, tungsten diboride, lithium fluoride, boron nitride, graphite, and aluminum phosphate for forming the heat-resistant coating in this spherical annular seal member was in the ratio of 26.32 parts of the heat-resistant coating (the mixture of 1.32 parts of boron carbide, 1.97 parts of tungsten diboride, 0.65 part of lithium fluoride, 1.32 parts of boron nitride, and 7.9 parts of graphite: 13.16 parts; and aluminum phosphate: 13.16 parts) with respect to 100 parts of the heat-resistant material.

Example 22

A tubular base member similar to that of the above-described Example 20 was fabricated.

As another heat-resistant sheet, an expanded graphite sheet having a width of 48 mm, a length of 212 mm, and a thickness of 0.38 mm (the weight of the expanded graphite sheet being 3.9 g) was prepared separately. The operation of coating the overall surfaces of this expanded graphite sheet with a mixture similar to that of the above-described Example 13 by roller coating was repeated twice, and the thus-coated expanded graphite sheet was then allowed to dry for 20 minutes at a temperature of 230° C. in the drying furnace so as to form the heat-resistant coating (the weight ratio between, on the one hand, boron carbide, calcium fluoride, talc, and graphite and, on the other hand, aluminum phosphate being 1:1) in an amount of 0.5 g/100 cm$^2$ and with a uniform thickness on the overall surfaces of the expanded graphite sheet, thereby separately fabricating the heat-resistant sheet member.

Subsequently, the outer-surface-layer forming member was formed in the same way as the above-described Example 1, and the spherical annular seal member was similarly fabricated in the same method as the one used in Example 1. The weight ratio between, on the one hand, the heat-resistant material constituted by the expanded graphite sheet and, on the other hand, boron carbide, chromium diboride, calcium fluoride, talc, graphite, and aluminum phosphate for forming the heat-resistant coating in this spherical annular seal member was in the ratio of 26.32 parts of the heat-resistant coating (the mixture of 1.32 parts of boron carbide, 1.47 parts of chromium diboride, 0.66 part of calcium fluoride, 1.32 parts of talc, and 8.39 parts of graphite: 13.16 parts; and aluminum phosphate: 13.16 parts) with respect to 100 parts of the heat-resistant material.

In the spherical annular seal member fabricated in the above-described manner, in the inner portion of the spherical annular seal member extending from the cylindrical inner surface to the outer surface formed in the shape of the partially convex spherical surface, the heat-resistant sheet member having on the overall surfaces of the heat-resistant sheet the heat-resistant coating formed of boron carbide, chromium diboride, calcium fluoride, talc, graphite, and aluminum phosphate, as well as the reinforcing member constituted by the metal wire net, were compressed and intertwined with each other, and were thus arranged to be provided with structural integrality. The outer surface formed in the shape of the partially convex spherical surface was constituted by an exposed surface of the outer surface layer formed of the heat-resistant coating, and the reinforcing member constituted by the metal wire net, which was formed integrally with the outer surface layer, was disposed in the outer surface layer. The outer surface formed in the shape of the partially convex spherical surface, where the outer surface layer and the reinforcing member constituted by the metal wire net formed integrally with the outer surface layer in mixed form were exposed, was formed into a smooth surface, while a heat-resistant layer constituted by the heat-resistant coating formed of the heat-resistant coating was formed in such a manner as to be exposed at the cylindrical inner surface defining the through hole and at the end face on the large-diameter side of the outer surface.

Example 23

A tubular base member similar to that of the above-described Example 14 was fabricated.

As another heat-resistant sheet, an expanded graphite sheet having a width of 48 mm, a length of 212 mm, and a thickness of 0.38 mm (the weight of the expanded graphite sheet being 3.9 g) was prepared separately. By using a mixture similar to that of the above-described Example 13 and in a similar method, a heat-resistant sheet member was separately fabricated in which a heat-resistant coating (the weight ratio between, on the one hand, boron carbide, calcium fluoride, talc, and graphite and, on the other hand, aluminum phosphate being 1:1) in an amount of 0.5 g/100 cm² and with a uniform thickness was formed on the overall surfaces of the expanded graphite sheet.

An aqueous dispersion (25.5 wt. % of boron nitride, 4.5 wt. % of alumina, and 70 wt. % of water) dispersively containing as a solid content 30 wt. % of a lubricating composition constituted of 85 wt. % of boron nitride powder with an average particle size of 7 µm and 15 wt. % of alumina powder with an average particle size of 0.6 µm, was applied to the surface of the heat-resistant coating on one surface of the heat-resistant sheet member by means of roller coating, and was then dried. This coating operation was repeated three times to form the surface layer of the lubricating composition. Subsequently, the outer-surface-layer forming member was fabricated in the same way as in Example 1.

Subsequently, the spherical annular seal member was fabricated in the same method as the one used in Example 1. The weight ratio between, on the one hand, the heat-resistant material constituted by the expanded graphite sheet and, on the other hand, boron carbide, calcium fluoride, talc, graphite, and aluminum phosphate for forming the heat-resistant coating in this spherical annular seal member was in the ratio of 26.32 parts of the heat-resistant coating (the mixture of 1.32 parts of boron carbide, 0.65 part of calcium fluoride, 1.32 parts of talc, and 9.87 parts of graphite: 13.16 parts; and aluminum phosphate: 13.16 parts) with respect to 100 parts of the heat-resistant material.

In the spherical annular seal member fabricated in the above-described manner, in the inner portion of the spherical annular seal member extending from the cylindrical inner surface to the outer surface formed in the shape of the partially convex spherical surface, the heat-resistant sheet member having the heat-resistant coating on the overall surfaces of the heat-resistant sheet, as well as the reinforcing member constituted by the metal wire net, were compressed and intertwined with each other, and were thus arranged to be provided with structural integrity. The outer surface formed in the shape of the partially convex spherical surface was constituted by an exposed surface of the outer surface layer formed of the surface layer of the lubricating composition, and the reinforcing member constituted by the metal wire net, which was formed integrally with the outer surface layer, was disposed in the outer surface layer. The outer surface formed in the shape of the partially convex spherical surface, where the outer surface layer and the reinforcing member constituted by the metal wire net formed integrally with the outer surface layer in mixed form were exposed, was formed into a smooth surface, while a heat-resistant layer constituted by the heat-resistant coating was formed in such a manner as to be exposed at the cylindrical inner surface defining the through hole and at the end face on the large-diameter side of the outer surface formed in the shape of the partially convex spherical surface.

Example 24

A tubular base member similar to that of the above-described Example 18 was fabricated.

As another heat-resistant sheet, an expanded graphite sheet having a width of 48 mm, a length of 212 mm, and a thickness of 0.38 mm (the weight of the expanded graphite sheet being 3.9 g) was prepared separately. By using a mixture similar to that of the above-described Example 18 and in a similar method, a heat-resistant sheet member was separately fabricated in which a heat-resistant coating (the weight ratio between, on the one hand, boron carbide, chromium diboride, calcium fluoride, talc, and graphite and, on the other hand, aluminum phosphate being 1:1) in an amount of 0.3 g/100 cm² and with a uniform thickness was formed on the overall surfaces of the expanded graphite sheet.

An aqueous dispersion (17 wt. % of boron nitride, 10 wt. % of alumina, 10 wt. % of polytetrafluoroethylene resin, and 70 wt. % of water) dispersively containing as a solid content 30 wt. % of a lubricating composition (56.7 wt. % of boron nitride, 10 wt. % of alumina, and 33.3 wt. % of polytetrafluoroethylene resin), in which a mixture constituted of 85 wt. % of boron nitride powder with an average particle size of 7 µm and 15 wt. % of alumina powder with an average particle size of 0.6 µm was set as 100 parts by weight, and which further contained 50 parts by weight of polytetrafluoroethylene resin powder with an average particle size of 0.3 µm, was applied to the surface of the heat-resistant coating on one surface of the heat-resistant sheet member by means of roller coating, and was then dried.

This coating operation was repeated three times to form the surface layer of the lubricating composition. Subsequently, the outer-surface-layer forming member was fabricated in the same way as in Example 1.

Subsequently, the spherical annular seal member was fabricated in the same method as the one used in Example 1. The weight ratio between, on the one hand, the heat-resistant material constituted by the expanded graphite sheet and, on the other hand, boron carbide, chromium diboride, calcium fluoride, talc, graphite, and aluminum phosphate for forming the heat-resistant coating in this spherical annular seal member was in the ratio of 15.8 parts of the heat-resistant coating (the mixture of 0.79 part of boron carbide, 1.18 parts of chromium diboride, 0.4 part of calcium fluoride, 0.79 part of talc, and 4.74 parts of graphite: 7.9 parts; and aluminum phosphate: 7.9 parts) with respect to 100 parts of the heat-resistant material.

In the spherical annular seal member fabricated in the above-described manner, in the inner portion of the spherical annular seal member extending from the cylindrical inner surface to the outer surface formed in the shape of the partially convex spherical surface, the heat-resistant sheet member having the heat-resistant coating on the overall surfaces of the heat-resistant sheet, as well as the reinforcing member constituted by the metal wire net, were compressed and intertwined with each other, and were thus arranged to be provided with structural integrity. The outer surface formed in the shape of the partially convex spherical surface was constituted by an exposed surface of the outer surface layer formed of the surface layer of the lubricating composition, and the reinforcing member constituted by the metal wire net, which was formed integrally with the outer surface layer, was disposed in the outer surface layer. The outer surface formed in the shape of the partially convex spherical surface, where the outer surface layer and the reinforcing member constituted by the metal wire net formed integrally with the outer surface layer in mixed form were exposed, was formed into a smooth surface, while a heat-resistant layer constituted by the heat-resistant coating was formed in such a manner as to be exposed at the cylindrical inner surface defining the through hole and at the end face on the large-diameter side of the outer surface formed in the shape of the partially convex spherical surface.

Example 25

A tubular base member similar to that of the above-described Example 19 was fabricated.

As another heat-resistant sheet, an expanded graphite sheet having a width of 48 mm, a length of 212 mm, and a thickness of 0.38 mm (the weight of the expanded graphite sheet being 3.9 g) was prepared separately. By using a mixture similar to that of the above-described Example 18 and in a method similar to that of the above-described Example 19, a heat-resistant sheet member was separately fabricated in which a heat-resistant coating (the weight ratio between, on the one hand, boron carbide, chromium diboride, calcium fluoride, talc, and graphite and, on the other hand, aluminum phosphate being 1:1) in an amount of 0.5 g/100 cm$^2$ and with a uniform thickness was formed on the overall surfaces of the expanded graphite sheet.

An aqueous dispersion (17 wt. % of boron nitride, 10 wt. % of alumina, 10 wt. % of polytetrafluoroethylene resin, and 70 wt. % of water) dispersively containing as a solid content 30 wt. % of a lubricating composition (56.7 wt. % of boron nitride, 10 wt. % of alumina, and 33.3 wt. % of polytetrafluoroethylene resin), in which a mixture constituted of 85 wt. % of boron nitride powder with an average particle size of 7 μm and 15 wt. % of alumina powder with an average particle size of 0.6 μm was set as 100 parts by weight, and which further contained 50 parts by weight of polytetrafluoroethylene resin powder with an average particle size of 0.3 μm. was applied to the surface of the heat-resistant coating on one surface of the heat-resistant sheet member by means of roller coating, and was then dried. This coating operation was repeated three times to form the surface layer of the lubricating composition. Subsequently, the outer-surface-layer forming member was fabricated in the same way as in Example 1.

Subsequently, the spherical annular seal member was fabricated in the same method as the one used in Example 1. The weight ratio between, on the one hand, the heat-resistant material constituted by the expanded graphite sheet and, on the other hand, boron carbide, chromium diboride, calcium fluoride, talc, graphite and aluminum phosphate for forming the heat-resistant coating in this spherical annular seal member was in the ratio of 26.32 parts of the heat-resistant coating (the mixture of 1.32 parts of boron carbide, 1.97 parts of chromium diboride, 0.65 part of calcium fluoride, 1.32 parts of talc, and 7.9 parts of graphite: 13.16 parts; and aluminum phosphate: 13.16 parts) with respect to 100 parts of the heat-resistant material.

Comparative Example 1

An expanded graphite sheet similar to that of the above-described Example 1 and having a width of 55 mm, a length of 550 mm, and a thickness of 0.38 mm was prepared as a heat-resistant sheet member, and a belt-shaped metal wire net (a width of 36 mm and a length of 360 mm) similar to the one used in Example 1 was used as a reinforcing member. The expanded graphite sheet and the reinforcing member were superposed one on top of the other, and a superposed assembly thereof was convoluted into a cylindrical shape with the expanded graphite sheet placed on the inner side, such that the expanded graphite sheet was exposed on the inner periphery and also on the outer periphery, thereby preparing a tubular base member.

An expanded graphite sheet similar to that of the above-described Example 1 and having a width of 48 mm, a length of 212 mm, and a thickness of 0.38 mm was prepared separately. Then, an aqueous dispersion (25.5 wt. % of boron nitride, 4.5 wt. % of alumina, and 70 wt. % of water) dispersively containing as a solid content 30 wt. % of a lubricating composition constituted of 85 wt. % of boron nitride powder with an average particle size of 7 μm and 15 wt. % of alumina powder with an average particle size of 0.6 μm, was applied to one surface of this expanded graphite sheet by means of roller coating, and the expanded graphite sheet was then dried. This coating operation was repeated three times to form a surface layer of the lubricating composition. Subsequently, the expanded graphite sheet having the aforementioned surface layer was inserted into a separately prepared belt-shaped metal wire net (a width of 53.5 mm and a length of 212 mm), and an assembly thereof was passed between the pair of rollers so as to be formed integrally, thereby fabricating an outer-surface-layer forming member on one surface of which the lubricating composition and the metal wire net were present in mixed form.

After a cylindrical preform was fabricated by winding the outer-surface-layer forming member around an outer peripheral surface of the aforementioned tubular base member with the surface layer placed on the outer side, a spherical annular seal member, which had a cylindrical inner surface defining a through hole in its central portion, an outer surface formed in the shape of a partially convex spherical surface, and an annular end face on the large-diameter side of this outer surface, was fabricated in the same method as the one used in the above-described Example 1.

Comparative Example 2

A tubular base member similar to that of the above-described Comparative Example 1 was fabricated. An expanded graphite sheet similar to that of the above-described Example 1 and having a width of 48 mm, a length of 212 mm, and a thickness of 0.38 mm was prepared separately. Then, an aqueous dispersion (17.0 wt. % of boron nitride, 3.0 wt. % of alumina, 10.0 wt. % of polytetrafluoroethylene resin, and 70 wt. % of water) dispersively containing as a solid content 30 wt. % of a lubricating composition (56.7 wt. % of boron nitride, 10 wt. % of alumina, and 33.3 wt. % of polytetrafluoroethylene resin), in which a mixture constituted of 85 wt. % of boron nitride powder with an average particle size of 7 μm and 15 wt. % of alumina powder with an average particle size of 0.6 μm was set as 100 parts by weight, and which further contained 50 parts by weight of polytetrafluoroethylene resin powder with an average particle size of 0.3 μm, was applied to one surface of this expanded graphite sheet by means of roller coating, and the expanded graphite sheet was then dried. This coating operation was repeated three times to form a surface layer of the lubricating composition. Subsequently, the expanded graphite sheet having the aforementioned surface layer was inserted into a separately prepared belt-shaped metal wire net (a width of 53.5 mm and a length of 212 mm), and an assembly thereof was passed between the pair of rollers so as to be formed integrally, thereby fabricating an outer-surface-layer forming member on one surface of which the lubricating composition and the metal wire net were present in mixed form.

After a cylindrical preform was fabricated by winding the outer-surface-layer forming member around an outer peripheral surface of the aforementioned tubular base member with the surface layer placed on the outer side, a spherical annular seal member, which had a cylindrical inner surface defining a through hole in its central portion, an outer surface formed in the shape of a partially convex spherical surface, and an annular end face on the large-diameter side of this outer surface, was fabricated in the same method as the one used in the above-described Example 1.

Then, with respect to the spherical annular seal members in accordance with the above-described Examples and Comparative Examples, tests were conducted for measurement of a frictional torque (kgf.cm) and for checking the presence or absence of the occurrence of abnormal noise, the amount of gas leakage, and the weight loss due to oxidation of the spherical annular seal member for each cycle of the seal member by using the exhaust pipe joint shown in FIG. 18, and its results are discussed below.

Test Conditions

Test I

Pressing force using coil springs: 67 kgf

Angle of oscillation: ±3°

Frequency: 12 hertz

Ambient temperature (the outer surface temperature of the concave spherical surface portion 302 shown in FIG. 18): from room temperature (20° C.) to 500° C.

Test II

Pressing force using coil springs: 67 kgf

Angle of oscillation: ±3°

Frequency: 12 hertz

Ambient temperature (the outer surface temperature of the concave spherical surface portion 302 shown in FIG. 18): from room temperature (20° C.) to 700° C.

Test Method

Both Tests I and II

After 45,000 oscillating motions are performed at room temperature by setting an oscillating motion at ±3° at a frequency of 12 hertz as a unit of oscillation, the ambient temperature is raised to 500° C. (Test I) or 700° C. (Test II) while continuing the oscillating motions (the number of oscillating motions during the temperature rise being 45,000). When the ambient temperature reached 500° C. or 700° C., 115,000 oscillating motions are performed. Finally, the ambient temperature is allowed to drop to room temperature while continuing the oscillating motions (the number of oscillating motions during the temperature drop being 45,000). The combined total of 250,000 oscillating motions is set as one cycle, and four cycles are performed.

In addition, the evaluation of the presence or absence of the occurrence of abnormal noise was conducted as follows.

Evaluation Code I: No abnormal noise occurred.

Evaluation Code II: Abnormal noise is slightly heard with the ear brought close to the test piece.

Evaluation Code III: Although the noise is generally difficult to discern from a fixed position (a position 1.5 m distant from the test piece) since it is blanketed by the noises of the living environment, the noise can be discerned as abnormal noise by a person engaged in the test.

Evaluation Code IV: The noise can be recognized as abnormal noise (unpleasant sound) by anybody from the fixed position.

As for the amount of gas leakage (litter/min), an opening of one exhaust pipe 100 connected to the exhaust pipe joint shown in FIG. 18 was closed, dry air was allowed to flow into the joint portion from the other exhaust pipe 300 under a pressure of 0.5 kgf/cm², and the amount of leakage from the joint portion (sliding contact portions between the outer surface 53 of the spherical annular seal member 55 and the concave spherical surface portion 302 of the flared portion 301, fitting portions between the cylindrical inner surface 52 of the spherical annular seal member 55 and the pipe end portion 101 of the exhaust pipe 100, and abutting portions between the end face 54 on the large-diameter side and the flange 200 provided uprightly on the exhaust pipe 100) was measured four times in total, i.e., before the test start, after 250,000 oscillating motions, after 500,000 oscillating motions, and after 1,000,000 oscillating motions, by means of a flowmeter.

As for the weight loss due to oxidation, a change in the weight of the spherical annular seal member before and after the test was measured. The weight (g) of the spherical annular seal members in accordance with Examples and Comparative Examples before the test is shown in Table 1.

TABLE 1

|  | Weight (g) Before Test |
|---|---|
| Example 1 | 48.6 |
| Example 2 | 50.6 |
| Example 3 | 48.6 |
| Example 4 | 48.6 |
| Example 5 | 48.6 |
| Example 6 | 48.6 |
| Example 7 | 50.6 |
| Example 8 | 50.6 |
| Example 9 | 50.6 |
| Example 10 | 51.1 |
| Example 11 | 49.3 |
| Example 12 | 51.3 |
| Example 13 | 48.6 |
| Example 14 | 50.6 |
| Example 15 | 48.6 |
| Example 16 | 48.6 |
| Example 17 | 48.6 |
| Example 18 | 48.6 |
| Example 19 | 50.6 |
| Example 20 | 50.6 |
| Example 21 | 50.6 |
| Example 22 | 50.6 |
| Example 23 | 51.1 |
| Example 24 | 49.1 |
| Example 25 | 51.3 |
| Comparative Example 1 | 47.0 |
| Comparative Example 2 | 47.2 |

Tables 2 to 15 below show the results of Tests I and II obtained by the above-described test method.

TABLE 2

|  | Example 1 | | | | Example 2 | | | |
|---|---|---|---|---|---|---|---|---|
|  | 1 | 2 | 3 | 4 | 1 | 2 | 3 | 4 |
| Frictional torgue | | | | | | | | |
| Test: I | 96 | 93 | 90 | 96 | 95 | 92 | 90 | 97 |
| Test: II | 96 | 94 | 91 | 97 | 95 | 93 | 91 | 96 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.05 | 0.08 | 0.12 | 0.12 | 0.08 | 0.08 | 0.10 | 0.13 |
| Test: II | 0.05 | 0.23 | 0.23 | 0.40 | 0.08 | 0.25 | 0.27 | 0.35 |
| Loss of weight | | | | | | | | |
| Test: I | | 1.26 | | | | 1.18 | | |
| Test: II | | 6.32 | | | | 5.60 | | |

TABLE 3

| | Example 3 | | | | Example 4 | | | |
|---|---|---|---|---|---|---|---|---|
| | 1 | 2 | 3 | 4 | 1 | 2 | 3 | 4 |
| Frictional torque | | | | | | | | |
| Test: I | 96 | 92 | 90 | 95 | 96 | 94 | 92 | 97 |
| Test: II | 95 | 93 | 91 | 96 | 95 | 93 | 91 | 96 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.08 | 0.10 | 0.10 | 0.13 | 0.07 | 0.08 | 0.11 | 0.15 |
| Test: II | 0.08 | 0.23 | 0.25 | 0.41 | 0.07 | 0.21 | 0.25 | 0.43 |
| Loss of weight | | | | | | | | |
| Test: I | | 1.32 | | | | 1.37 | | |
| Test: II | | 6.50 | | | | 6.41 | | |

TABLE 4

| | Example 5 | | | | Example 6 | | | |
|---|---|---|---|---|---|---|---|---|
| | 1 | 2 | 3 | 4 | 1 | 2 | 3 | 4 |
| Frictional torque | | | | | | | | |
| Test: I | 95 | 93 | 91 | 96 | 94 | 92 | 90 | 95 |
| Test: II | 96 | 94 | 91 | 95 | 94 | 93 | 91 | 95 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.08 | 0.09 | 0.12 | 0.14 | 0.07 | 0.08 | 0.11 | 0.13 |
| Test: II | 0.08 | 0.21 | 0.23 | 0.43 | 0.07 | 0.23 | 0.23 | 0.42 |
| Loss of weight | | | | | | | | |
| Test: I | | 1.40 | | | | 1.15 | | |
| Test: II | | 6.30 | | | | 6.10 | | |

TABLE 5

| | Example 7 | | | | Example 8 | | | |
|---|---|---|---|---|---|---|---|---|
| | 1 | 2 | 3 | 4 | 1 | 2 | 3 | 4 |
| Frictional torque | | | | | | | | |
| Test: I | 95 | 93 | 90 | 96 | 97 | 95 | 92 | 95 |
| Test: II | 95 | 94 | 92 | 97 | 96 | 93 | 91 | 94 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.08 | 0.09 | 0.12 | 0.13 | 0.07 | 0.08 | 0.11 | 0.15 |
| Test: II | 0.08 | 0.19 | 0.21 | 0.35 | 0.07 | 0.21 | 0.25 | 0.38 |
| Loss of weight | | | | | | | | |
| Test: I | | 1.10 | | | | 1.20 | | |
| Test: II | | 5.30 | | | | 5.73 | | |

TABLE 6

| | Example 9 | | | | Example 10 | | | |
|---|---|---|---|---|---|---|---|---|
| | 1 | 2 | 3 | 4 | 1 | 2 | 3 | 4 |
| Frictional torque | | | | | | | | |
| Test: I | 97 | 95 | 93 | 96 | 87 | 85 | 90 | 92 |
| Test: II | 97 | 94 | 92 | 95 | 87 | 86 | 90 | 93 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.09 | 0.11 | 0.13 | 0.15 | 0.08 | 0.08 | 0.13 | 0.14 |
| Test: II | 0.09 | 0.23 | 0.25 | 0.42 | 0.08 | 0.22 | 0.26 | 0.45 |
| Loss of weight | | | | | | | | |
| Test: I | | 1.21 | | | | 1.25 | | |
| Test: II | | 6.03 | | | | 6.21 | | |

TABLE 7

| | Example 11 | | | | Example 12 | | | |
|---|---|---|---|---|---|---|---|---|
| | 1 | 2 | 3 | 4 | 1 | 2 | 3 | 4 |
| Frictional torque | | | | | | | | |
| Test: I | 84 | 82 | 82 | 86 | 84 | 82 | 80 | 85 |
| Test: II | 84 | 81 | 80 | 87 | 83 | 81 | 80 | 85 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.09 | 0.11 | 0.13 | 0.15 | 0.08 | 0.08 | 0.13 | 0.13 |
| Test: II | 0.09 | 0.21 | 0.26 | 0.42 | 0.08 | 0.13 | 0.15 | 0.38 |
| Loss of weight | | | | | | | | |
| Test: I | | 1.17 | | | | 1.12 | | |
| Test: II | | 6.00 | | | | 5.20 | | |

TABLE 8

| | Example 13 | | | | Example 14 | | | |
|---|---|---|---|---|---|---|---|---|
| | 1 | 2 | 3 | 4 | 1 | 2 | 3 | 4 |
| Frictional torque | | | | | | | | |
| Test: I | 90 | 88 | 85 | 87 | 92 | 90 | 86 | 89 |

TABLE 8-continued

|  | Example 13 | | | | Example 14 | | | |
| --- | --- | --- | --- | --- | --- | --- | --- | --- |
|  | 1 | 2 | 3 | 4 | 1 | 2 | 3 | 4 |
| Test: II | 91 | 87 | 86 | 88 | 93 | 89 | 87 | 90 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.07 | 0.08 | 0.12 | 0.12 | 0.08 | 0.08 | 0.10 | 0.13 |
| Test: II | 0.07 | 0.22 | 0.23 | 0.40 | 0.08 | 0.20 | 0.22 | 0.30 |
| Loss of weight | | | | | | | | |
| Test: I | | 1.26 | | | | 1.18 | | |
| Test: II | | 6.30 | | | | 5.53 | | |

TABLE 9

|  | Example 15 | | | | Example 16 | | | |
| --- | --- | --- | --- | --- | --- | --- | --- | --- |
|  | 1 | 2 | 3 | 4 | 1 | 2 | 3 | 4 |
| Frictional torque | | | | | | | | |
| Test: I | 90 | 88 | 85 | 88 | 89 | 85 | 83 | 88 |
| Test: II | 91 | 87 | 84 | 88 | 90 | 86 | 84 | 89 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.08 | 0.10 | 0.10 | 0.13 | 0.07 | 0.08 | 0.11 | 0.15 |
| Test: II | 0.08 | 0.23 | 0.24 | 0.40 | 0.07 | 0.20 | 0.26 | 0.44 |
| Loss of weight | | | | | | | | |
| Test: I | | 1.32 | | | | 1.38 | | |
| Test: II | | 6.46 | | | | 6.40 | | |

TABLE 10

|  | Example 17 | | | | Example 18 | | | |
| --- | --- | --- | --- | --- | --- | --- | --- | --- |
|  | 1 | 2 | 3 | 4 | 1 | 2 | 3 | 4 |
| Frictional torque | | | | | | | | |
| Test: I | 90 | 88 | 85 | 87 | 88 | 85 | 83 | 88 |
| Test: II | 90 | 87 | 84 | 88 | 90 | 86 | 84 | 90 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.08 | 0.09 | 0.12 | 0.14 | 0.07 | 0.08 | 0.11 | 0.15 |
| Test: II | 0.08 | 0.25 | 0.28 | 0.46 | 0.07 | 0.22 | 0.25 | 0.41 |
| Loss of weight | | | | | | | | |
| Test: I | | 1.35 | | | | 1.16 | | |
| Test: II | | 6.46 | | | | 6.08 | | |

TABLE 11

|  | Example 19 | | | | Example 20 | | | |
| --- | --- | --- | --- | --- | --- | --- | --- | --- |
|  | 1 | 2 | 3 | 4 | 1 | 2 | 3 | 4 |
| Frictional torque | | | | | | | | |
| Test: I | 88 | 85 | 83 | 87 | 87 | 84 | 82 | 86 |
| Test: II | 89 | 85 | 82 | 87 | 88 | 84 | 83 | 87 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.08 | 0.09 | 0.12 | 0.14 | 0.07 | 0.08 | 0.11 | 0.15 |
| Test: II | 0.08 | 0.18 | 0.20 | 0.34 | 0.07 | 0.19 | 0.21 | 0.38 |
| Loss of weight | | | | | | | | |
| Test: I | | 1.11 | | | | 1.15 | | |
| Test: II | | 5.20 | | | | 5.36 | | |

TABLE 12

|  | Example 21 | | | | Example 22 | | | |
| --- | --- | --- | --- | --- | --- | --- | --- | --- |
|  | 1 | 2 | 3 | 4 | 1 | 2 | 3 | 4 |
| Frictional torque | | | | | | | | |
| Test: I | 89 | 86 | 85 | 88 | 90 | 88 | 85 | 89 |
| Test: II | 90 | 87 | 84 | 89 | 90 | 87 | 85 | 90 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.09 | 0.11 | 0.13 | 0.15 | 0.08 | 0.08 | 0.13 | 0.14 |
| Test: II | 0.09 | 0.20 | 0.23 | 0.40 | 0.08 | 0.21 | 0.23 | 0.39 |
| Loss of weight | | | | | | | | |
| Test: I | | 1.20 | | | | 1.22 | | |
| Test: II | | 5.42 | | | | 5.56 | | |

TABLE 13

|  | Example 23 | | | | Example 24 | | | |
| --- | --- | --- | --- | --- | --- | --- | --- | --- |
|  | 1 | 2 | 3 | 4 | 1 | 2 | 3 | 4 |
| Frictional torque |  |  |  |  |  |  |  |  |
| Test: I | 85 | 82 | 82 | 90 | 83 | 82 | 80 | 85 |
| Test: II | 86 | 84 | 82 | 91 | 83 | 81 | 80 | 85 |
| Determination of abnormal noise |  |  |  |  |  |  |  |  |
| Test: I | I | I | I | I | I | I | I | I |
| Test: II | I | I | I | I | I | I | I | I |
| Amount of gas leakage |  |  |  |  |  |  |  |  |
| Test: I | 0.09 | 0.08 | 0.10 | 0.13 | 0.08 | 0.08 | 0.10 | 0.15 |
| Test: II | 0.08 | 0.21 | 0.23 | 0.32 | 0.08 | 0.22 | 0.24 | 0.41 |
| Loss of weight |  |  |  |  |  |  |  |  |
| Test: I |  | 1.20 | | |  | 1.17 | | |
| Test: II |  | 5.50 | | |  | 6.05 | | |

TABLE 14

|  | Example 25 | | | |
| --- | --- | --- | --- | --- |
|  | 1 | 2 | 3 | 4 |
| Frictional torques |  |  |  |  |
| Test: I | 84 | 82 | 80 | 85 |
| Test: II | 83 | 81 | 80 | 86 |
| Determination of abnormal noise |  |  |  |  |
| Test: I | I | I | I | I |
| Test: II | I | I | I | I |
| Amount of gas leakage |  |  |  |  |
| Test: I | 0.09 | 0.08 | 0.13 | 0.13 |
| Test: II | 0.08 | 0.18 | 0.20 | 0.33 |
| Loss of weight |  |  |  |  |
| Test: I |  | 1.12 | | |
| Test: II |  | 5.21 | | |

TABLE 15

|  | Comparative Example 1 | | | | Comparative Example 2 | | | |
| --- | --- | --- | --- | --- | --- | --- | --- | --- |
|  | 1 | 2 | 3 | 4 | 1 | 2 | 3 | 4 |
| Frictional torque |  |  |  |  |  |  |  |  |
| Test: I | 82 | 83 | 86 | 90 | 81 | 81 | 84 | 88 |
| Test: II | 83 | 85 | 85 | 90 | 82 | 81 | 82 | 85 |
| Determination of abnormal noise |  |  |  |  |  |  |  |  |
| Test: I | I | I | I | I | I | I | I | I |
| Test: II | I | I | I | I | I | I | I | I |
| Amount of gas leakage |  |  |  |  |  |  |  |  |
| Test: I | 0.07 | 0.08 | 0.11 | 0.15 | 0.07 | 0.07 | 0.10 | 0.15 |
| Test: II | 0.07 | 1.20 | 2.70 | 5.32 | 0.07 | 1.30 | 3.25 | 5.23 |

TABLE 15-continued

|  | Comparative Example 1 | | | | Comparative Example 2 | | | |
| --- | --- | --- | --- | --- | --- | --- | --- | --- |
|  | 1 | 2 | 3 | 4 | 1 | 2 | 3 | 4 |
| Loss of weight |  |  |  |  |  |  |  |  |
| Test: I |  | 1.72 | | |  | 1.80 | | |
| Test: II |  | 15.1 | | |  | 15.9 | | |

In the tables, number 1 shows the results when the number of oscillating motions was zero (before the test start), number 2 shows the results when the number of oscillating motions was 250,000, number 3 shows the results when the number of oscillating motions was 500,000, and number 4 shows the results when the number of oscillating motions was 1,000,000. From the results of Test I, no difference in performance was noted between Examples and Comparative Examples. In both groups, the frictional torque was low, no occurrence of abnormal noise was noted, and a satisfactory performance was displayed in the amount of gas leakage which was not more than 0.15 litter/min.

However, from the results of Test II, an obvious difference in performance was noted between Examples and Comparative Examples. That is, in the case of the spherical annular seal members in accordance with Comparative Examples, under the high-temperature condition of 700° C. at the outer surface of the concave spherical portion, as is apparent from the test results on the amount of gas leakage and the weight loss due to oxidation, oxidation of expanded graphite, i.e., the heat-resistant sheet, progressed with an increase in the number of oscillating motions, a sudden wearing due to oxidation of the expanded graphite was noted when the number of oscillating motions exceeded 500,000, and the deformation of the shape and the like occurred, with the result that their function as seal members disappeared. On the other hand, in the case of the spherical annular seal members in accordance with Examples, heat-resistant coatings were formed on the overall surfaces of the heat-resistant sheets. Since the heat resistance of the seal members themselves had been enhanced, even under the high-temperature condition of 700° C. at the outer surface of the concave spherical portion, the oxidation and wearing of the expanded graphite were suppressed to low levels, and their function as seal members was still demonstrated even if the number of oscillating motions exceeded 1,000,000.

In addition, as is apparent from the results of the weight loss of the spherical annular seal members due to oxidation, in the case of the spherical annular seal members of Examples 1 to 25, the consumption of expanded graphite, i.e., the heat-resistant material, due to its oxidation was suppressed to a low level by virtue of the effect of the heat-resistant coating components even under a high-temperature condition of 700° C., and the weight losses of the seal members themselves due to oxidation showed low values.

What is claimed is:

1. A spherical annular seal member which has a cylindrical inner surface defining a through hole in a central portion thereof, a partially convex spherical annular outer surface, and an annular end surface on a large-diameter side of the outer surface, comprising:

an annular base portion including a matrix material comprising a first reinforcing member made from a compressed metal wire net and a compressed heat-resistant material filling meshes of said metal wire net, and a first composition mixed into said matrix material and comprising at least one of boron carbide and metal boride, metal fluoride, graphite, and aluminum phosphate; and an outer surface layer provided unitarily on said annular base portion and having said partially convex spherical annular outer surface, said outer surface layer including a second reinforcing member made from a further compressed metal wire net, and a second composition including at least one of boron carbide and metal boride, metal fluoride, graphite, and aluminum phosphate, said second composition being compressed and filling meshes of said further compressed metal wire net;

said outer surface with said second reinforcing member and said second composition in mixed form with each other being smooth, whereby a heat resistibility of said annular base portion is improved and, during an operation of said spherical annular seal member, a solid lubricating coating is formed on a surface of a mating member which is mated to said spherical annular seal member.

2. A spherical annular seal member according to claim 1, wherein, said annular base portion includes 5 to 45 parts by weight of said first composition with respect to 100 parts by weight of said heat-resistant material.

3. A spherical annular seal member according to claim 1, wherein, said annular base portion includes said first composition with 1:0.5 to 3 in a weight ratio of said at least one of boron carbide and metal boride, said metal fluoride, and said graphite to said aluminum phosphate, and includes 5 to 25 wt. % of said at least one of boron carbide and metal boride, 1 to 15 wt. % of said metal fluoride, and 60 to 90 wt. % of said graphite in that ratio.

4. A spherical annular seal member according to claim 1, wherein, said outer surface layer includes said second composition with 1:0.5 to 3 in a weight ratio of said at least one of boron carbide and metal boride, said metal fluoride, and said graphite to said aluminum phosphate, and includes 5 to 25 of said at least one of boron carbide and metal boride, 1 to 15 wt. % of said metal fluoride, and 60 to 90 wt. % of said graphite in that ratio.

5. A spherical annular seal member according to claim 1, wherein further comprises a first heat-resistant layer provided unitarily on said annular base portion and having said cylindrical inner surface, and a second heat-resistant layer provided unitarily on said annular base portion and having said annular end surface, each of said first and second heat-resistant layers including a further composition comprising at least one of boron carbide and metal boride, metal fluoride, graphite, and aluminum phosphate, respectively.

6. A spherical annular seal member according to claim 5, wherein, each of said first and second heat-resistant layers includes said further composition with 1:0.5 to 3 in a weight ratio of said at least one of boron carbide and metal boride, said metal fluoride, said graphite to said aluminum phosphate, and includes 5 to 25 wt. % of said at least one of boron carbide and metal boride, 1 to 15 wt. % of said metal fluoride, and 60 to 90 wt. % of said graphite in that ratio.

7. A spherical annular seal member according to claim 1, wherein the metal boride is selected from among Groups IVa, Va, and VIa of a periodic table of elements.

8. A spherical annular seal member according to claim 1, wherein the metal boride is selected from among titanium boride, titanium diboride, zirconium diboride, zirconium dodecaboride, halfnium diboride, vanadium diboride, niobium diboride, tantalum diboride, chromium boride, chromium diboride, molybdenum boride, molybdenum diboride, dimolybdenum boride, dimolybdenum pentaboride, tungsten boride, tungsten diboride, ditungsten boride, and ditungsten pentaboride.

9. A spherical annular seal member according to claim 1, wherein the metal fluoride is of at least one kind selected from calcium fluoride, lithium fluoride, sodium fluoride, and barium fluoride.

10. A spherical annular seal member according to claim 1, wherein said heat-resistant material is of at least one kind selected from expanded graphite, mica, and asbestos.

11. A spherical annular seal member according to claim 1, wherein, said first composition and second composition further comprise a heat-resistant lubricant, respectively.

12. A spherical annular seal member according to claim 11, wherein, said annular base portion includes said first composition with 5 to 45 parts by weight of said at least one of boron carbide and metal boride, the metal fluoride, the graphite, the heat-resistant lubricant, and said aluminum phosphate with respect to 100 parts by weight of said heat-resistant material.

13. A spherical annular seal member according to claim 11, wherein, said annular base portion includes said first composition with 1:0.5 to 3 in a weight ratio of said at least one of boron carbide and metal boride, the metal fluoride, the heat-resistant lubricant, and the graphite to said aluminum phosphate, and includes 5 to 20 wt. % of said at least one of boron carbide and metal boride, 3 to 15 wt. % of the metal fluoride, 5 to 25 wt. % of the heat-resistant lubricant, and 50 to 80 wt. % of the graphite in that ratio.

14. A spherical annular seal member according to claim 11, wherein, said outer surface layer includes said second composition with 1:0.5 to 3 in a weight ratio of said at least one of boron carbide and metal boride, the metal fluoride, the heat-resistant lubricant, and the graphite to said aluminum phosphate, and includes 5 to 20 wt. % of said at least one of boron carbide and metal boride, 3 to 15 wt. % of said metal fluoride, 5 to 25 wt. % of said heat-resistant lubricant, and 50 to 80 wt. % of said graphite in that ratio.

15. A spherical annular seal member according to claim 11, wherein further comprises a first heat-resistant layer provided unitarily on said annular base portion and having said cylindrical inner surface, and a second heat-resistant layer provided unitarily on said annular base portion and having said annular end surface, each of said first and second heat-resistant layers including a further composition comprising at least one of boron carbide and metal boride, metal fluoride, graphite, a heat-resistant lubricant, and aluminum phosphate, respectively.

16. A spherical annular seal member according to claim 15, wherein, each of said first and second heat-resistant layers includes said further composition with 1:0.5 to 3 in a weight ratio of said at least one of boron carbide and metal boride, the metal fluoride, the heat-resistant lubricant, and the graphite to said aluminum phosphate, and includes 5 to 20 wt. % of said at least one of boron carbide and metal boride, 3 to 15 wt. % of said metal fluoride, 5 to 25 wt. % of said heat-resistant lubricant, and 50 to 80 wt. % of said graphite in that ratio.

17. A spherical annular seal member according to claim 11, wherein the metal boride is selected from among Groups IVa, Va, and VIa of a periodic table of elements.

18. A spherical annular seal member according to claim 11, wherein the metal boride is selected from among titanium boride, titanium diboride, zirconium diboride, zirconium dodecaboride, halfnium diboride, vanadium diboride, niobium diboride, tantalum diboride, chromium boride, chromium diboride, molybdenum boride, molybdenum diboride, dimolybdenum boride, dimolybdenum pentaboride, tungsten boride, tungsten diboride, ditungsten boride, and ditungsten pentaboride.

19. A spherical annular seal member according to claim 11, wherein the metal fluoride is of at least one kind selected from calcium fluoride, lithium fluoride, sodium fluoride, and barium fluoride.

20. A spherical annular seal member according to claim 11, wherein said heat-resistant lubricant is of at least one kind selected from talc, mica, and boron nitride.

21. A spherical annular seal member according to claim 11, wherein said heat-resistant material is of at least one kind selected from expanded graphite, mica, and asbestos.

22. A spherical annular seal member which has a cylindrical inner surface defining a through hole in a central portion thereof, a partially convex spherical annular outer surface, and an annular end surface on a large-diameter side of the outer surface, comprising:
  an annular base portion including a matrix material comprising a first reinforcing member made from a compressed metal wire net and a compressed heat-resistant material filling meshes of said metal wire net, and a composition mixed into said matrix material and comprising at least one of boron carbide and metal boride, metal fluoride, graphite, and aluminum phosphate; and
  an outer surface layer provided unitarily on said annular base portion and having said partially convex spherical annular outer surface, said outer surface layer including a second reinforcing member made from a further compressed metal wire net, and a lubricating composition including at least boron nitride and at least one of alumina and silica, said lubricating composition being compressed and filling meshes of said further compressed metal wire net;
    said outer surface with said second reinforcing member and said lubricating composition in mixed form with each other being smooth, whereby a heat resistibility of said annular base portion is improved.

23. A spherical annular seal member according to claim 22, wherein, said annular base portion includes 5 to 45 parts by weight of said composition with respect to 100 parts by weight of said heat-resistant material.

24. A spherical annular seal member according to claim 22, wherein, said annular base portion includes said first composition with 1:0.5 to 3 in a weight ratio of said at least one of boron carbide and metal boride, the metal fluoride, and the graphite to said aluminum phosphate, and includes 5 to 25 wt. % of said at least one of boron carbide and the metal boride, 1 to 15 wt. % of the metal fluoride, and 60 to 90 wt. % of said graphite in that ratio.

25. A spherical annular seal member according to claim 22, wherein further comprises a first heat-resistant layer provided unitarily on said annular base portion and having said cylindrical inner surface, and a second heat-resistant layer provided unitarily on said annular base portion and having said annular end surface, each of said first and second heat-resistant layers including a further composition comprising at least one of boron carbide and metal boride, metal fluoride, graphite, and aluminum phosphate, respectively.

26. A spherical annular seal member according to claim 25, wherein, each of said first and second heat-resistant layers includes said further composition with 1:0.5 to 3 in a weight ratio of said at least one of boron carbide and metal boride, the metal fluoride, and the graphite to said aluminum phosphate, and includes 5 to 25 wt. % of said at least one of boron carbide and metal boride, 1 to 15 wt. % of the metal fluoride, and 60 to 90 wt. % of the graphite.

27. A spherical annular seal member according to claim 22, wherein the metal boride is selected from among Groups IVa, Va, and VIa of a periodic table of elements.

28. A spherical annular seal member according to claim 22, wherein the metal boride is selected from among titanium boride, titanium diboride, zirconium diboride, zirconium dodecaboride, halfnium diboride, vanadium diboride, niobium diboride, tantalum diboride, chromium boride, chromium diboride, molybdenum boride, molybdenum diboride, dimolybdenum boride, dimolybdenum pentaboride, tungsten boride, tungsten diboride, ditungsten boride, and ditungsten pentaboride.

29. A spherical annular seal member according to claim 22, wherein the metal fluoride is of at least one kind selected from calcium fluoride, lithium fluoride, sodium fluoride, and barium fluoride.

30. A spherical annular seal member according to claim 22, wherein said lubricating composition includes 70 to 90 wt. % of said boron nitride and 10 to 30 wt. % of said at least one of alumina and silica.

31. A spherical annular seal member according to claim 22, wherein said lubricating composition further contains polytetrafluoroethylene resin.

32. A spherical annular seal member according to claim 31, wherein said lubricating composition contains 100 parts by weight of a mixture of 70 to 90 wt. % of said boron nitride and 10 to 30 wt. % of said at least one of alumina and silica, and further contains not more than 200 parts by weight of polytetrafluoroethylene resin.

33. A spherical annular seal member according to claim 22, wherein said lubricating composition contains 100 parts by weight of a mixture of 70 to 90 wt. % of said boron nitride and 10 to 30 wt. % of said at least one of alumina and silica, and further contains 50 to 150 parts by weight of polytetrafluoroethylene resin.

34. A spherical annular seal member according to claim 22 wherein said heat-resistant material is of at least one kind selected from expanded graphite, mica, and asbestos.

35. A spherical annular seal member according to claim 22, wherein, said composition further includes a heat-resistant lubricant.

36. A spherical annular seal member according to claim 35, wherein, said annular base portion includes said composition with 5 to 45 parts by weight of said at least one of boron carbide and metal boride, the metal fluoride, the graphite, the heat-resistant lubricant, and said aluminum phosphate with respect to 100 parts by weight of said heat-resistant material.

37. A spherical annular seal member according to claim 35, wherein, said annular base portion includes said composition with 1:0.5 to 3 in a weight ratio of said at least one of boron carbide and metal boride, the metal fluoride, the heat-resistant lubricant, and the graphite to said aluminum phosphate, and includes 5 to 20 wt. % of said at least one of boron carbide and metal boride, 3 to 15 wt. % of the metal fluoride, 5 to 25 wt. % of the heat-resistant lubricant, and 50 to 80 wt. % of said graphite in that ratio.

38. A spherical annular seal member according to claim 37, wherein further comprises a first heat-resistant layer provided unitarily on said annular base portion and having said cylindrical inner surface, and a second heat-resistant layer provided unitarily on said annular base portion and having said annular end surface, each of said first and second heat-resistant layers including a further composition comprising at least one of boron carbide and metal boride, metal fluoride, graphite, heat-resistant lubricant, and aluminum phosphate.

39. A spherical annular seal member according to claim 38, wherein, each of said first and second heat-resistant layers includes said further composition with 1:0.5 to 3 in a weight ratio of said at least one of boron carbide and metal boride, the metal fluoride, the heat-resistant lubricant, and the graphite to said aluminum phosphate, and includes 5 to 20 wt. % of said at least one of boron carbide and metal boride, 3 to 15 wt. % of the metal fluoride, 5 to 25 wt. % of the heat-resistant lubricant, and 50 to 80 wt. % of the graphite in that ratio.

40. A spherical annular seal member according to claim 35, wherein the metal boride is selected from among Groups IVa, Va, and VIa of a periodic table of elements.

41. A spherical annular seal member according to claim 35, wherein the metal boride is selected from among titanium boride, titanium diboride, zirconium diboride, zirconium dodecaboride, halfnium diboride, vanadium diboride, niobium diboride, tantalum diboride, chromium boride, chromium diboride, molybdenum boride, molybdenum diboride, dimolybdenum boride, dimolybdenum pentaboride, tungsten boride, tungsten diboride, ditungsten boride, and ditungsten pentaboride.

42. A spherical annular seal member according to claim 35, wherein the metal fluoride is of at least one kind selected from calcium fluoride, lithium fluoride, sodium fluoride, and barium fluoride.

43. A spherical annular seal member according to claim 35, wherein the heat-resistant lubricant is of at least one kind selected from talc, mica, and boron nitride.

44. A spherical annular seal member according to claim 35, wherein said lubricating composition includes 70 to 90 wt. % of said boron nitride and 10 to 30 wt. % of said at least one of alumina and silica.

45. A spherical annular seal member according to claim 35, wherein said lubricating composition further contains polytetrafluoroethylene resin.

46. A spherical annular seal member according to claim 35, wherein said lubricating composition contains 100 parts by weight of a mixture of 70 to 90 wt. % of said boron nitride and 10 to 30 wt. % of said at least one of alumina and silica, and further contains not more than 200 parts by weight of polytetrafluoroethylene resin.

47. A spherical annular seal member according to claim 35, wherein said lubricating composition contains 100 parts by weight of a mixture of 70 to 90 wt. % of boron nitride and 10 to 30 wt. % of at least one of alumina and silica, and further contains 50 to 150 parts by weight of polytetrafluoroethylene resin.

48. A spherical annular seal member according to claim 35, wherein said heat-resistant material is of at least one kind selected from expanded graphite, mica, and asbestos.

49. A seal assembly comprising:

a spherical annular seal member which has a cylindrical inner surface defining a through hole in a central portion thereof, a partially convex spherical annular outer surface, and an annular end surface on a large-diameter side of the outer surface;

a mating member having a partially concave spherical annular surface for mating engagement with said partially convex outer surface of said seal member;

said annular member having an annular base portion including a matrix material comprising a first reinforcing member made from a compressed metal wire net and a compressed heat-resistant material filling meshes of said metal wire net, and a first composition mixed into said matrix material and comprising at least one of boron carbide and metal boride, metal fluoride, graphite, and aluminum phosphate; and an outer surface layer provided unitarily on said annular base portion and having said partially convex spherical annular outer surface, said outer surface layer including a second reinforcing member made from a further compressed metal wire net, and a second composition including at least one of boron carbide and metal boride, metal fluoride, graphite, and aluminum phosphate, said second composition being compressed and filling meshes of said further compressed metal wire net;

said outer surface with said second reinforcing member and said second composition in mixed form with each other being smooth, whereby a heat resistibility of said annular base portion is improved and, during an operation of said seal assembly, a solid lubricating coating is formed between said partially concave surface of said mating member and said partially convex surface of said spherical annular seal member.

50. A seal assembly according to claim 49, wherein, said annular base portion includes 5 to 45 parts by weight of said first composition with respect to 100 parts by weight of said heat-resistant material.

51. A seal assembly according to claim 49, wherein, said annular base portion includes said first composition with 1:0.5 to 3 in a weight ratio of said at least one of boron carbide and metal boride, said metal fluoride, and said graphite to said aluminum phosphate, and includes 5 to 25 wt. % of said at least one of boron carbide and metal boride, 1 to 15 wt. % of said metal fluoride, and 60 to 90 wt. % of said graphite in that ratio.

52. A seal assembly according to claim 49, wherein, said outer surface layer includes said second composition with 1:0.5 to 3 in a weight ratio of said at least one of boron carbide and metal boride, said metal fluoride, and said graphite to said aluminum phosphate, and includes 5 to 25 of said at least one of boron carbide and metal boride, 1 to 15 wt. % of said metal fluoride, and 60 to 90 wt. % of said graphite in that ratio.

53. A seal assembly according to claim 49, wherein further comprises a first heat-resistant layer provided unitarily on said annular base portion and having said cylindrical inner surface, and a second heat-resistant layer provided unitarily on said annular base portion and having said annular end surface, each of said first and second heat-resistant layers including a further composition comprising at least one of boron carbide and metal boride, metal fluoride, graphite, and aluminum phosphate, respectively.

54. A seal assembly according to claim 49, wherein, each of said first and second heat-resistant layers includes said further composition with 1:0.5 to 3 in a weight ratio of said at least one of boron carbide and metal boride, said metal fluoride, said graphite to said aluminum phosphate, and includes 5 to 25 wt. % of said at least one of boron carbide and metal boride, 1 to 15 wt. % of said metal fluoride, and 60 to 90 wt. % of said graphite in that ratio.

55. A seal assembly according to claim 49, wherein the metal boride is selected from among Groups IVa, Va, and VIa of a periodic table of elements.

56. A seal assembly according to claim 49, wherein the metal boride is selected from among titanium boride, titanium diboride, zirconium diboride, zirconium dodecaboride, halfnium diboride, vanadium diboride, niobium diboride, tantalum diboride, chromium boride, chromium diboride, molybdenum boride, molybdenum diboride, dimolybdenum boride, dimolybdenum pentaboride, tungsten boride, tungsten diboride, ditungsten boride, and ditungsten pentaboride.

57. A seal assembly according to claim 49, wherein the metal fluoride is of at least one kind selected from calcium fluoride, lithium fluoride, sodium fluoride, and barium fluoride.

58. A seal assembly according to claim 49, wherein said heat-resistant material is of at least one kind selected from expanded graphite, mica, and asbestos.

59. A seal assembly according to claim 49, wherein, said first composition and second composition further comprise a heat-resistant lubricant, respectively.

60. A seal assembly according to claim 49, wherein, said annular base portion includes said first composition with 5 to 45 parts by weight of said at least one of boron carbide and metal boride, the metal fluoride, the graphite, the heat-resistant lubricant, and said aluminum phosphate with respect to 100 parts by weight of said heat-resistant material.

61. A seal assembly according to claim 49, wherein, said annular base portion includes said first composition with 1:0.5 to 3 in a weight ratio of said at least one of boron carbide and metal boride, the metal fluoride, the heat-resistant lubricant, and the graphite to said aluminum phosphate, and includes 5 to 20 wt. % of said at least one of boron carbide and metal boride, 3 to 15 wt. % of the metal fluoride, 5 to 25 wt. % of the heat-resistant lubricant, and 50 to 80 wt. % of the graphite in that ratio.

62. A seal assembly according to claim 49, wherein, said outer surface layer includes said second composition with 1:0.5 to 3 in a weight ratio of said at least one of boron carbide and metal bonds, the metal fluoride, the heat-resistant lubricant, and the graphite to said aluminum phosphate, and includes 5 to 20 wt. % of said at least one of boron carbide and metal boride, 3 to 15 wt. % of said metal fluoride, 5 to 25 wt. % of said heat-resistant lubricant, and 50 to 80 wt. % of said graphite in that ratio.

63. A seal assembly according to claim 49, wherein further comprises a first heat-resistant layer provided unitarily on said annular base portion and having said cylindrical inner surface, and a second heat-resistant layer provided unitarily on said annular base portion and having said annular end surface, each of said first and second heat-resistant layers including a further composition comprising at least one of boron carbide and metal boride, metal fluoride, graphite, a heat-resistant lubricant, and aluminum phosphate, respectively.

64. A seal assembly according to claim 49, wherein, each of said first and second heat-resistant layers includes said further composition with 1:0.5 to 3 in a weight ratio of said at least one of boron carbide and metal boride, the metal fluoride, the heat-resistant lubricant, and the graphite to said aluminum phosphate, and includes 5 to 20 wt. % of said at least one of boron carbide and metal boride, 3 to 15 wt. % of said metal fluoride, 5 to 25 wt. % of said heat-resistant lubricant, and 50 to 80 wt. % of said graphite in that ratio.

65. A seal assembly according to claim 49, wherein the metal boride is selected from among Groups IVa, Va, and VIa of a periodic table of elements.

66. A seal assembly according to claim 49, wherein the metal boride is selected from among titanium boride, titanium diboride, zirconium diboride, zirconium dodecaboride, halfnium diboride, vanadium diboride, niobium diboride, tantalum diboride, chromium boride, chromium diboride, molybdenum boride, molybdenum diboride, dimolybdenum boride, dimolybdenum pentaboride, tungsten boride, tungsten diboride, ditungsten boride, and ditungsten pentaboride.

67. A seal assembly according to claim 49, wherein the metal fluoride is of at least one kind selected from calcium fluoride, lithium fluoride, sodium fluoride, and barium fluoride.

68. A seal assembly according to claim 49, wherein said heat-resistant lubricant is of at least one kind selected from talc, mica, and boron nitride.

69. A seal assembly according to claim 49, wherein said heat-resistant material is of at least one kind selected from expanded graphite, mica, and asbestos.

* * * * *